United States Patent
Misra et al.

(10) Patent No.: US 11,818,342 B2
(45) Date of Patent: Nov. 14, 2023

(54) SYSTEMS AND METHODS FOR APPLYING DEBLOCKING FILTERS TO RECONSTRUCTED VIDEO DATA

(71) Applicants: SHARP KABUSHIKI KAISHA, Sakai (JP); FG Innovation Company Limited, Tuen Mun (HK)

(72) Inventors: Kiran Mukesh Misra, Vancouver, WA (US); Christopher Andrew Segall, Vancouver, WA (US); Philip Cowan, Vancouver, WA (US); Frank Bossen, Vancouver, WA (US)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 168 days.

(21) Appl. No.: 17/429,475

(22) PCT Filed: Feb. 19, 2020

(86) PCT No.: PCT/JP2020/006624
§ 371 (c)(1),
(2) Date: Aug. 9, 2021

(87) PCT Pub. No.: WO2020/171143
PCT Pub. Date: Aug. 27, 2020

(65) Prior Publication Data
US 2022/0124325 A1      Apr. 21, 2022

Related U.S. Application Data

(60) Provisional application No. 62/819,575, filed on Mar. 16, 2019, provisional application No. 62/817,348, (Continued)

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/159* (2014.11);
(Continued)

(58) Field of Classification Search
CPC .. H04N 19/117; H04N 19/132; H04N 19/159; H04N 19/176; H04N 19/46; H04N 19/82
(Continued)

(56) References Cited

U.S. PATENT DOCUMENTS

2021/0360237 A1* 11/2021 Andersson ........... H04N 19/136

FOREIGN PATENT DOCUMENTS

WO        2020167228 A1      8/2020

OTHER PUBLICATIONS

C.-C. Fang, I.-W. Chen and T.-S. Chang, "A hardware-efficient deblocking filter design for HEVC," 2015 IEEE International Symposium on Circuits and Systems (ISCAS), Lisbon, Portugal, 2015, pp. 1786-1789, doi: 10.1109/ISCAS.2015.7169001. (Year: 2015).*

(Continued)

*Primary Examiner* — Dominic D Saltarelli
(74) *Attorney, Agent, or Firm* — ScienBiziP, P.C.

(57) ABSTRACT

This disclosure relates to video coding and more particularly to techniques for performing deblocking of reconstructed video data. According to an aspect of an invention, a maximum filter length is determined based on whether a P-block or a Q-block has an edge which is perpendicular to a deblocking boundary and whose size is greater than or equal to 32.

14 Claims, 13 Drawing Sheets

Related U.S. Application Data filed on Mar. 12, 2019, provisional application No. 62/816,844, filed on Mar. 11, 2019, provisional application No. 62/813,985, filed on Mar. 5, 2019, provisional application No. 62/810,913, filed on Feb. 26, 2019, provisional application No. 62/807,703, filed on Feb. 19, 2019.

(51) Int. Cl.
  *H04N 19/159* (2014.01)
  *H04N 19/176* (2014.01)
  *H04N 19/46* (2014.01)
  *H04N 19/82* (2014.01)

(52) U.S. Cl.
  CPC .......... *H04N 19/176* (2014.11); *H04N 19/46* (2014.11); *H04N 19/82* (2014.11)

(58) Field of Classification Search
  USPC .................................................. 375/240.02
  See application file for complete search history.

(56) References Cited

OTHER PUBLICATIONS

Ikeda, M. et al., CE11.1.6, CE11.1.7 and CE11.1.8: Joint proposals for long deblocking from Sony, Qualcomm, Sharp, Ericsson, Joint Video Experts Team (JVET), Jan. 18, 2019, [JVET-M0471] (version 3).
ITU-T H.265 (Dec. 2016) Series H: Audiovisual and Multimedia Systems Infrastructure of audiovisual services—Coding of moving video, High efficiency video coding.
Jianle Chen et al., "Algorithm Description of Joint Exploration Test Model 7 (JEM 7)", Document: JVET-G1001-v1 Joint Video Exploration Team (JVET) of ITU-T SG 16 WP 3 and ISO/IEC JTC 29/WG 11 7th Meeting: Torino, IT, Jul. 13-21, 2017.
Gary Sullivan et al., "Meeting Report of the 10th meeting of the Joint Video Experts Team (JVET), San Diego, US, Apr. 10-20, 2018", JVET-J_Notes_dA Joint Video Experts Team (JVET) of ITU-T SG 16 WP 3 and ISO/IEC JTC 1/SC 29/WG 11 10th Meeting: San Diego, US, Apr. 10-20, 2018.
Benjamin Brass et al., "Versatile Video Coding (Draft 4)", Document: JVET-M1001-v1 Joint Video Experts Team (JVET) of ITU-T SG 16 WP 3 and ISO/IEC JTC 1/SC 29/WG 11 13th Meeting: Marrakech, MA, Jan. 9-18, 2019.
Versatile Video Coding (Draft 3), Output document approved by JVET, Joint Video Experts Team (JVET)of ITU-T SG 16 WP 3 and ISO/IEC JTC 1/SC 29/WG 11, 12th Meeting: Macao, CN, Oct. 3-12, 2018, JVET-L1001-v8.
CE3: Intra Sub-Partitions Coding Mode (Tests 1.1.1 and 1.1.2), Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0102-v5.
Versatile Video Coding (Draft 4), Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M1001-v2, sections 7.3.4.6, 7.4.5.6 and 8.6.2.
Algorithm description for Versatile Video Coding and Test Model 4 (VTM 4), Joint Video Experts Team (JVET) of ITU-T SG 16 WP 3 and ISO/IEC JTC I/SC 29/WG 11, 13th Meeting: Marrakech, MA, Jan. 9-18, 2019, JVET-M1002-v1, sections 3.3.4 and 3.7.2.
Non-CE 11: On ISP transform boundary deblocking, Joint Video Experts Team (JVET) of ITU-T SG 16 WP 3 and 1SO/IEC JTC 1/SC 29/WG 11, 14th Meeting: Geneva, CH, Mar. 19-27, 2019, JVET-N0473.
International Standard, Information technology—Coding of audio-visual objects—Part 2: Visual, ISO/IEC 14496-2, Second edition Dec. 1, 2001.
ITU-T, Telecommunication Standardization Sector of ITU, Series H: Audiovisual and Multimedia Systems, Infrastructure of audio-visual services—Coding of moving video, Advanced video coding for generic audiovisual services, H.264 (Apr. 2017).
Versatile Video Coding (Draft 1), Joint Video Experts Team (JVET) of ITU-T SG 16 WP 3 and ISO/IEC JTC 1/SC 29/WG 11, 10th Meeting: San Diego, US, Apr. 10-20, 2018, JVET-J1001-v2.
CE6: Sub-block transform for inter blocks (CE6.4.1), Input document to JVET, Joint Video Experts Team (JVET) of ITU-T SG 16 WP 3 and ISO/IEC JTC 1/SC 29/WG 11, 13th Meeting: Marrakech, MA, Jan. 9-18, 2019, JVET-M0140-v3.

* cited by examiner

| | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Q | 0 | 0 | 0 | 0 | 0 | 0 | 0 | 0 | 0 | 0 | 0 | 0 | 0 | 0 | 0 | 0 | 0 |
| β' | 0 | 0 | 0 | 0 | 0 | 0 | 0 | 0 | 0 | 0 | 0 | 0 | 0 | 0 | 0 | 0 | 6 |
| tc' | 0 | 0 | 0 | 0 | 0 | 0 | 0 | 0 | 0 | 0 | 0 | 0 | 0 | 0 | 0 | 0 | 0 |
| Q | 17 | 18 | 19 | 20 | 21 | 22 | 23 | 24 | 25 | 26 | 27 | 28 | 29 | 30 | 31 | 32 | 33 |
| β' | 7 | 8 | 9 | 10 | 11 | 12 | 13 | 14 | 15 | 16 | 17 | 18 | 20 | 22 | 24 | 26 | 28 |
| tc' | 0 | 1 | 1 | 1 | 1 | 1 | 1 | 1 | 1 | 1 | 2 | 2 | 2 | 2 | 3 | 3 | 3 |
| Q | 34 | 35 | 36 | 37 | 38 | 39 | 40 | 41 | 42 | 43 | 44 | 45 | 46 | 47 | 48 | 49 | 50 |
| β' | 30 | 32 | 34 | 36 | 38 | 40 | 42 | 44 | 46 | 48 | 50 | 52 | 54 | 56 | 58 | 60 | 62 |
| tc' | 3 | 4 | 4 | 4 | 5 | 5 | 6 | 6 | 7 | 8 | 9 | 10 | 11 | 13 | 14 | 16 | 18 |
| Q | 51 | 52 | 53 | 54 | 55 | 56 | 57 | 58 | 59 | 60 | 61 | 62 | 63 | 64 | 65 | | |
| β' | 64 | 66 | 68 | 70 | 72 | 74 | 76 | 78 | 80 | 82 | 84 | 86 | 88 | - | - | | |
| tc' | 20 | 22 | 25 | 28 | 31 | 35 | 39 | 44 | 50 | 56 | 63 | 70 | 79 | 88 | 99 | | |

SYSTEMS AND METHODS FOR APPLYING DEBLOCKING FILTERS TO RECONSTRUCTED VIDEO DATA

CROSS-REFERENCE TO RELATED APPLICATION(S)

This present disclosure is a national stage application of International Patent Application PCT/JP2020/006624, filed on Feb. 19, 2020, now published as WO2020/171143, which claims the benefit of and priority to U.S. Provisional Patent Application Ser. No. 62/807,703, filed on Feb. 19, 2019, U.S. Provisional Patent Application Ser. No. 62/810,913, filed on Feb. 26, 2019, U.S. Provisional Patent Application Ser. No. 62/813,985, filed on Mar. 5, 2019, U.S. Provisional Patent Application Ser. No. 62/816,844, filed on Mar. 11, 2019, U.S. Provisional Patent Application Ser. No. 62/817,348, filed on Mar. 12, 2019, and U.S. Provisional Patent Application Ser. No. 62/819,575, filed on Mar. 16, 2019, the contents of all of which are hereby incorporated fully by reference into the present disclosure.

TECHNICAL FIELD

This disclosure relates to video coding and more particularly to techniques for performing deblocking of reconstructed video data.

BACKGROUND ART

Digital video capabilities can be incorporated into a wide range of devices, including digital televisions, laptop or desktop computers, tablet computers, digital recording devices, digital media players, video gaming devices, cellular telephones, including so-called smartphones, medical imaging devices, and the like. Digital video may be coded according to a video coding standard. Video coding standards define the format of a compliant bitstream encapsulating coded video data. A compliant bitstream is data structure that may be received and decoded by a video decoding device to generate reconstructed video data. Video coding standards may incorporate video compression techniques. Examples of video coding standards include ISO/IEC MPEG-4 Visual and ITU-T H.264 (also known as ISO/IEC MPEG-4 AVC) and High-Efficiency Video Coding (HEVC). HEVC is described in High Efficiency Video Coding (HEVC), Rec. ITU-T H.265, December 2016, which is incorporated by reference, and referred to herein as ITU-T H.265. Extensions and improvements for ITU-T H.265 are currently being considered for the development of next generation video coding standards. For example, the ITU-T Video Coding Experts Group (VCEG) and ISO/IEC (Moving Picture Experts Group (MPEG) (collectively referred to as the Joint Video Exploration Team (JVET)) are working to standardized video coding technology with a compression capability that significantly exceeds that of the current HEVC standard. The Joint Exploration Model 7 (JEM 7), Algorithm Description of Joint Exploration Test Model 7 (JEM 7), ISO/IEC JTC1/SC29/WG11 Document: JVET-G1001, July 2017, Torino, IT, which is incorporated by reference herein, describes the coding features that were under coordinated test model study by the JVET as potentially enhancing video coding technology beyond the capabilities of ITU-T H.265. It should be noted that the coding features of JEM 7 are implemented in JEM reference software. As used herein, the term JEM may collectively refer to algorithms included in JEM 7 and implementations of JEM reference software. Further, in response to a "Joint Call for Proposals on Video Compression with Capabilities beyond HEVC," jointly issued by VCEG and MPEG, multiple descriptions of video coding tools were proposed by various groups at the 10$^{th}$ Meeting of ISO/IEC JTC1/SC29/WG11 16-20 Apr. 2018, San Diego, Calif. From the multiple descriptions of video coding tools, a resulting initial draft text of a video coding specification is described in "Versatile Video Coding (Draft 1)," 10$^{th}$ Meeting of ISO/IEC JTC1/SC29/WG11 16-20 Apr. 2018, San Diego, Calif., document JVET-J1001-v2, which is incorporated by reference herein, and referred to as JVET-J1001. The current development of the a next generation video coding standard by the VCEG and MPEG is referred to as the Versatile Video Coding (VVC) project. "Versatile Video Coding (Draft 4)," 13th Meeting of ISO/IEC JTC1/SC29/WG11 9-18 Jan. 2019, Marrakech, M A, document JVET-M1001-v1, which is incorporated by reference herein, and referred to as JVET-M1001, represents the current iteration of the draft text of a video coding specification corresponding to the VVC project.

Video compression techniques enable data requirements for storing and transmitting video data to be reduced. Video compression techniques may reduce data requirements by exploiting the inherent redundancies in a video sequence. Video compression techniques may sub-divide a video sequence into successively smaller portions (i.e., groups of pictures within a video sequence, a picture within a group of pictures, regions within a picture, sub-regions within regions, etc.). Intra prediction coding techniques (e.g., spatial prediction techniques within a picture) and inter prediction techniques (i.e., inter-picture techniques (temporal)) may be used to generate difference values between a unit of video data to be coded and a reference unit of video data. The difference values may be referred to as residual data. Residual data may be coded as quantized transform coefficients. Syntax elements may relate residual data and a reference coding unit (e.g., intra-prediction mode indices, and motion information). Residual data and syntax elements may be entropy coded. Entropy encoded residual data and syntax elements may be included in data structures forming a compliant bitstream.

SUMMARY OF INVENTION

In one example, a method of filtering reconstructed video data, the method comprising: receiving an array of reconstructed luma samples including a P-block and a Q-block adjacent to a deblocking boundary; determining whether the P-block or the Q-block has an edge which is perpendicular to the deblocking boundary and whose size is greater than or equal to 32; determining a maximum filter length based on whether the P-block or the Q-block has the edge; and deblocking the array of reconstructed luma samples based on the determined maximum filter length.

In one example, a device of filtering reconstructed video data, the device comprising one or more processors configured to: receiving an array of reconstructed luma samples including a P-block and a Q-block adjacent to a deblocking boundary; determining whether the P-block or the Q-block has an edge which is perpendicular to the deblocking boundary and whose size is greater than or equal to 32; determining a maximum filter length based on whether the P-block or the Q-block has the edge; and deblocking the array of reconstructed luma samples based on the determined maximum filter length.

BRIEF DESCRIPTION OF DRAWINGS

FIG. 5 is an example of a table that may be used to determine deblocking parameters in accordance with one or more techniques of this disclosure.

DESCRIPTION OF EMBODIMENTS

Figure 1:
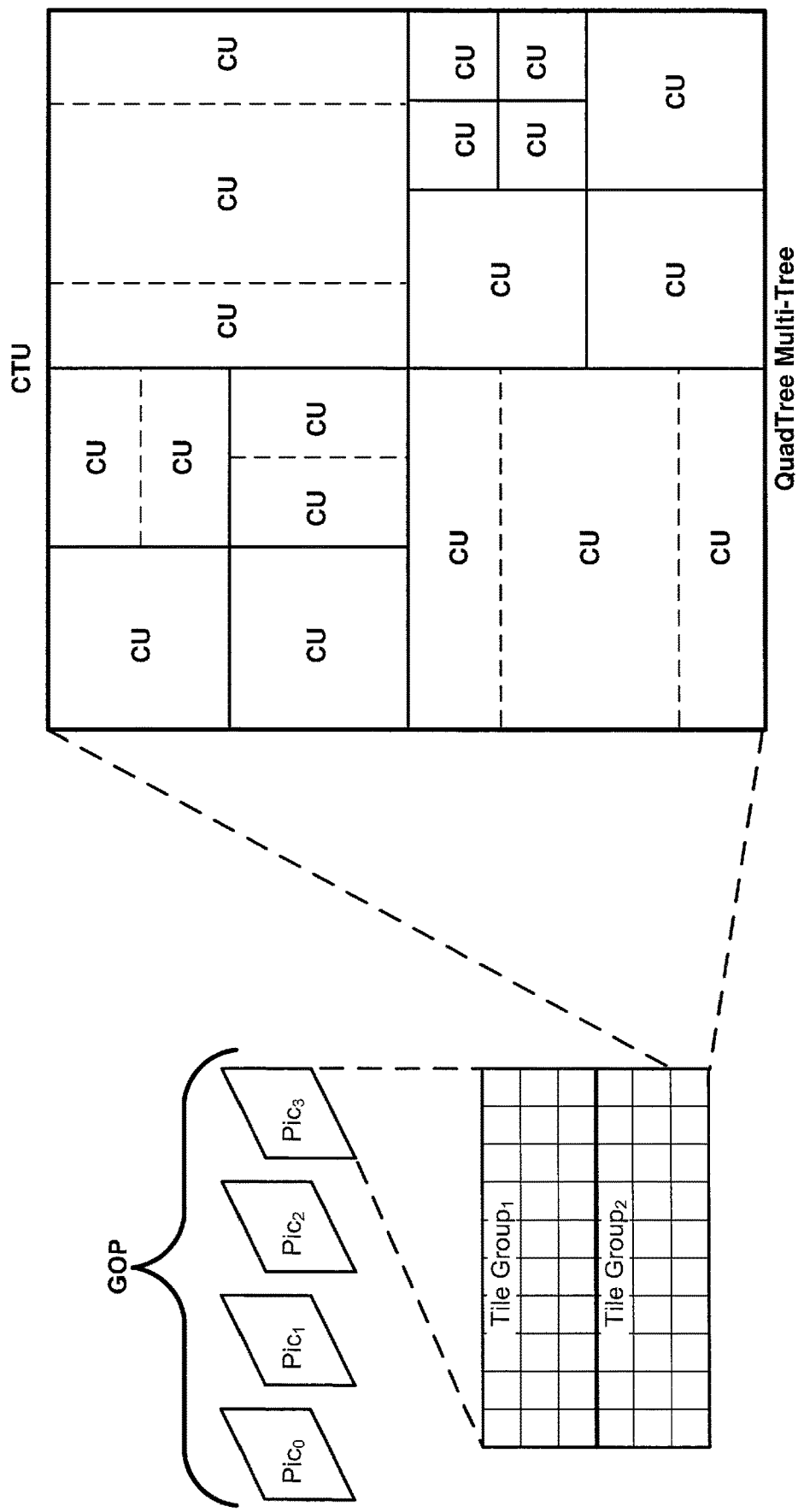
FIG. 1 is a conceptual diagram illustrating an example of a group of pictures coded according to a quad tree multi tree partitioning in accordance with one or more techniques of this disclosure.

In general, this disclosure describes various techniques for coding video data. In particular, this disclosure describes techniques for performing deblocking of reconstructed video data. In particular, this disclosure describes techniques for performing deblocking in cases where one or more video blocks are coded according to an intra sub-partition coding mode. Performing deblocking according to the techniques described herein may be particularly useful for reducing visual artifacts in cases where one or more video blocks are coded according to intra sub-partition coding mode, which improves video coder performance. It should be noted that although techniques of this disclosure are described with respect to ITU-T H.264, ITU-T H.265, JEM, and JVET-M1001, the techniques of this disclosure are generally applicable to video coding. For example, the coding techniques described herein may be incorporated into video coding systems, (including video coding systems based on future video coding standards) including video block structures, intra prediction techniques, inter prediction techniques, transform techniques, filtering techniques, and/or entropy coding techniques other than those included in ITU-T H.265, JEM, and JVET-M1001. Thus, reference to ITU-T H.264, ITU-T H.265, JEM, and/or JVET-M1001 is for descriptive purposes and should not be construed to limit the scope of the techniques described herein. Further, it should be noted that incorporation by reference of documents herein is for descriptive purposes and should not be construed to limit or create ambiguity with respect to terms used herein. For example, in the case where an incorporated reference provides a different definition of a term than another incorporated reference and/or as the term is used herein, the term should be interpreted in a manner that broadly includes each respective definition and/or in a manner that includes each of the particular definitions in the alternative.

In one example, a method of filtering reconstructed video data comprises receiving an array of sample values including adjacent reconstructed video blocks for a component of video data, determining a boundary strength value for a boundary between the adjacent reconstructed video blocks, wherein the boundary is an intra subpartition boundary, and modifying sample values in the adjacent reconstructed video blocks based on the determined boundary strength value and according to a deblocking filter.

In one example, a device for video coding comprises one or more processors configured to receive an array of sample values including adjacent reconstructed video blocks for a component of video data, determine a boundary strength value for a boundary between the adjacent reconstructed video blocks, wherein the boundary is an intra sub-partition boundary, and modify sample values in the adjacent reconstructed video blocks based on the determined boundary strength value and according to a deblocking filter.

In one example, a non-transitory computer-readable storage medium comprises instructions stored thereon that, when executed, cause one or more processors of a device to receive an array of sample values including adjacent reconstructed video blocks for a component of video data, determine a boundary strength value for a boundary between the adjacent reconstructed video blocks, wherein the boundary is an intra subpartition boundary, and modify sample values in the adjacent reconstructed video blocks based on the determined boundary strength value and according to a deblocking filter.

In one example, an apparatus comprises means for receiving an array of sample values including adjacent reconstructed video blocks for a component of video data, means for determining a boundary strength value for a boundary between the adjacent reconstructed video blocks, wherein the boundary is an intra sub-partition boundary, and means for modifying sample values in the adjacent reconstructed video blocks based on the determined boundary strength value and according to a deblocking filter.

The details of one or more examples are set forth in the accompanying drawings and the description below. Other features, objects, and advantages will be apparent from the description and drawings, and from the claims.

Figure 3:
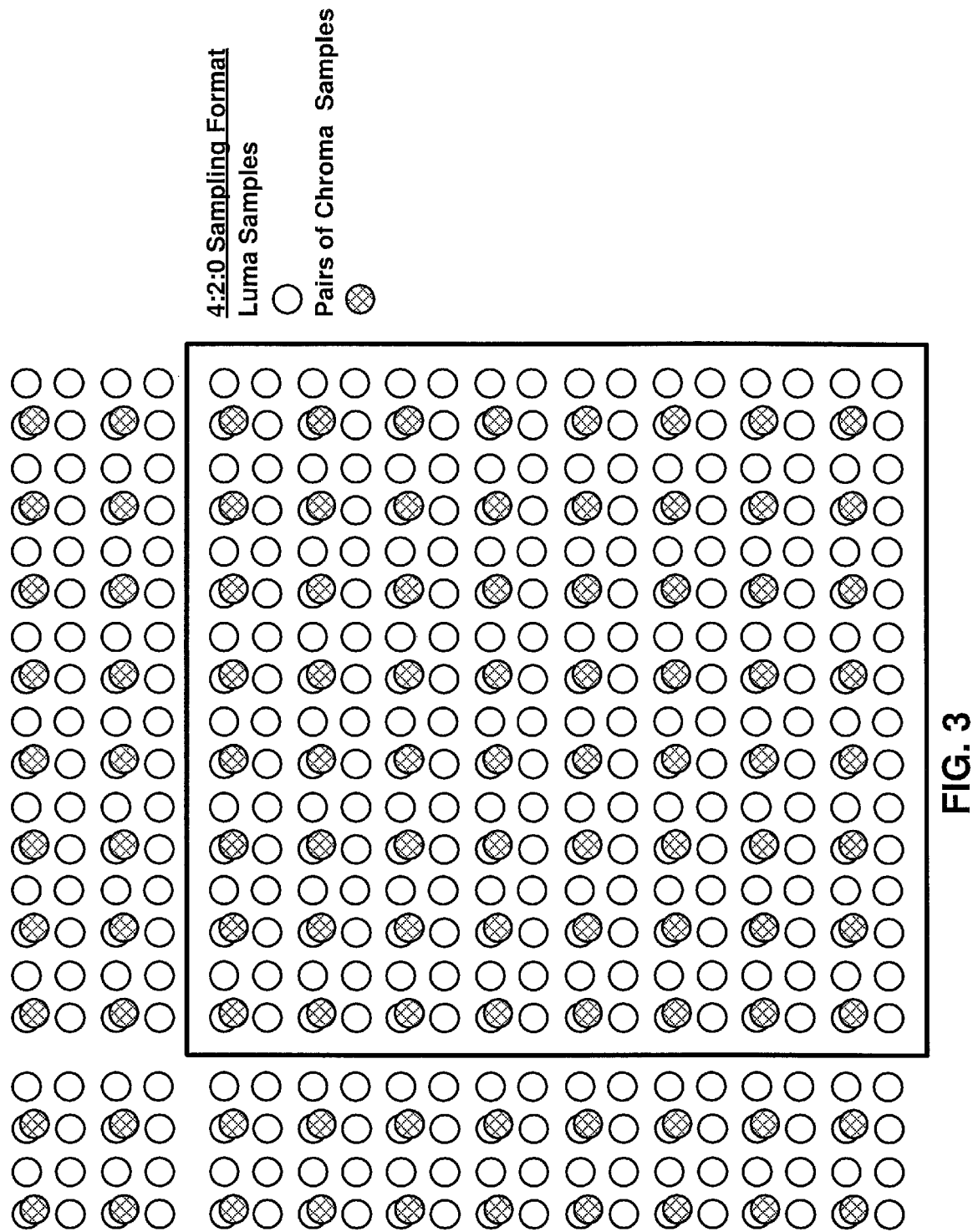
FIG. 3 is a conceptual diagram illustrating an example of a video component sampling format that may be utilized in accordance with one or more techniques of this disclosure.

Video content typically includes video sequences comprised of a series of frames (or pictures). A series of frames may also be referred to as a group of pictures (GOP). Each video frame or picture may divided into one or more regions. Regions may be defined according to a base unit (e.g., a video block) and sets of rules defining a region (e.g., a region must be an integer number of video blocks arranged in a rectangle). As used herein, the term video block may generally refer to an area of a picture or may more specifically refer to the largest array of sample values that may be predictively coded, sub-divisions thereof, and/or corresponding structures. Further, the term current video block may refer to an area of a picture being encoded or decoded. A video block may be defined as an array of sample values that may be predictively coded. It should be noted that in some cases pixel values may be described as including sample values for respective components of video data, which may also be referred to as color components, (e.g., luma (Y) and chroma (Cb and Cr) components or red, green, and blue components). It should be noted that in some cases, the terms pixel value and sample value are used interchangeably. Further, in some cases, a pixel or sample may be referred to as a pel. A video sampling format, which may also be referred to as a chroma format, may define the number of chroma samples included in a video block with respect to the number of luma samples included in a video block. For example, for the 4:2:0 sampling format, the sampling rate for the luma component is twice that of the chroma components for both the horizontal and vertical directions. As a result, for a video block formatted according to the 4:2:0 format, the width and height of an array of samples for the luma component are twice that of each array of samples for the chroma components. FIG. 3 is a conceptual diagram illustrating an example of a 16×16 video block formatted according to a 4:2:0 sample format. FIG. 3 illustrates the relative position of chroma samples with respect to luma samples within a video block. A video block is typically defined according to the number of horizontal and vertical luma samples. Thus, as illustrated in FIG. 3, a 16×16 video block formatted according to the 4:2:0 sample format includes 16×16 samples of luma components and 8×8 samples for each chroma component. For a video block formatted according to the 4:2:2 format, the width of an array of samples for the luma component is twice that of the width of an array of samples for each chroma component, but the height of the array of samples for the luma component is equal to the height of an array of samples for each chroma component. Further, for a video block formatted according to the 4:4:4 format, an array of samples for the luma component has the same width and height as an array of samples for each chroma component.

Video blocks may be ordered within a picture according to a scan pattern (e.g., a raster scan). A video encoder may perform predictive encoding on video blocks and sub-divisions thereof. Video blocks and sub-divisions thereof may be referred to as nodes. ITU-T H.264 specifies a macroblock including 16×16 luma samples. That is, in ITU-T H.264, a picture is segmented into macroblocks. ITU-T H.265 specifies an analogous Coding Tree Unit (CTU) structure (which may be referred to as a largest coding unit (LCU)). In ITU-T H.265, pictures are segmented into CTUs. In ITU-T H.265, for a picture, a CTU size may be set as including 16×16, 32×32, or 64×64 luma samples. In ITU-T H.265, a CTU is composed of respective Coding Tree Blocks (CTB) for each component of video data (e.g., luma (Y) and chroma (Cb and Cr). It should be noted that video having one luma component and the two corresponding chroma components may be described as having two channels, i.e., a luma channel and a chroma channel. Further, in ITU-T H.265, a CTU may be partitioned according to a quadtree (QT) partitioning structure, which results in the CTBs of the CTU being partitioned into Coding Blocks (CB). That is, in ITU-T H.265, a CTU may be partitioned into quadtree leaf nodes. According to ITU-T H.265, one luma CB together with two corresponding chroma CBs and associated syntax elements are referred to as a coding unit (CU). In ITU-T H.265, a minimum allowed size of a CB may be signaled. In ITU-T H.265, the smallest minimum allowed size of a luma CB is 8×8 luma samples. In ITU-T H.265, the decision to code a picture area using intra prediction or inter prediction is made at the CU level.

In ITU-T H.265, a CU is associated with a prediction unit (PU) structure having its root at the CU. In ITU-T H.265, PU structures allow luma and chroma CBs to be split for purposes of generating corresponding reference samples. That is, in ITU-T H.265, luma and chroma CBs may be split into respective luma and chroma prediction blocks (PBs), where a PB includes a block of sample values for which the same prediction is applied. In ITU-T H.265, a CB may be partitioned into 1, 2, or 4 PBs. ITU-T H.265 supports PB sizes from 64×64 samples down to 4×4 samples. In ITU-T H.265, square PBs are supported for intra prediction, where a CB may form the PB or the CB may be split into four square PBs. In ITU-T H.265, in addition to the square PBs, rectangular PBs are supported for inter prediction, where a CB may by halved vertically or horizontally to form PBs. Further, it should be noted that in ITU-T H.265, for inter prediction, four asymmetric PB partitions are supported, where the CB is partitioned into two PBs at one quarter of the height (at the top or the bottom) or width (at the left or the right) of the CB. Intra prediction data (e.g., intra prediction mode syntax elements) or inter prediction data (e.g., motion data syntax elements) corresponding to a PB is used to produce reference and/or predicted sample values for the PB.

As described above, each video frame or picture may divided into one or more regions. For example, according to ITU-T H.265, each video frame or picture may be partitioned to include one or more slices and further partitioned to include one or more tiles, where each slice includes a sequence of CTUs (e.g., in raster scan order) and where a tile is a sequence of CTUs corresponding to a rectangular area of a picture. It should be noted that a slice, in ITU-T H.265, is a sequence of one or more slice segments starting with an independent slice segment and containing all subsequent dependent slice segments (if any) that precede the next independent slice segment (if any) within the same access unit. A slice segment, like a slice, is a sequence of CTUs. Thus, in some cases, the terms slice and slice segment may be used interchangeably to indicate a sequence of CTUs arranged in a raster scan order. Further, it should be noted that in ITU-T H.265, a tile may consist of CTUs contained in more than one slice and a slice may consist of CTUs contained in more than one tile. However, ITU-T H.265 provides that one or both of the following conditions shall be fulfilled: (1) All CTUs in a slice belong to the same tile; and (2) All CTUs in a tile belong to the same slice. With respect to JVET-M1001, slices are required to consist of an integer number of complete tiles instead of only being required to consist of an integer number of complete CTUs. As such, a slice including a set of CTUs which do not form a rectangular region of a picture may or may not be supported in some video coding techniques. Further, a slice that is required to consist of an integer number of complete tiles is referred to as a tile group. The techniques described herein may applicable to slices, tiles, and/or tile groups. FIG. 1 is a conceptual diagram illustrating an example of a group of pictures including tile groups. In the example illustrated in FIG. 1, $Pic_3$ is illustrated as including two tile groups (i.e., Tile Group$_1$ and Tile Group$_2$). It should be noted that in some cases, Tile Group$_1$ and Tile Group$_2$ may be classified as slices and/or tiles.

JEM specifies a CTU having a maximum size of 256×256 luma samples. JEM specifies a quadtree plus binary tree (QTBT) block structure. In JEM, the QTBT structure enables quadtree leaf nodes to be further partitioned by a binary tree (BT) structure. That is, in JEM, the binary tree structure enables quadtree leaf nodes to be recursively divided vertically or horizontally. In JVET-M1001, CTUs are partitioned according a quadtree plus multi-type tree (QTMT) structure. The QTMT in JVET-M1001 is similar to the QTBT in JEM. However, in JVET-M1001, in addition to indicating binary splits, the multi-type tree may indicate so-called ternary (or triple tree (TT)) splits. A ternary split divides a block vertically or horizontally into three blocks. In the case of a vertical TT split, a block is divided at one quarter of its width from the left edge and at one quarter its width from the right edge and in the case of a horizontal TT split a block is at one quarter of its height from the top edge and at one quarter of its height from the bottom edge. Referring again to FIG. 1, FIG. 1 illustrates an example of a CTU being partitioned into quadtree leaf nodes and quadtree leaf nodes being further partitioned according to a BT split or a TT split. That is, in FIG. 1 dashed lines indicate additional binary and ternary splits in a quadtree.

For intra prediction coding, an intra prediction mode may specify the location of reference samples within a picture. In ITU-T H.265, defined possible intra prediction modes include a planar (i.e., surface fitting) prediction mode, a DC (i.e., flat overall averaging) prediction mode, and 33 angular prediction modes (predMode: 2-34). In JEM, defined possible intra-prediction modes include a planar prediction mode, a DC prediction mode, and 65 angular prediction modes. It should be noted that planar and DC prediction modes may be referred to as non-directional prediction modes and that angular prediction modes may be referred to as directional prediction modes. It should be noted that the techniques described herein may be generally applicable regardless of the number of defined possible prediction modes.

For inter prediction coding, one or more previously decoded pictures, i.e., a reference picture is determined and a motion vector (MV) identifies samples in the reference picture that are used to generate a prediction for a current video block. For example, a current video block may be predicted using reference sample values located in one or more previously coded picture(s) and a motion vector is used to indicate the location of the reference block relative to the current video block. A motion vector may describe, for example, a horizontal displacement component of the motion vector (i.e., MV$_x$), a vertical displacement component of the motion vector (i.e., MV$_y$), and a resolution for the motion vector (e.g., one-quarter pixel precision, one-half pixel precision, one-pixel precision, two-pixel precision, four-pixel precision). Previously decoded pictures, which may include pictures output before or after a current picture, may be organized into one or more to reference pictures lists and identified using a reference picture index value. Further, in inter prediction coding, uni-prediction refers to generating a prediction using sample values from a single reference picture and bi-prediction refers to generating a prediction using respective sample values from two reference pictures. That is, in uni-prediction, a single reference picture and corresponding motion vector are used to generate a prediction for a current video block and in bi-prediction, a first reference picture and corresponding first motion vector and a second reference picture and corresponding second motion vector are used to generate a prediction for a current video block. In bi-prediction, respective sample values are combined (e.g., added, rounded, and clipped, or averaged according to weights) to generate a prediction. Pictures and regions thereof may be classified based on which types of prediction modes may be utilized for encoding video blocks thereof. That is, for regions having a B type (e.g., a B tile group), bi-prediction, uni-prediction, and intra prediction modes may be utilized, for regions having a P type (e.g., a P tile group), uni-prediction, and intra prediction modes may be utilized, and for regions having an I type (e.g., an I tile group), only intra prediction modes may be utilized. As described above, reference pictures are identified through reference indices. For example, for a P tile, there may be a single reference picture list, RefPicList0 and for a B tile, there may be a second independent reference picture list, RefPicList1, in addition to RefPicList0. It should be noted that for uni-prediction in a B tile group, one of RefPicList0 or RefPicList1 may be used to generate a prediction. Further, it should be noted that during the decoding process, at the onset of decoding a picture, reference picture list(s) are generated from previously decoded picture stored in a decoded picture buffer (DPB).

Further, a coding standard may support various modes of motion vector prediction. Motion vector prediction enables the value of a motion vector for a current video block to be derived based on another motion vector. For example, a set of candidate blocks having associated motion information may be derived from spatial neighboring blocks and temporal neighboring blocks to the current video block. Further, generated (or default) motion information may be used for motion vector prediction. Examples of motion vector prediction include advanced motion vector prediction (AMVP), temporal motion vector prediction (TMVP), so-called "merge" mode, and "skip" and "direct" motion inference. Further, other examples of motion vector prediction include advanced temporal motion vector prediction (ATMVP) and Spatial-temporal motion vector prediction (STMVP). For motion vector prediction, both a video encoder and video decoder perform the same process to derive a set of candidates. Thus, for a current video block, the same set of candidates is generated during encoding and decoding. For a merge mode, all motion information (i.e., motion vector displacement values, reference picture indices, and reference picture lists) associated with a selected candidate is inherited as the motion information for the current video block. That is, at a video encoder, a candidate block is selected from the derived set of candidates and an index value included in the bitstream may indicate the selected candidate and thus, the motion information for the current video block. For a non-merge mode, motion vector information for a selected candidate may be used as a motion vector predictor (MVP) for the motion vector of the current video block. That is, at a video encoder, a candidate block is selected from the derived set of candidates and an index value indicating the selected candidate and a delta value (i.e., a motion vector delta (MVD)) indicating the difference between the motion vector predictor and the motion vector for the current PB may be included in the bitstream. Further, for a non-merge mode, syntax elements identifying a reference picture are included in the bitstream.

As described above, intra prediction data or inter prediction data is used to produce reference sample values for a block of sample values. The difference between sample values included in a current PB, or another type of picture area structure, and associated reference samples (e.g., those generated using a prediction) may be referred to as residual data. Residual data may include respective arrays of difference values corresponding to each component of video data. Residual data may be in the pixel domain. A transform, such as, a discrete cosine transform (DCT), a discrete sine transform (DST), an integer transform, a wavelet transform, or a conceptually similar transform, may be applied to an array of difference values to generate transform coefficients. It should be noted that in ITU-T H.265 and JVET-M1001, a CU is associated with a transform unit (TU) structure having its root at the CU level. That is, an array of difference values may be partitioned for purposes of generating transform coefficients (e.g., four 8×8 transforms may be applied to a 16×16 array of residual values). For each component of video data, such sub-divisions of difference values may be referred to as Transform Blocks (TBs). It should be noted that in some cases, a core transform and a subsequent secondary transforms may be applied (in the video encoder) to generate transform coefficients. For a video decoder, the order of transforms is reversed. It should be noted that in JVET-M1001, a coding unit included in a P or B tile group may be coded according to a CU skip mode, where when the CU skip mode is indicated, the coding unit is coded according to subset of motion vector prediction modes and the coding unit is coded from the prediction directly, i.e., residual data is not used to code the video block.

A quantization process may be performed on transform coefficients or residual sample values directly (e.g., in the case, of palette coding quantization). Quantization approximates transform coefficients by amplitudes restricted to a set of specified values. Quantization essentially scales transform coefficients in order to vary the amount of data required to represent a group of transform coefficients. Quantization may include division of transform coefficients (or values resulting from the addition of an offset value to transform coefficients) by a quantization scaling factor and any associated rounding functions (e.g., rounding to the nearest integer). Quantized transform coefficients may be referred to as coefficient level values. Inverse quantization (or "dequantization") may include multiplication of coefficient level values by the quantization scaling factor, and any reciprocal rounding or offset addition operations. It should be noted that as used herein the term quantization process in some instances may refer to division by a scaling factor to generate level values and multiplication by a scaling factor to recover transform coefficients in some instances. That is, a quantization process may refer to quantization in some cases and inverse quantization in some cases. Further, it should be noted that although in some of the examples below quantization processes are described with respect to arithmetic operations associated with decimal notation, such descriptions are for illustrative purposes and should not be construed as limiting. For example, the techniques described herein may be implemented in a device using binary operations and the like. For example, multiplication and division operations described herein may be implemented using bit shifting operations and the like.

Quantized transform coefficients and syntax elements (e.g., syntax elements indicating a coding structure for a video block) may be entropy coded according to an entropy coding technique. An entropy coding process includes coding values of syntax elements using lossless data compression algorithms. Examples of entropy coding techniques include content adaptive variable length coding (CAVLC), context adaptive binary arithmetic coding (CABAC), probability interval partitioning entropy coding (PIPE), and the like. Entropy encoded quantized transform coefficients and corresponding entropy encoded syntax elements may form a compliant bitstream that can be used to reproduce video data at a video decoder. An entropy coding process, for example, CABAC, may include performing a binarization on syntax elements. Binarization refers to the process of converting a value of a syntax element into a series of one or more bits. These bits may be referred to as "bins." Binarization may include one or a combination of the following coding techniques: fixed length coding, unary coding, truncated unary coding, truncated Rice coding, Golomb coding, k-th order exponential Golomb coding, and Golomb-Rice coding. For example, binarization may include representing the integer value of 5 for a syntax element as 00000101 using an 8-bit fixed length binarization technique or representing the integer value of 5 as 11110 using a unary coding binarization technique. As used herein each of the terms fixed length coding, unary coding, truncated unary coding, truncated Rice coding, Golomb coding, k-th order exponential Golomb coding, and Golomb-Rice coding may refer to general implementations of these techniques and/or more specific implementations of these coding techniques. For example, a Golomb-Rice coding implementation may be specifically defined according to a video coding standard. In the example of CABAC, for a particular bin, a context provides a most probable state (MPS) value for the bin (i.e., an MPS for a bin is one of 0 or 1) and a probability value of the bin being the MPS or the least probably state (LPS). For example, a context may indicate, that the MPS of a bin is 0 and the probability of the bin being 1 is 0.3. It should be noted that a context may be determined based on values of previously coded bins including bins in the current syntax element and previously coded syntax elements. For example, values of syntax elements associated with neighboring video blocks may be used to determine a context for a current bin.

With respect to the equations used herein, the following arithmetic operators may be used:

+ Addition

− Subtraction

Multiplication, including matrix multiplication $x^y$ Exponentiation. Specifies x to the power of y. In other contexts, such notation is used for superscripting not intended for interpretation as exponentiation.

/ Integer division with truncation of the result toward zero. For example, 7/4 and −7/−4 are truncated to 1 and −7/4 and 7/−4 are truncated to −1.

÷ Used to denote division in mathematical equations where no truncation or rounding is intended.

$$\frac{x}{y}$$

Used to denote division in mathematical equations where no truncation or rounding is intended.

x % y Modulus. Remainder of x divided by y, defined only for integers x and y with x>=0 and y>0.

Further, the following logical operators may be used:

x && y Boolean logical "and" of x and y x||y Boolean logical "or" of x and y

! Boolean logical "not"

x ? y:z If x is TRUE or not equal to 0, evaluates to the value of y; otherwise, evaluates to the value of z.

Further, the following relational operators may be used:
> Greater than
>= Greater than or equal to
< Less than
<= Less than or equal to
== Equal to
!= Not equal to
Further, the following bit-wise operators may be used:
& Bit-wise "and". When operating on integer arguments, operates on a two's complement representation of the integer value. When operating on a binary argument that contains fewer bits than another argument, the shorter argument is extended by adding more significant bits equal to 0.
| Bit-wise "or". When operating on integer arguments, operates on a two's complement representation of the integer value. When operating on a binary argument that contains fewer bits than another argument, the shorter argument is extended by adding more significant bits equal to 0.
∧ Bit-wise "exclusive or". When operating on integer arguments, operates on a two's complement representation of the integer value. When operating on a binary argument that contains fewer bits than another argument, the shorter argument is extended by adding more significant bits equal to 0.
x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.
x<<y Arithmetic left shift of a two's complement integer representation of x by y binary digits. This function is defined only for non-negative integer values of y. Bits shifted into the least significant bits (LSBs) as a result of the left shift have a value equal to 0.
Further, the following assignment operators may be used:
= Assignment operator
++ Increment, i.e., x++ is equivalent to x=x+1; when used in an array index, evaluates to the value of the variable prior to the increment operation.
−− Decrement, i.e., x−− is equivalent to x=x−1; when used in an array index, evaluates to the value of the variable prior to the decrement operation.
+= Increment by amount specified, i.e., x+=3 is equivalent to x=x+3, and x+=(−3) is equivalent to x=x+(−3).
−=Decrement by amount specified, i.e., x−=3 is equivalent to x=x−3, and x−=(−3) is equivalent to x=x−(−3).
Further, the following defined mathematical functions may be used:

$$Abs(x) = \begin{cases} x; & x >= 0 \\ -x; & x < 0 \end{cases}$$

$Clip1_Y(x) = Clip3(0, (1 << BitDepth_Y) - 1, x)$ $Clip1_C(x) = Clip3(0, (1 << BitDepth_C) - 1, x)$ $$Clip3(x, y, z) = \begin{cases} x; & z < x \\ y; & z > y \\ z; & otherwise \end{cases}$$

Floor(x) the largest integer less than or equal to x.

Log2(x) the base-2 logarithm of x.

$$Min(x, y) = \begin{cases} x; & x <= y \\ y; & x > y \end{cases}$$

$$Max(x, y) = \begin{cases} x; & x >= y \\ y; & x < y \end{cases}$$

Figure 2A:
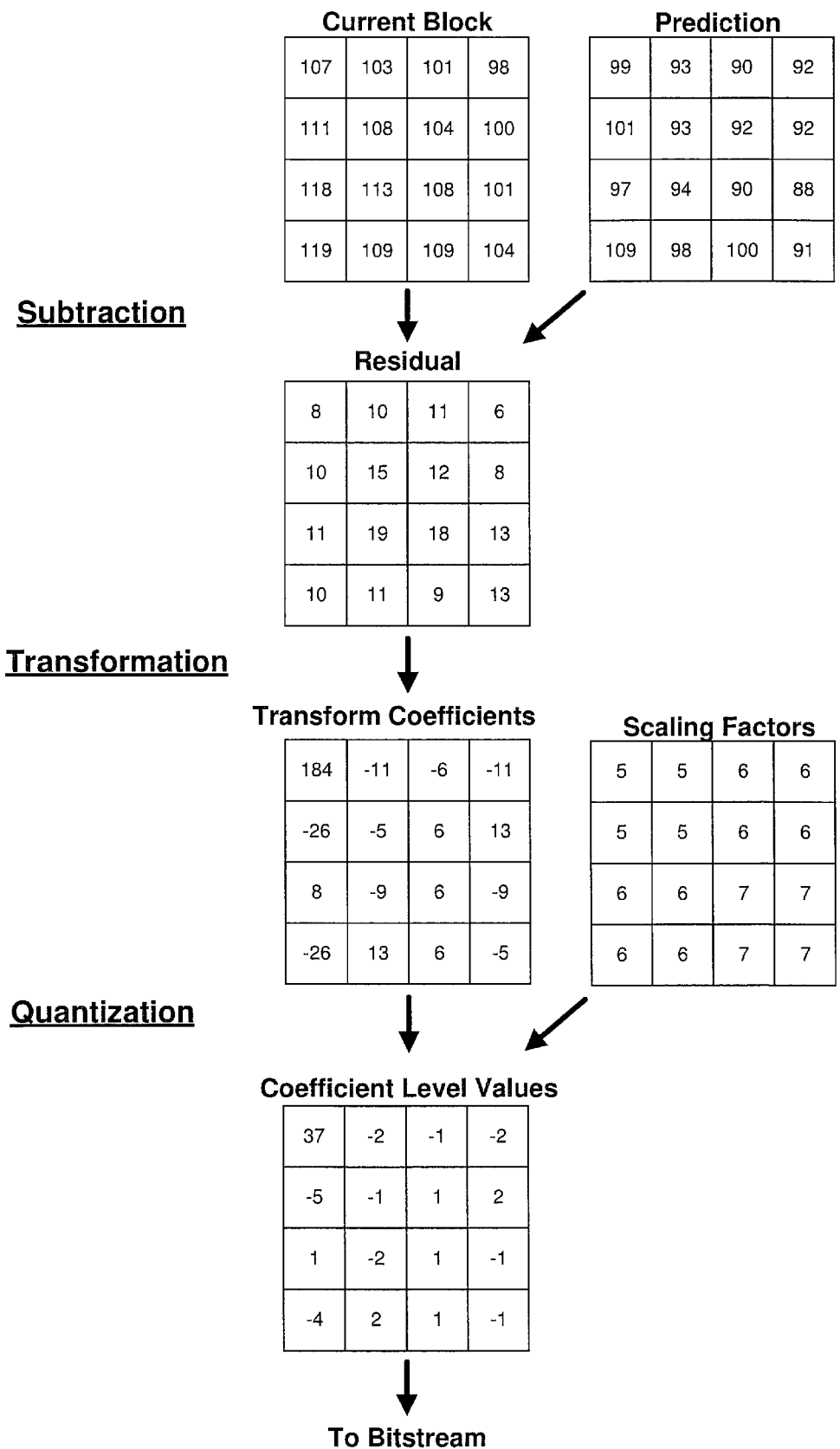
FIG. 2A is a conceptual diagram illustrating examples of coding a block of video data in accordance with one or more techniques of this disclosure.
Figure 2B:
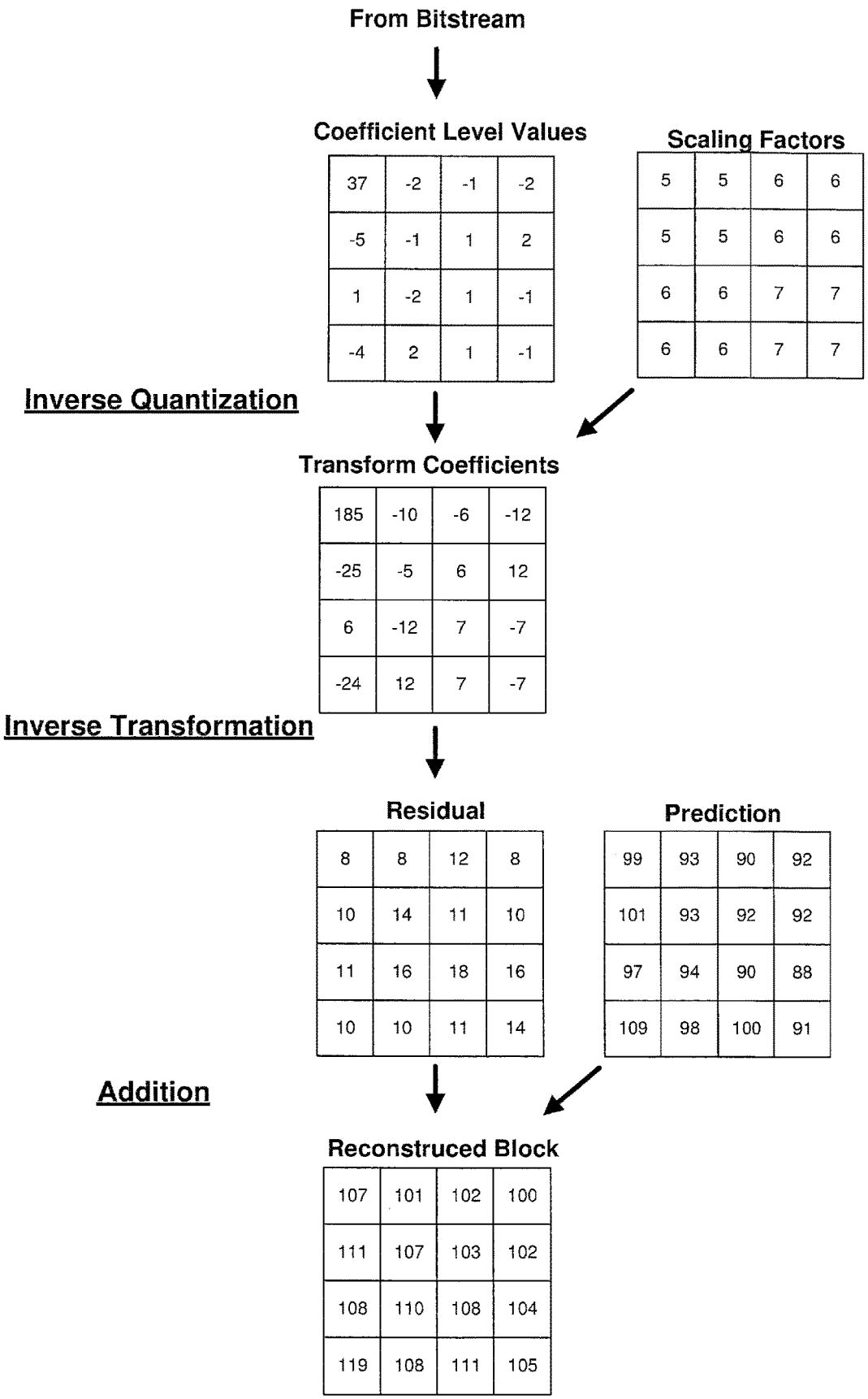
FIG. 2B is a conceptual diagram illustrating examples of coding a block of video data in accordance with one or more techniques of this disclosure.

FIGS. 2A-2B are conceptual diagrams illustrating examples of coding a block of video data. As illustrated in FIG. 2A, a current block of video data (e.g., a CB corresponding to a video component) is encoded by generating a residual by subtracting a set of prediction values from the current block of video data, performing a transformation on the residual, and quantizing the transform coefficients to generate level values. The level values are coded into a bitstream. As illustrated in FIG. 2B, the current block of video data is decoded by performing inverse quantization on level values, performing an inverse transform, and adding a set of prediction values to the resulting residual. It should be noted that in the examples in FIGS. 2A-2B, the sample values of the reconstructed block differs from the sample values of the current video block that is encoded. In this manner, coding may said to be lossy. However, the difference in sample values may be considered acceptable or imperceptible to a viewer of the reconstructed video.

Further, as illustrated in FIGS. 2A-2B, coefficient level values are generated using an array of scaling factors. In ITU-T H.265, an array of scaling factors is generated by selecting a scaling matrix and multiplying each entry in the scaling matrix by a quantization scaling factor. In ITU-T H.265, a scaling matrix is selected based in part on a prediction mode and a color component, where scaling matrices of the following sizes are defined: 4×4, 8×8, 16×16, and 32×32. It should be noted that in some examples, a scaling matrix may provide the same value for each entry (i.e., all coefficients are scaled according to a single value). The value of a quantization scaling factor, may be determined by a quantization parameter, QP. In ITU-T H.265, for a bit-depth of 8-bits, the QP can take 52 values from 0 to 51 and a change of 1 for QP generally corresponds to a change in the value of the quantization scaling factor by approximately 12%. Further, in ITU-T H.265, a QP value for a set of transform coefficients may be derived using a predictive quantization parameter value (which may be referred to as a predictive QP value or a QP predictive value) and an optionally signaled quantization parameter delta value (which may be referred to as a QP delta value or a delta QP value). In ITU-T H.265, a quantization parameter may be updated for each CU and a respective quantization parameter may be derived for each of the luma and chroma channels.

As described above, quantization may be realized through division of transform coefficients by a scaling factor and further may be used in order to vary the amount of data required to represent a group of transform coefficients. That is, increasing the scaling factor (or degree of quantization) reduces the amount of data required to represent a group coefficients. It should be noted that as the degree of quantization increases (e.g., transform coefficients are divided by a larger scaling factor value), the amount of distortion may be increased (e.g., reconstructed video data may appear more "blocky" to a user). In some cases, blocking artifacts may cause block boundaries (e.g., coding block, transform block, prediction block, subblocks, etc.) of reconstructed video data to be visually perceptible to a user. In order to reduce blocking artifacts, reconstructed sample values may be modified to minimize artifacts introduced by the video coding process. Such modifications may generally be referred to as filtering. It should be noted that filtering may occur as part of an in-loop filtering process or a post-loop filtering process. For an in-loop filtering process, the resulting sample values of a filtering process may be used for predictive video blocks (e.g., stored to a reference frame buffer for subsequent encoding at a video encoder and subsequent decoding at a video decoder). For a post-loop filtering process the resulting sample values of a filtering process are merely output as part of the decoding process (e.g., not used for subsequent coding). For example, for an in-loop filtering process, the sample values resulting from filtering a reconstructed block would be used for subsequent decoding (e.g., stored to a reference buffer) and would be output (e.g., to a display). For a post-loop filtering process, the reconstructed block without modification would be used for subsequent decoding and the sample values resulting from filtering the reconstructed block would be output.

Deblocking (or de-blocking), deblock filtering, performing deblocking, or applying a deblocking filter refers to the process of smoothing video block boundaries with neighboring reconstructed video blocks (i.e., making boundaries less perceptible to a viewer). Smoothing the boundaries of neighboring reconstructed video blocks may include modifying sample values included in rows or columns adjacent to a boundary. JVET-M1001 provides where a deblocking filter is applied to reconstructed sample values as part of an in-loop filtering process. It should be noted, that it may be useful to generally describe a deblocking filter according to a set of filter parameters. For example, for a set of sample values {a . . . b} included in a row or column, a corresponding deblocked sample value, y[n] may be specified based on the following equation:

$$y[n] = \sum_{m=a}^{b} coeff[m]x[n+m]$$

Where,

A filter length is determined as abs(a−b+1);

coeff[m] provides a filter tap value (also referred to as a filter coefficient). For example, for {a . . . b}={0 . . . 4}, a set of tap values may be {1, 2, 3, 2, 1};

x[n+m] provides input sample values corresponding to support samples, it should be noted that the support size may be greater than or equal to the filter length.

It should be noted that the set of filter tap values coeff[m] may depend on n, where n may correspond to set of locations for a line of samples being deblocked in a set, say {c . . . d}, where number of entries in {c . . . d} correspond to a number of samples being deblocked/modified. The line of samples may be perpendicular to the edge/boundary being deblocked.

Figure 4A:
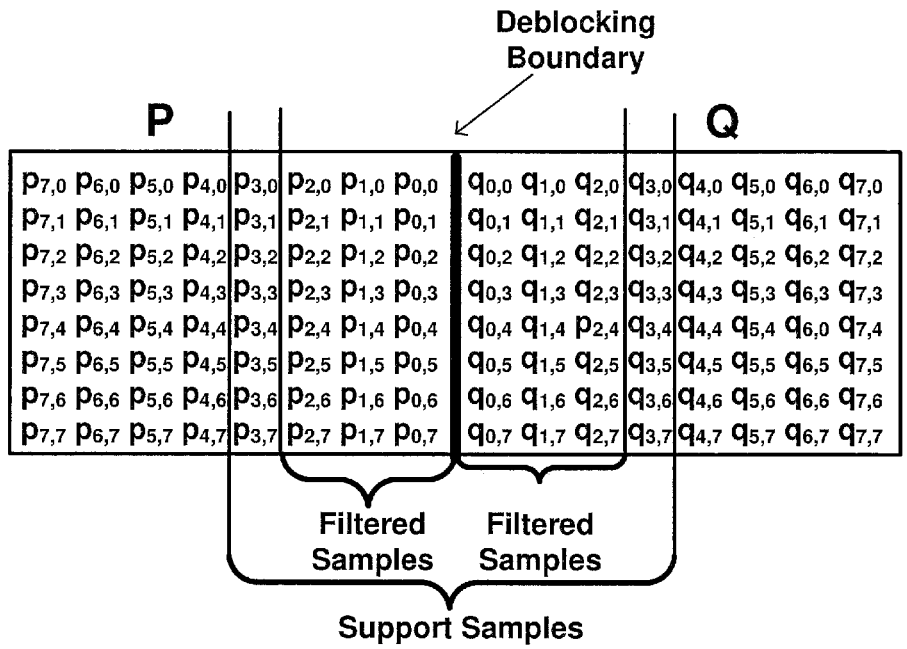
FIG. 4A is a conceptual diagram illustrating blocks of video data including a deblocking boundary in accordance with one or more techniques of this disclosure.
Figure 4B:
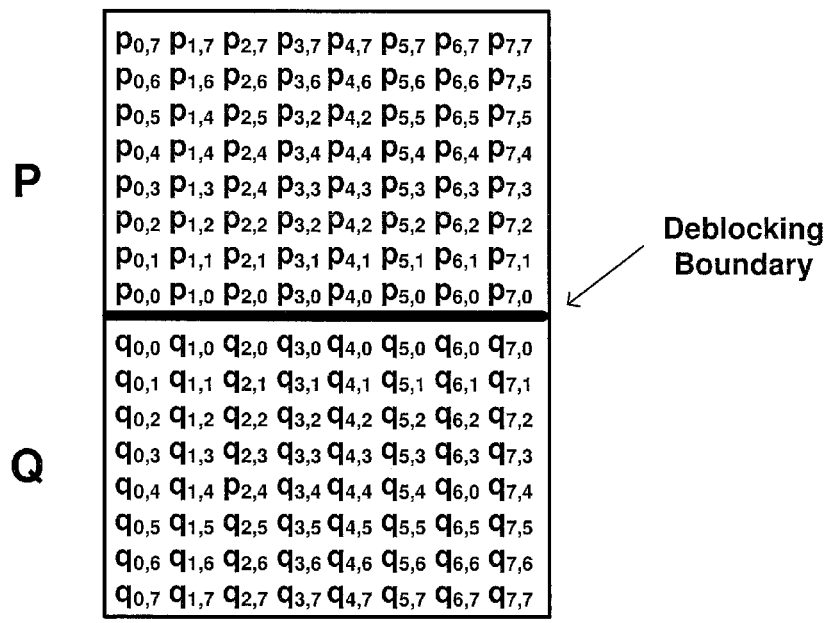
FIG. 4B is a conceptual diagram illustrating blocks of video data including a deblocking boundary in accordance with one or more techniques of this disclosure.

FIGS. 4A-4B illustrate sample values included in video blocks P and Q having a boundary. As used herein, video blocks P and Q are used to refer to adjacent video blocks having a block boundary at which deblocking may be applied. The manner in which sample values are modified may be based on defined filters, where $p_i$ and $q_i$ represent respective sample values in a column for a vertical boundary and sample values in a row for a horizontal boundary and $p_i'$ and $q_i'$ represent modified sample values. Defined filters may define samples that are to be modified (or filtered) and samples that are used to determine how samples are to be modified. For example, as illustrated in FIG. 4A, in one example, samples values in each of the first three columns adjacent to the deblocking boundary may be modified (illustrated as filtered samples) based on sample values includes in the each of the first four columns adjacent to the deblocking boundary (illustrated as support samples).

VET-M1001 defines a so-called, strong filter, which modifies sample values in the three adjacent rows or columns to a boundary, a so-called weak filter which modifies sample values in the immediately adjacent row or column to a boundary and conditionally modifies sample values in the second row or column from the boundary, and a so-called chroma filter which modifies sample values in the immediately adjacent row or column to a boundary. Equations for modifying sample values according to the strong filter, weak filter, and chroma filter are provided below.

Strong Filter $$p_0'=Clip3(p_0-2*t_C,p_0+2*t_C,(p_2+2*p_1+2*p_0+2*q_0+q_1+4)>>3)$$

$$p_1'=Clip3(p_1-2*t_C,p_1+2*t_C,(p_2+p_1+p_0+q_0+2)>>2)$$

$$p_2'=Clip3(p_2-2*t_C,p_2+2*t_C,(2*p_3+3*p_2+p_1+p_0+q_0+4)>>3)$$

$$q_0'=Clip3(q_0-2*t_C,q_0+2*t_C,(p_1+2*p_0+2*q_0+2*q_1+q_2+4)>>3)$$

$$q_1'=Clip3(q_1-2*t_C,q_1+2*t_C,(p_0+q_0+q_1+q_2+2)>>2)$$

$$q_2'=Clip3(q_2-2*t_C,q_2+2*t_C,(p_0+q_0+q_1+3*q_2+2*q_3+4)>>3)$$

Weak Filter $$\Delta=(9*(q_0-p_0)-3*(q_1-p_1)+8)>>4$$

When Abs($\Delta$) is less than $t_C*10$, the following ordered steps apply:

The filtered sample values $p_0'$ and $q_0'$ are specified as follows:

$$\Delta=Clip3(-t_C,t_C,\Delta)$$

$$p_0'=Clip1_Y(p_0+\Delta)$$

$$q_0'=Clip1_Y(q_0-\Delta)$$

Where $p_1$ and $q_1$ are conditionally modified, as follows:

$$\Delta p=Clip3(-(t_C>>1),t_C>>1,(((p_2+p_0+1)>>1)-p_1+\Delta)>>1)$$

$$\Delta q=Clip3(-(t_C>>1),t_C>>1,(((q_2+q_0+1)>>1)-q_1-\Delta)>>1)$$

$$p_1'=Clip1_Y(p_1+\Delta p)$$

$$q_1'=Clip1_Y(q_1+\Delta q)$$

Chroma Filter $$\Delta=Clip3(-t_C,t_C,((((q_0-p_0)>>2)+p_1-q_1+4)>>3))$$

$$p_0'=Clip1_C(p_0+\Delta)$$

$$q_0'=Clip1_C(q_0-\Delta)$$

"CE11.1.6, CE11.1.7 and CE11.1.8: Joint proposals for long deblocking from Sony, Qualcomm, Sharp, Ericsson" 13th Meeting of ISO/IEC JTC1/SC29/WG11 9-18 Jan. 2019, Marrakech, M A, document JVET-M0471, which is referred to herein as JVET-M0471, modifies the Strong Filter as follows:

$$t_CD_{0,2}=\{3,2,1\}$$

$p_0'=\text{Clip3}(p_0-t_CD[0]*t_C,p_0+t_CD[0]*t_C,(p_2+2*p_1+2*p_0+2*q_0+q_1+4)>>3)$ $p_1'=\text{Clip3}(p_1-t_CD[1]*t_C,p_1+t_CD[1]*t_C,(p_2+p_1+p_0+q_0+2)>>2)$ $p_2'=\text{Clip3}(p_2-t_CD[2]*t_C,p_2+t_CD[2]*t_C,(2*p_3+3*p_2+p_1+p_0+q_0+4)>>3)$ $q_0'=\text{Clip3}(q_0-t_CD[0]*t_C,q_0+t_CD[0]*t_C,(p_1+2*p_0+2*q_0+2*q_1+q_2+4)>>3)$ $q_1'=\text{Clip3}(q_1-t_CD[1]*t_C,q_1+t_CD[1]*t_C,(p_0+q_0+q_1+q_2+2)>>2)$ $q_2'=\text{Clip3}(q_2-t_CD[2]*t_C,q_2+t_CD[2]*t_C,(p_0+q_0+q_1+3*q_2+2*q_3+4)>>3)$ Further, JVET-M0471 defines a so-called luma long filter process as follows:
Inputs to this process are:
  the variables maxFilterLengthP and maxFilterLengthQ,
  the sample values $p_i$ and $q_j$ with $i=0 \ldots$ maxFilterLengthP and $j=0 \ldots$ maxFilterLengthQ,
  the locations of $p_i$ and $q_j$, $(xP_i, yP_i)$ and $(xQ_j, yQ_j)$ with $i=0 \ldots$ maxFilterLengthP-1 and $j=0 \ldots$ maxFilterLengthQ-1,
  a variable $t_C$.
Outputs of this process are:
  the filtered sample values $p_i'$ and $q_j'$ with $i=0 \ldots$ maxFilterLengthP-1, $j=0 \ldots$ maxFilterLengthQ-1.
The variables refMiddle, refP and refQ are derived as follows:
If maxFilterLengthP is equal to maxFilterLengthQ
If maxFilterLengthP is equal to 5

$\text{refMiddle}=(p_4+p_3+2*(p_2+p_1+p_0+q_0+q_1+q_2)+q_3+q_4+8)>>4$

Otherwise $\text{refMiddle}=(p_6+p_5+p_4+p_3+p_2+p_1+2*(p_0+q_0)+q_1+q_2+q_3+q_4+q_5+q_6+8)>>4$ Otherwise If ((maxFilterLengthQ is equal to 7 and maxFilterLengthP is equal to 5) or (maxFilterLengthQ is equal to 5 and maxFilterLengthP is equal to 7)

$\text{refMiddle}=(p_4+p_3+2*(p_2+p_1+p_0+q_0+q_1+q_2)+q_3+q_4+8)>>4$

Otherwise If ((maxFilterLengthQ is equal to 5 and maxFilterLengthP is equal to 3) or (maxFilterLengthQ is equal to 3 and maxFilterLengthP is equal to 5)

$\text{refMiddle}=(p_3+p_2+p_1+p_0+q_0+q_1+q_2+q_3+4)>>3$

Otherwise If ((maxFilterLengthQ is equal to 7 and maxFilterLengthP is equal to 3)

$\text{refMiddle}=(2*(p_2+p_1+p_0+q_0)+p_0+p_1+q_1+q_2+q_3+q_4+q_5+q_6+8)>>4$

Otherwise $\text{refMiddle}=(p_6+p_5+p_4+p_3+p_2+p_1+2*(q_2+q_1+q_0+p_0)+q_0+q_1+8)>>4$ $\text{refP}=(p_{\text{maxFilterLengthP}}+p_{\text{maxFilterLengthP-1}}+1)>>1$ $\text{refQ}=(q_{\text{maxFilterLengthQ}}+q_{\text{maxFilterLengthQ-1}}+1)>>1$ The variables $f_i$ and $t_C PD_i$ are defined as follows:
If maxFilterLengthP is equal to 7

$f_{0 \ldots 6}=\{59,50,41,32,23,14,5\}$ $t_C PD_{0 \ldots 4}=\{6,5,4,3,2,1,1\}$ Otherwise if maxFilterLengthP is equal to 5

$f_{0 \ldots 4}=\{58,45,32,19,6\}$ $t_C PD_{0 \ldots 4}=\{6,5,4,3,2\}$

Otherwise $f_{0 \ldots 2}=\{53,32,11\}$ $t_C PD_{0 \ldots 2}=\{6,4,2\}$

The variables $g_i$ and $t_C QD_j$ are defined as follows:
If maxFilterLengthQ is equal to 7

$g_{0 \ldots 6}=\{59,50,41,32,23,14,5\}$ $t_C QD_{0 \ldots 6}=\{6,5,4,3,2,1,1\}$ Otherwise if maxFilterLengthQ is equal to 5

$g_{0 \ldots 4}=\{58,45,32,19,6\}$ $t_C QD_{0 \ldots 4}=\{6,5,4,3,2\}$

Otherwise $g_{0 \ldots 2}=\{53,32,11\}$ $t_C QD_{0 \ldots 2}=\{6,4,2\}$ $p_i'=\text{Clip3}(p_i-(t_C*t_C PD_i)>>1,p_i+(t_C*t_C PD_i)>>1,(\text{refMiddle}*f_i+\text{refP}*(64-f_i)+32)>>6)$ $q_j'=\text{Clip3}(q_j-(t_C*t_C QD_j)>>1,q_j+(t_C*t_C QD_j)>>1,(\text{refMiddle}*g_j+\text{refP}*(64-g_j)+32)>>6)$ where $i=0 \ldots$ maxFilterLengthP-1 and $j=0 \ldots$ maxFilterLengthQ-1

When one or more of the following conditions are true, the filtered sample value, $p_i'$ is substituted by the corresponding input sample value $p_i$: with $i=0 \ldots$ maxFilterLengthQ-1:
  pcm_loop_filter_disabled_flag is equal to 1 and pcm_flag $[xP_0][yP_0]$ is equal to 1.
  cu_transquant_bypass_flag of the coding unit that includes the coding block containing the sample $p_0$ is equal to 1.

When one or more of the following conditions are true, the filtered sample value, $q_i'$ is substituted by the corresponding input sample value $q_j$: with $j=0 \ldots$ maxFilterLengthQ-1:
  pcm_loop_filter_disabled_flag is equal to 1 and pcm_flag $[xQ_0][yQ_0]$ is equal to 1.
  cu_transquant_bypass_flag of the coding unit that includes the coding block containing the sample $q_0$ is equal to 1.

JVET-M0471 further defines a so-called chroma long filter process a follows:
Inputs to this process are:
  the variable filterLength
  the chroma sample values $p_i$ and $q_i$ with $i=0 \ldots$ filterLength,
  the chroma locations of $p_i$ and $q_i$, $(xP_i, yP_i)$ and $(xQ_i, yQ_i)$,
  a variable $t_C$
Outputs of this process are.
  the filtered sample values $p_i'$ and $q_j'$ with $i=0 \ldots$ filterLength-1.
  Depending on the value of filterLength, the following applies:
  If the variable filterLength is equal to 3, the following strong filtering applies:

$p_0'=\text{Clip3}(p_0-t_C,p_0+t_C,(p_3+p_2+p_1+2*p_0+q_0+q_1+q_2+4)>>3)$ $$p_1'=\text{Clip3}(p_1-t_C, p_1+t_C, (2*p_3+p_2+2*p_1+p_0+q_0+q_1+4)>>3)$$

$$p_2'=\text{Clip3}(p_2-t_C, p_2+t_C, (3*p_3+2*p_2+p_1+p_0+q_0+4)>>3)$$

$$q_0'=\text{Clip3}(q_0-t_C, q_0+t_C, (p_2+p_1+p_0+2*q_0+q_1+q_2+q_3+4)>>3)$$

$$q_1'=\text{Clip3}(q_1-t_C, q_1+t_C, (p_1+p_0+q_0+2*q_1+q_2+2*q_3+4)>>3)$$

$$q_2=\text{Clip3}(q_2-t_C, q_2+t_C, (p_0+q_0+q_1+2*q_2+3*q_3+4)>>3)$$

Otherwise, the following weak filtering applies:

$$\Delta=\text{Clip3}(-t_C, t_C, ((((q_0-p_0)>>2)+p_1-q_1+4)>>3))$$

$$p_0'=\text{Clip1}_C(p_0+\Delta)$$

$$q_0'=\text{Clip1}_C(q_0-\Delta)$$

When one or more of the following conditions are true, the filtered sample value, $p_i'$ is substituted by the corresponding input sample value $p_i$: with $i=0$ . . . filterLength−1:
  pcm_loop_filter_disabled_flag is equal to 1 and pcm_flag [xP$_0$*SubWidthC][yP$_0$*SubHeightC] is equal to 1.
  cu_transquant_bypass_flag of the coding unit that includes the coding block containing the sample $p_0$ is equal to 1.

When one or more of the following conditions are true, the filtered sample value, $q_i'$ is substituted by the corresponding input sample value $q_i$: with $i=0$ . . . filterLength−1:
  pcm_loop_filter_disabled_flag is equal to 1 and pcm_flag [xQ$_0$*SubWidthC][yQ$_0$*SubHeightC] is equal to 1.
  cu_transquant_bypass_flag of the coding unit that includes the coding block containing the sample $q_0$ is equal to 1.

Where,

The variables SubWidthC and SubHeightC are specified in Table 1, depending on the chroma format sampling structure, which is specified through chroma_format_idc and separate_colour_plane_flag.

TABLE 1

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In monochrome sampling there is only one sample array, which is nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling, depending on the value of separate_colour_plane_flag, the following applies:
  If separate_colour_plane_flag is equal to 0, each of the two chroma arrays has the same height and width as the luma array.
  Otherwise (separate_colour_plane_flag is equal to 1), the three colour planes are separately processed as monochrome sampled pictures.

In the equations above, the variable $t_C$ is determined according to a decision process for block edge as follows:
The variable qP is derived as follows:

$$qP=((Qp_Q+Qp_P+1)>>1)+qp\text{Offset}$$

where,
Qp$_Q$ and Qp$_P$ are set equal to the Qp values of the coding units which include the coding blocks containing the sample $q_{0,0}$ and $p_{0,0}$, respectively; and
qpOffset is a determined offset value.
The value of the variable ß' is determined as specified in the Table illustrated in FIG. 5 based on the quantization parameter Q derived as follows:

$$Q=\text{Clip3}(0,63,qP+(\text{tile\_group\_beta\_offset\_div2}>>1))$$

where tile_group_beta_offset_div2 is the value of the syntax element tile_group_beta_offset_div2 for the tile group that contains sample $q_{0,0}$.
The variable ß is derived as follows:

$$\beta=\beta'*(1>>(bD-8))$$

The value of the variable $t_C'$ is determined as specified in Table illustrated in FIG. 5 based on the quantization parameter Q derived as follows:

$$Q=\text{Clip3}(0,65,qP+2*(bS-1)+(\text{tile\_group\_tc\_offset\_div2}>>1))$$

where tile_group_tc_offset_div2 is the value of the syntax element tile_group_tc_offset_div2 for the tile group that contains sample $q_{0,0}$.
The variable $t_C$ is derived as follows:

$$t_C=t_C'*(1>>(bD-8))$$

where,
bD specifies the bit depth of the current component.
Further, in JVET-M1001 a boundary strength value (bS) is determined for boundaries of blocks Q and P. The value of bS is used to determine if/how deblocking (i.e., which filter), is applied to a particular boundary. In JVET-M1001, a bS value is derived as one of 0, 1, or 2 as follows:
  If the sample $p_0$ or $q_0$ is in the coding block of a coding unit coded with intra prediction mode, bS is set equal to 2.
  Otherwise, if the block edge is also a transform block edge and the sample $p_0$ or $q_0$ is in a transform block which contains one or more non-zero transform coefficient levels, bS is set equal to 1.
  Otherwise, if one or more of the following conditions are true, bS is set equal to 1:
    For the prediction of the coding subblock containing the sample $p_0$ different reference pictures or a different number of motion vectors are used than for the prediction of the coding subblock containing the sample $q_0$.
    One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.
    Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable bS is set equal to 0.

Figure 6A:
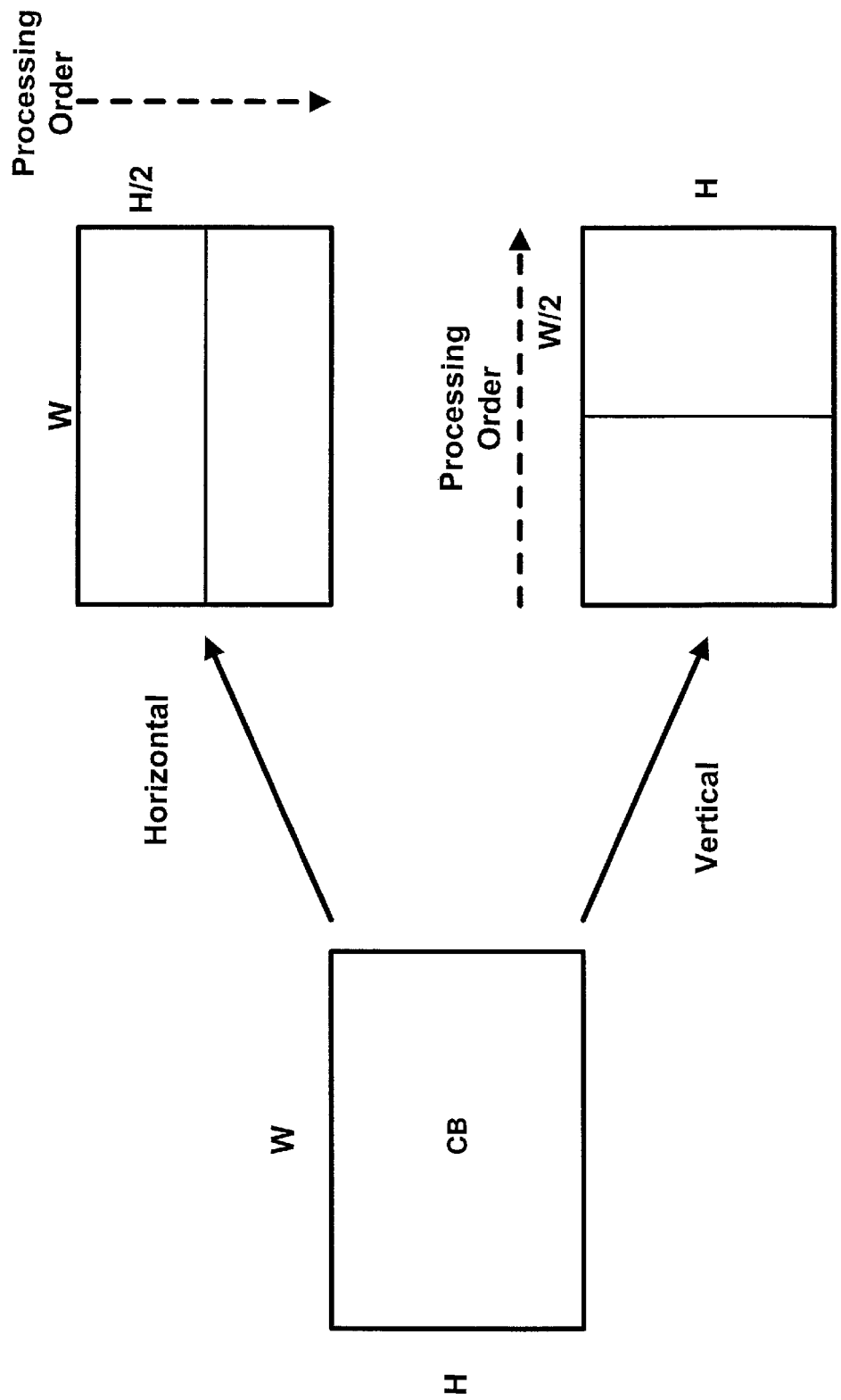
FIG. 6A is a conceptual diagram illustrating blocks of video data divided into intra sub-partitions in accordance with one or more techniques of this disclosure.
Figure 6B:
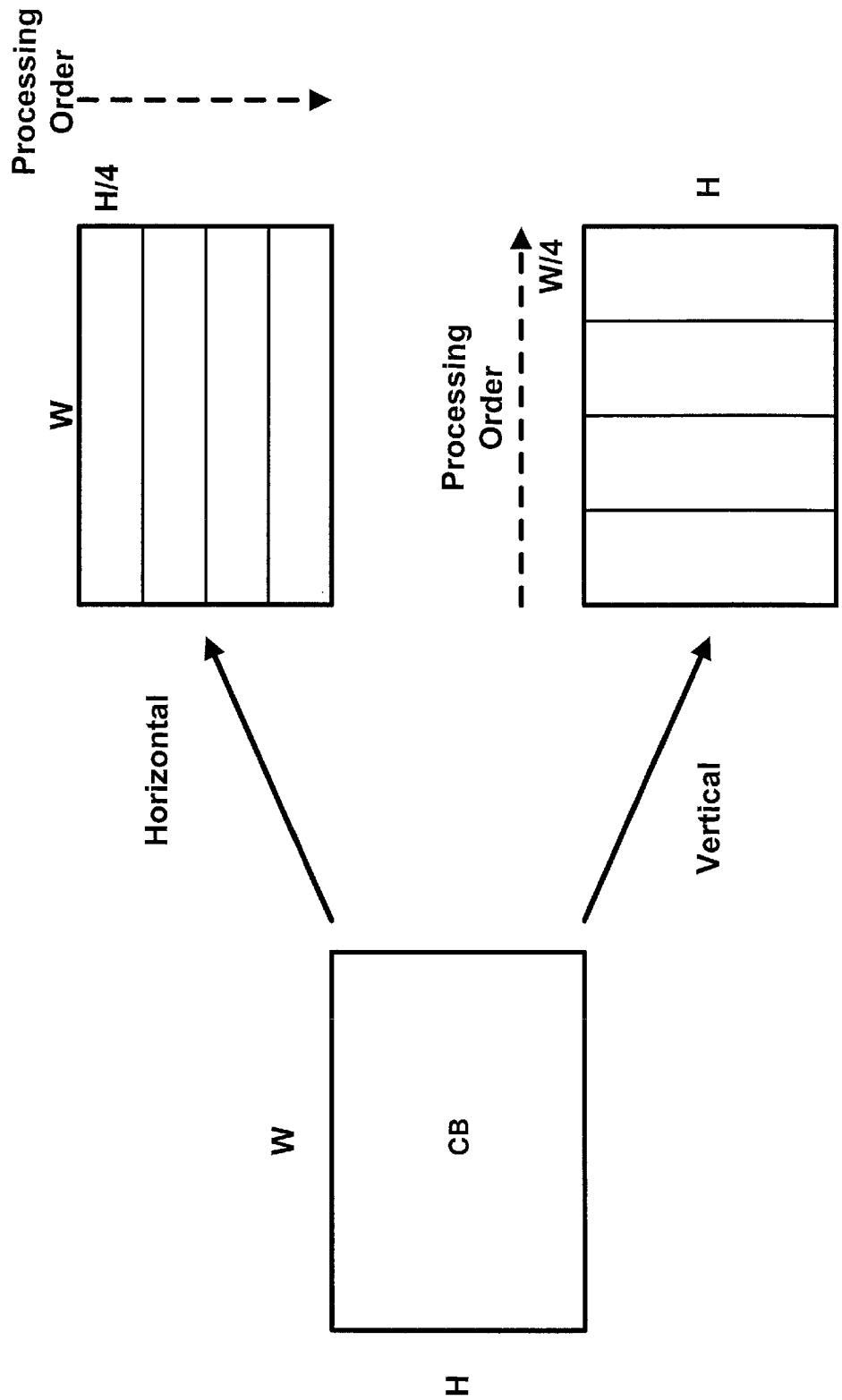
FIG. 6B is a conceptual diagram illustrating blocks of video data divided into intra sub-partitions in accordance with one or more techniques of this disclosure.

As described above, intra prediction data may be used to produce reference sample values for a block of sample values. In JVET-M1001, a so-called Intra Sub-Partitions (ISP) coding mode may be used for intra prediction. For the ISP coding mode in JVET-M1001, some luma intra-predicted blocks (i.e., luma CBs) are further divided vertically or horizontally into two or four sub-partitions depending on the block size dimensions. FIG. 6A illustrates the example of the division of 4×8 and 8×4 blocks into two sub-partitions according to the ISP coding mode in JVET-M1001. FIG. 6B illustrates the example of the division of other cases of blocks into four sub-partitions according to the ISP coding mode in JVET-M1001. It should be noted that according to the ISP coding mode in JVET-M1001 all sub-partitions are required to fulfill the condition of having at least 16 samples. In JVET-M1001, each of the sub-partitions in the luma intra-predicted block share the same intra prediction mode. Further, FIGS. 6A-6B illustrate the processing order of the sub-partitions according to JVET-M1001. That is, as illustrated in FIGS. 6A-6B, sub-partitions generated by a horizontal division are processed from top-to-bottom and sub-partitions generated by a vertical division are processed from left-to-right. It should be noted that such a processing order may be referred to as a normal processing order and a reverse processing order may refer to processing sub-partitions generated by a horizontal division from bottom-to-top and processing sub-partitions generated by a vertical division from right to left.

For each of the sub-partitions in the luma intra-predicted block, at a video encoder, a residual is generated, and at a video decoder, a reconstructed video block is generated, according to the processing order. That is, for each preceding sub-partition is reconstructed before the subsequent sub-partition. Therefore, the reconstructed values of each preceding sub-partition will be available and are used to generate the prediction of the subsequent sub-partition. That is, according to the normal processing order, reference samples used to generate sub-partition predictions are only located at the left and above a sub-partition. Further, it should be noted that each sub-partition has a corresponding residual that is independent of the residual of the other sub-partitions. That is, each sub-partition, at a video decoder, a residual is generated by inverse quantizing and performing an inverse transform on a set of level values that correspond to a sub-partition. Thus, each of the sub-partitions may be said to have a corresponding transform block and each of the sub-partition boundaries may be said to form transform block edges.

As described above, inter prediction data may be used to produce reference sample values for a block of sample values. As described above, in JVET-M1001, a coding unit included in a P or B tile group may be coded according to a CU skip mode, where when the CU skip mode is indicated, the coding unit is coded according to subset of motion vector prediction modes and the coding unit is coded from the prediction directly, i.e., residual data is not used to code the video block. JVET-M1001 further provides that when inter prediction data is used to produce reference sample values, a so-called sub-block transform (SBT) mode may be used for residual data. A SBT mode allows the whole residual block or only a sub-part of the residual block to be used for coding a CU. In the case where the whole residual block is used, inter multiple transform selection (MTS) information is further parsed to determine the transform type of the CU. In the case where only a sub-part of the residual block is used, a part of the residual block is coded with inferred adaptive transform and the other part of the residual block is zeroed out. It should be noted that in JVET-M1001, the SBT mode is not applied to the combined inter-intra mode, since almost no coding gain is achieved.

Figure 10A:
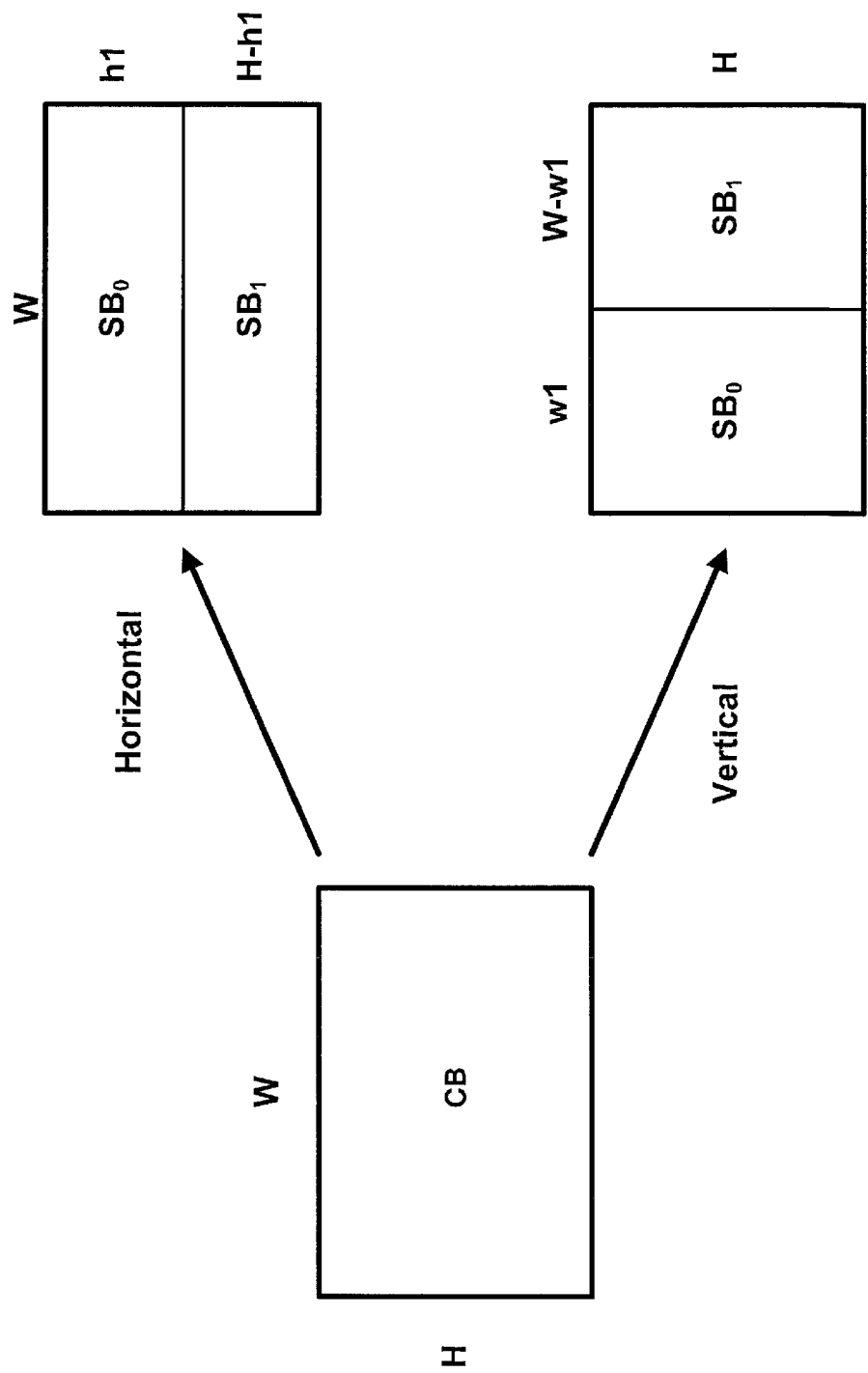
FIG. 10A is a conceptual diagram illustrating blocks of video data divided into sub-block transforms in accordance with one or more techniques of this disclosure.
Figure 10B:
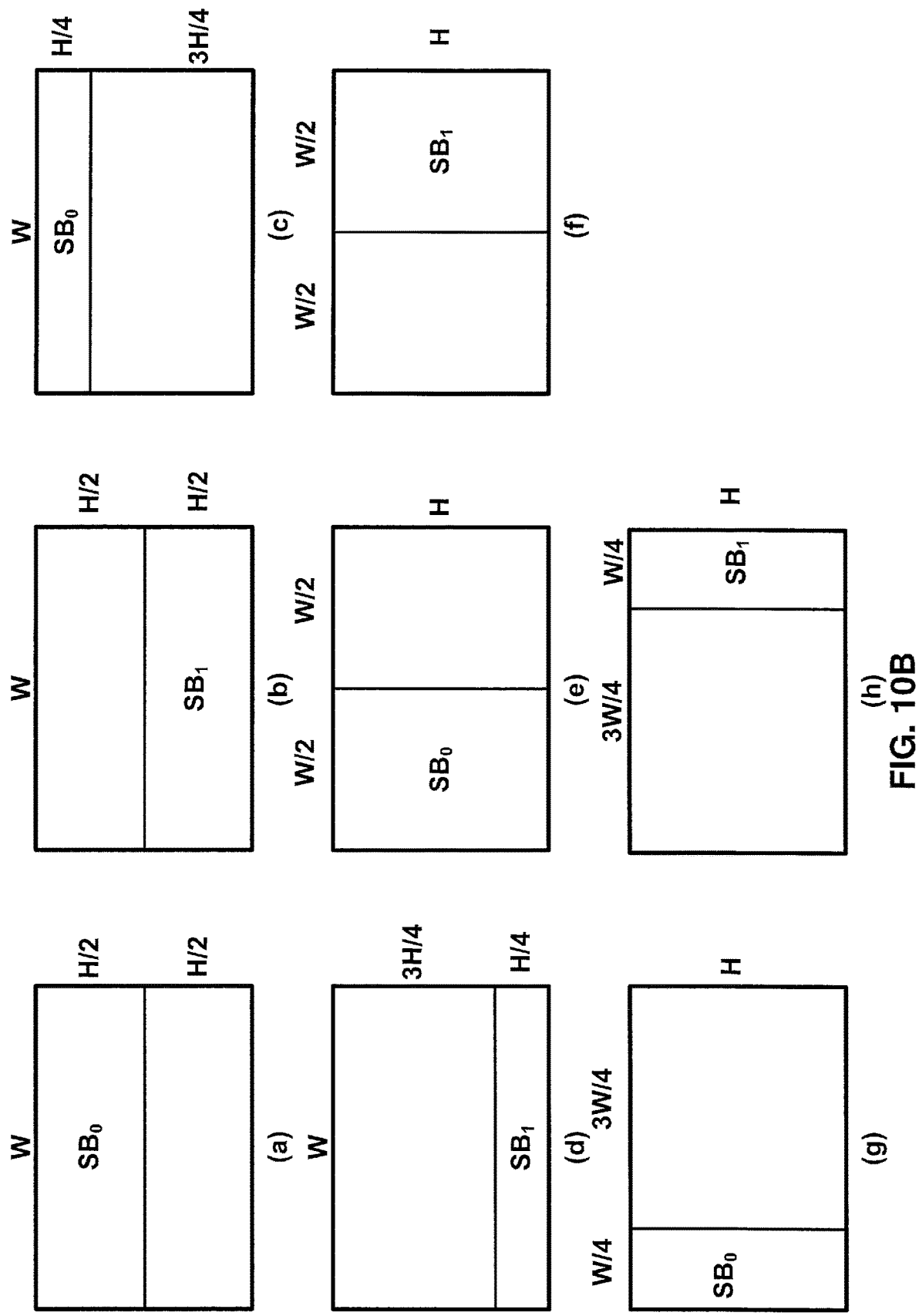
FIG. 10B is a conceptual diagram illustrating blocks of video data divided into sub-block transforms in accordance with one or more techniques of this disclosure.

When SBT is used for a inter CU, SBT type and SBT position information are further decoded from the bitstream to indicate the shape and position of the sub-blocks. In JVET-M1001, an inter CU may be split into SBT sub-blocks by either a horizontal or vertical split. Further, in JVET-M1001, the split may occur at a position that is either at half the height (or width) or at one quarter the height (or width). That is referring to FIG. 10A, a CB (e.g., the luma CB corresponding to the CU) is illustrated as being split into sub-blocks $SB_0$ and $SB_1$ and for the horizontal split, h1, may be equal to H/2 or H/4 (or 3H/4) and for the vertical split, w1, may be equal to W/2 or W/4 (or 3 W/4). SBT position information indicates with the residual data is present for sub-block $SB_0$ or sub-block $SB_1$. Thus, the SBT type and SBT position information in JVET-M1001 allow for eight SBT partitions, as illustrated in FIG. 10B, where in FIG. 10B, the subblock having residual data is indicated. It should be noted that JVET-M1001, if one side of CU has 8 luma samples, corresponding H/4 or W/4 split not allowed.

In an example, for the luma component, sub-block $SB_0$ or sub-block $SB_1$ may be associated with different core transforms (e.g., either DCT-8 and DST-7). Further, in one example, for the chroma component, sub-block $SB_0$ or sub-block $SB_1$ may be associated the same core transform. (e.g., DCT-2). Further, when one side of the residual TU is greater than 32, the corresponding transform may be set as DCT-2. Table 2 illustrates examples of horizontal (H) and vertical (V) core transforms that may be performed on a sub-block based on the position of the sub-block (i.e., as provided in FIG. 10B), the color channel of the component of the sub-block, and the size for the sub-block. It should be noted that Table 2 illustrates the general concept of horizontal (H) and vertical (V) core transforms that may be performed on a sub-block based on the position of the sub-block, the color channel of the component of the sub-block, and the size for the sub-block and the techniques described herein are generally applicable regardless of the particular transforms performed on a sub-block based on the position of the sub-block, the color channel of the component of the sub-block, and the size for the sub-block. That is, transforms indicated in Table 2 may be replaced with other defined transforms.

TABLE 2

| | | Channel | | |
|---|---|---|---|---|
| | | Luma Size | | |
| | | (H or W, corresponding to split) <= 32 | (H or W, corresponding to split) >32 | Chroma |
| Sub-block | (a) | H: DCT − 7, V: DCT − 8 | H: DCT − 2, V: DCT − 2 | H: DCT − 2, V: DCT − 2 |
| | (b) | H: DCT − 7, V: DCT − 7 | H: DCT − 2, V: DCT − 2 | H: DCT − 2, V: DCT − 2 |
| | (c) | H: DCT − 7, V: DCT − 8 | H: DCT − 2, V: DCT − 2 | H: DCT − 2, V: DCT − 2 |
| | (d) | H: DCT − 7, V: DCT − 7 | H:DCT − 2, V: DCT − 2 | H: DCT − 2, V: DCT − 2 |
| | (e) | H: DCT − 8, V: DCT − 7 | H: DCT − 2, V: DCT − 2 | H: DCT − 2, V: DCT − 2 |
| | (f) | H: DCT − 7, V: DCT − 7 | H: DCT − 2, V: DCT − 2 | H: DCT − 2, V: DCT − 2 |
| | (g) | H: DCT − 8, V: DCT − 7 | H: DCT − 2, V: DCT − 2 | H: DCT − 2, V: DCT − 2 |
| | (h) | H: DCT − 7, V: DCT − 7 | H: DCT − 2, V: DCT − 2 | IT: DCT − 2, V: DCT − 2 |

As described above, in JVET-M1001, CTUs are partitioned according a quadtree plus multi-type tree (QTMT) structure. Accordingly, the size and positions of the sub-blocks in FIG. 10B may be realized by further splitting a CU. That is, for example, a CU may be split using a BT split and the resulting child CUs may have the same size as position of sub-blocks resulting from splitting the CU using a one half SBT split. Further, for the resulting child CUs, whether the resulting blocks have any residual can be indicated by use of flag(s) (e.g., cu_cbf, tu_cbf_luma, tu_cbf_cb, tu_cbf_cr). Thus, SBT modes may be considered a syntax shortcut for the cases where the major residual of a block is at one side of the block.

Table 3 illustrates the revelation portion of the coding unit syntax for enabling the ISP coding mode and the SBT coding mode in JVET-M1001.

TABLE 3

| | Descriptor |
|---|---|
| coding_unit( x0, y0, cbWidth, cbHeight, treeType ) { | |
|   if( tile_group_type != I ) { | |
|     if( treeType != DUAL_TREE_CHROMA) | |
|       cu_skip_flag[ x0 ][ y0 ] | ae(v) |
|     if( cu_skip_flag[ x0 ][ y0 ] = = 0) | |
|       pred_mode_flag | ae(v) |
|   } | |
|   if( CuPredMode[x0 ][ y0 ] = = MODE_INTRA) { | |
|   ... | |
|   }else { | |
|     if( treeType = = SINGLE TREE | | treeType = = DUAL_TREE_LUMA) | |
|   { | |
|       if( ( y0 % CtbSizeY ) > 0) | |
|         intra_luma_ref idx[ x0 ][ y0] | ae(v) |
|       if (intra_luma_ref_idx[x0 ][y0] = = 0 && | |
|         ( cbWidth <= MaxTbSizeY | | cbHeight <= MaxTbSizeY) && | |
|         ( cbWidth * cbHeight >MinTbSizeY * MinTbSizeY )) | |
|         intra_subpartitions_mode_flag[x0 ][y0 ] | ae(v) |
|       if( intra_subpartitions_mode_flag[x0][y0] = =1 && | |
|         cbWidth <= MaxTbSizeY && cbHeight <= MaxTbSizeY) | |
|         intra_subpartitions_split_flag[x0][y0] | ae(v) |
|       if( intra_luma_ref idx[x0][y0] = = 0 && | |
|         intra_subpartitions_mode_flag[x0][y0] = = 0) | |
|         intra_luma_mpm_flag[x0][y0] | ae(v) |
|       if( intra_luma_mpm_flag[x0][y0] ) | |
|         intra_luma_mpm_idx[x0][y0] | ae(v) |
|       else | |
|         intra_luma_mpm_remainder[x0][y0] | ae(v) |
|     } | |
|     if( treeType = = SINGLE_TREE | | treeType = = DUAL_TREE_CHROMA ) | |
|       intra_chroma_pred_mode[x0][y0] | ae(v) |
|     } | |
|   }else if( treeType != DUAL_TREE_CHROMA ) {/* MODE_INTER*/ | |
|     if( cu_skip_flag[x0][y0] = = 0) | |
|       merge_flag[x0][y0] | ae(v) |
|     if( merge_flag[x0][y0] ) { | |
|       merge_data( x0, y0, cbWidth, cbHeight) | |

TABLE 3-continued

```
    }else {
...
    }
    if( CuPredMode[x0][y0] != MODE_INTRA &&
merge_flag[x0][y0] = = 0)
        cu_cbf                                                                    ae(v)
    if( cu_cbf ) {
        if( CuPredMode[x0][y0] = = MODE_INTER &&
sps_sbt_enabled_flag &&
            !ciip_flag[x0][y0] ) {
            if( cbWidth <= MaxSbtSize && cbHeight <= MaxSbtSize) {
                allowSbtVerH = cbWidth >= 8
                allowSbtVerQ = cbWidth >= 16
                allowSbtHorH = cbHeight >= 8
                allowSbtHorQ = cbHeight >= 16
                if( allowSbtVerH | | allowSbtHorH | | allowSbtVerQ | | allowSbtHorQ )
                    cu_sbt_flag                                                   ae(v)
            }
            if( cu_sbt_flag ) {
                if( ( allowSbtVerH | | allowSbtHorH) && ( allowSbtVerQ | | allowSbtHorQ) )
                    cu_sbt_quad_flag                                              ae(v)
                if( ( cu_sbt_quad_flag && allowSbtVerQ && allowSbtHorQ ) | |
                    ( !cu_sbt_quad_flag && allowSbtVerH && allowSbtHorH ) )
                    cu_sbt_horizontal_flag                                        ae(v)
                cu_sbt_pos_flag                                                   ae(v)
            }
        }
        transform_tree( x0, y0, cbWidth, cbHeight, treeType)
...
...
```

With respect to Table 3, JVET-M1001 provides the following semantics:

cu_skip_flag equal to 1 specifies that for the current coding unit, when decoding a P or B tile group, no more syntax elements except one or more of the following are parsed after cu_skip_flag[x0][y0]: the merge plus MVD flag mmvd_flag[x0][y0], the merge plus MVD index mmvd_merge_flag[x0][y0], the merge plus MVD distance index mmvd distance_idx[x0][y0], the merge plus MVD direction index mmvd_direction_idx [x0][y0], the merging candidate index merge_idx[x0] [y0] the subblock-based merge flag merge_ subblock_flag[x0][y0], the subblock-based merging candidate index merge_subblock_idx[x0][y0], the merge triangle flag merge_triangle_flag[x0][y0], and the merge triangle index merge_triangle_index[x0] [y0]. cu_skip_flag[x0][y0] equal to 0 specifies that the coding unit is not skipped. The array indices x0, y0 specify the location (x0, y0) of the top-left luma sample of the considered coding block relative to the top-left luma sample of the picture.

When cu_skip_flag[x0][y0] is not present, it is inferred to be equal to 0.

pred_mode_flag pred_mode_flag equal to 0 specifies that the current coding unit is coded in inter prediction mode. pred_mode_flag equal to 1 specifies that the current coding unit is coded in intra prediction mode. The variable CuPredMode[x][y] is derived as follows for x=x0 . . . x0+cbWidth−1 and y=y0 . . . y0+cbHeigh−1:
If pred_mode_flag is equal to 0, CuPredMode[x][y] is set equal to MODE_INTER.
Otherwise (pred_mode_flag is equal to 1), CuPredMode[x][y] is set equal to MODE_INTRA.
When pred_mode_flag is not present, the variable CuPredMode[x][y] is inferred to be equal to MODE_INTRA for x=x0 . . . x0+cbWidth−1 and y=y0 . . . y0+cbHeight−1.

intra_luma_ref_idx[x0][y0] specifies the intra prediction reference line index IntraLumaRefLineIdx[x][y] for x=x0 . . . x0+cbWidth−1 and y=y0 . . . y0+cbHeight−1 as specified in Table 4.

When intra_luma_ref_idx[x0][y0] is not present it is inferred to be equal to 0.

TABLE 4

| intra_luma_ref idx[x0][y0] | IntraLumaRefLineIdx[x][y]<br>x = x0..x0 + cbWidth − 1<br>y = y0..y0 + cbHeight − 1 |
| --- | --- |
| 0 | 0 |
| 1 | 1 |
| 2 | 3 | intra_subpartitions_mode_flag[x0][y0] equal to 1 specifies that the current intra coding unit is partitioned into NumIntraSubPartitions[x0][y0] rectangular transform block subpartitions, intra_subpartitions_mode_flag[x0] [y0] equal to 0 specifies that the current intra coding unit is not partitioned into rectangular transform block subpartitions.

When intra_subpartitions_mode_flag[x0][y0] is not present, it is inferred to be equal to 0.

intra_subpartitions_split_flag[x0][y0] specifies whether the intra subpartitions split type is horizontal or vertical. When intra_subpartitions_mode_flag[x0][y0] is not present, it is inferred to be equal to 0.

The variable IntraSubPartitionsSplitType specifies the type of split used for the current luma coding block as illustrated in Table 5. IntraSubPartitionsSplitType is derived as follows:

If intra_subpartitions_mode_flag[x0][y0] is equal to 0, IntraSubPartitionsSplitType is set equal to 0.

Otherwise, the IntraSubPartitionsSplitType is set equal to

1+intra_subpartitions_split_flag[x0][y0].

TABLE 5

| IntraSubPartitionsSplitType | Name of IntraSubPartitionsSplitType |
|---|---|
| 0 | ISP_NO_SPLIT |
| 1 | ISP_HOR_SPLIT |
| 2 | ISP_VER_SPLIT |

The variable NumIntraSubPartitions specifies the number of transform block sub-partitions an intra luma coding block is divided into. NumIntraSubPartitions is derived as follows:
  If IntraSubPartitionsSplitType is equal to ISP_NO_SPLIT, NumIntraSubPartitions is set equal to 1.
  Otherwise, if one of the following conditions is true, NumIntraSubPartitions is set equal to 2:
    cbWidth is equal to 4 and cbHeight is equal to 8,
    cbWidth is equal to 8 and cbHeight is equal to 4.
  Otherwise, NumIntraSubPartitions is set equal to 4.
The syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to [a specified derivation process].
When intra_luma_mpm_flag[x0][y0] is not present, it is inferred to be equal to 1.
  intra_chroma_pred_mode[x0][y0] specifies the intra prediction mode for chroma samples. The array indices x0, y0 specify the location (x0, y0) of the top-left luma sample of the considered coding block relative to the top-left luma sample of the picture.
  merge_flag[x0][y0] specifies whether the inter prediction parameters for the current coding unit are inferred from a neighbouring inter-predicted partition. The array indices x0, y0 specify the location (x0, y0) of the top-left luma sample of the considered coding block relative to the top-left luma sample of the picture.
When merge_flag[x0][y0] is not present, it is inferred as follows:
  If cu__skip_flag[x0][y0] is equal to 1, merge_flag[x0][y0] is inferred to be equal to 1.
  Otherwise, merge_flag[x0][y0] is inferred to be equal to 0.
  cu_cbf cu_cbf equal to 1 specifies that the transform_tree( ) syntax structure is present for the current coding unit. cu_cbf equal to 0 specifies that the transform_tree( ) syntax structure is not present for the current coding unit.
When cu_cbf is not present, it is inferred as follows:
  If cu_skip_flag[x0][y0] is equal to 1, cu_cbf is inferred to be equal to 0.
  Otherwise, cu_cbf is inferred to be equal to 1.
  cu_sbt_flag equal to 1 specifies that for the current coding unit, subblock transform is used. cu_sbt_flag equal to 0 specifies that for the current coding unit, subblock transform is not used.

When cu_sbt_flag is not present, its value is inferred to be equal to 0.
  NOTE—: When subblock transform is used, a coding unit is split into two transform units; one transform unit has residual data, the other does not have residual data.
  cu_sbt_quad_flag equal to 1 specifies that for the current coding unit, the subblock transform includes a transform unit of ¼ size of the current coding unit. cu_sbt_quad_flag equal to 0 specifies that for the current coding unit the subblock transform includes a transform unit of ½ size of the current coding unit.
When cu_sbt_quad_flag is not present, its value is inferred to be equal to 0.
  cu_sbt_horizontal_flag equal to 1 specifies that the current coding unit is split horizontally into 2 transform units. cu_sbt_horizontal_flag[x0][y0] equal to 0 specifies that the current coding unit is split vertically into 2 transform units.
When cu_sbt_horizontal_flag is not present, its value is derived as follows:
  If cu_sbt_quad_flag is equal to 1, cu_sbt_horizontal_flag is set to be equal to allowSbtHorQ.
  Otherwise (cu_sbt_quad_flag is equal to 0), cu_sbt_horizontal_flag is set to be equal to allowSbtHorH.
  cu_sbt_pos_flag equal to 1 specifies that the tu_cbf_luma, tu_cbf_cb and tu_cbf_cr of the first transform unit in the current coding unit are not present in the bitstream. cu_sbt_pos_flag equal to 0 specifies that the tu_cbf_luma, tu_cbf_cb and tu_cbf_cr of the second transform unit in the current coding unit are not present in the bitstream.
The variable SbtNumFourthsTb0 is derived as follows:

sbtMinNumFourths=cu_sbt_quad_flag?1:2

SbtNumFourthsTb0=cu_sbt_pos_flag?(4−sbtMinNumFourths):sbtMinNumFourths

Quantization and/or use of intra-prediction can cause blocking artifacts to appear at the sub-partition boundary Such blocking artifacts may be addressed by using a deblocking filter. However, in JVET-M1001, ISP coding mode sub-partition boundaries are not considered as boundaries for deblocking, which may be less than ideal. It should be noted that with respect to deblocking, JVET-M1001 provides the following derivation process of coding subblock boundary:
Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a two-dimensional (nCbW)×(nCbH) array edgeFlags,
a variable edgeType specifying whether a vertical (EDGE_VER) or a horizontal (EDGE_HOR) edge is filtered.
Output of this process is the modified two-dimensional (nCbW)×(nCbH) array edgeFlags.
The number of coding subblock in horizontal direction numSbX and in vertical direction numSbY are derived as follows:
  If CuPredMode[xCb][yCb]==MODE_INTRA, numSbX and numSbY are both set equal to 1.
  Otherwise, numSbX and numSbY are set equal to NumSbX[xCb][yCb] and NumSbY[xCb][yCb], respectively.

Depending on the value of edgeType the following applies:

If edgeType is equal to EDGE_VER and numSbX is greater than 1, the following applies for $i=1 \ldots \min((nCbW/8)-1, numSbX-1), k=0 \ldots nCbH-1$:

edgeFlags[$i$*Max(8,nCbW/numSbX)][$k$]=1

Otherwise if edgeType is equal to EDGE_HOR and numSbY is greater than 1, the following applies for $j=1 \ldots \min((nCbH/8)-1, numSbY-1), k=0 \ldots nCbW-1$:

edgeFlags[$k$][$j$*Max(8,nCbH/numSbY)]=1

Figure 7:
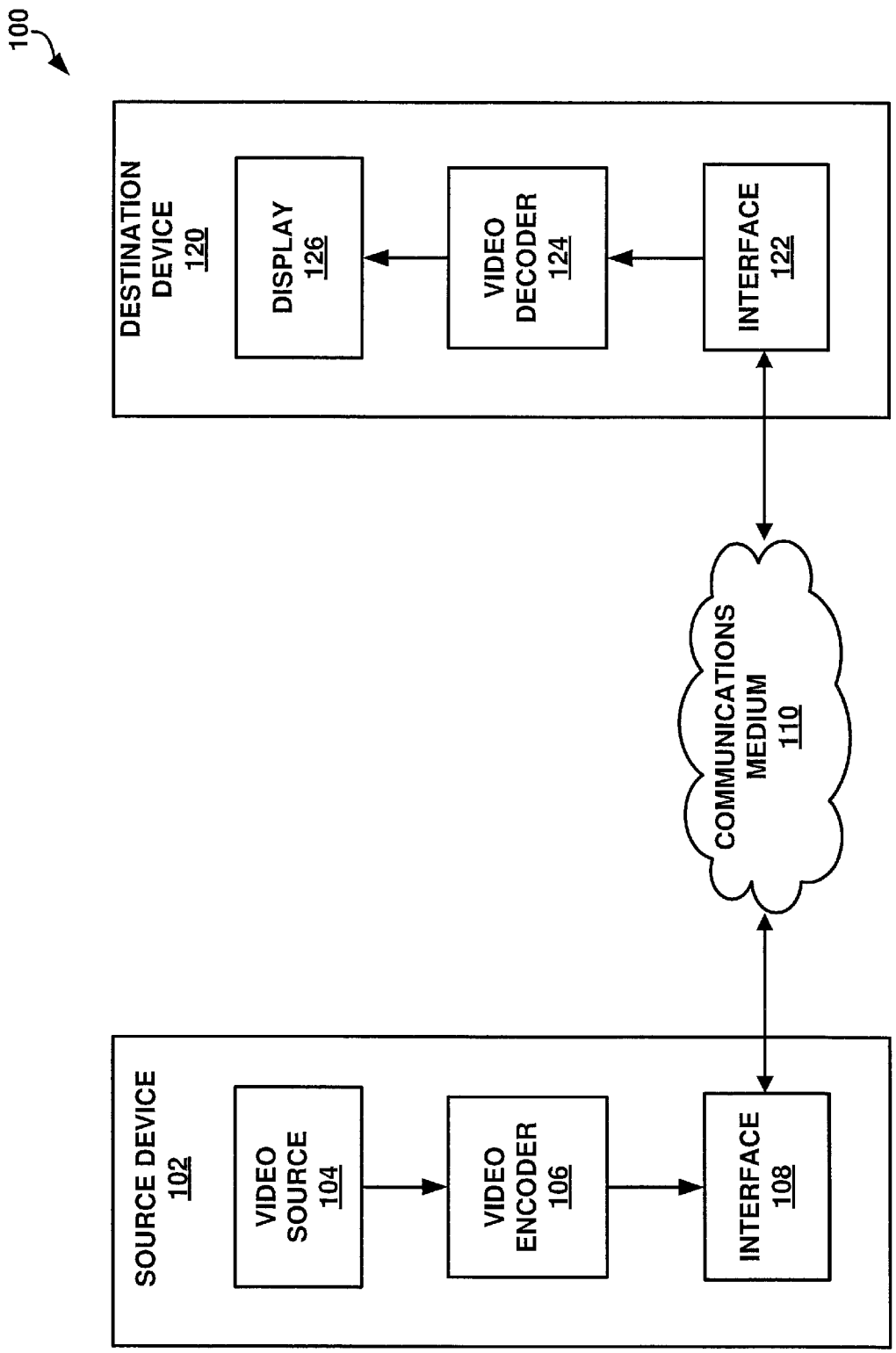
FIG. 7 is a block diagram illustrating an example of a system that may be configured to encode and decode video data according to one or more techniques of this disclosure.

FIG. 7 is a block diagram illustrating an example of a system that may be configured to code (i.e., encode and/or decode) video data according to one or more techniques of this disclosure. System 100 represents an example of a system that may perform video coding using deblocking techniques described according to one or more examples of this disclosure. As illustrated in FIG. 7, system 100 includes source device 102, communications medium 110, and destination device 120. In the example illustrated in FIG. 7, source device 102 may include any device configured to encode video data and transmit encoded video data to communications medium 110. Destination device 120 may include any device configured to receive encoded video data via communications medium 110 and to decode encoded video data. Source device 102 and/or destination device 120 may include computing devices equipped for wired and/or wireless communications and may include set top boxes, digital video recorders, televisions, desktop, laptop, or tablet computers, gaming consoles, mobile devices, including, for example, "smart" phones, cellular telephones, personal gaming devices, and medical imagining devices.

Communications medium 110 may include any combination of wireless and wired communication media, and/or storage devices. Communications medium 110 may include coaxial cables, fiber optic cables, twisted pair cables, wireless transmitters and receivers, routers, switches, repeaters, base stations, or any other equipment that may be useful to facilitate communications between various devices and sites. Communications medium 110 may include one or more networks. For example, communications medium 110 may include a network configured to enable access to the World Wide Web, for example, the Internet. A network may operate according to a combination of one or more telecommunication protocols. Telecommunications protocols may include proprietary aspects and/or may include standardized telecommunication protocols. Examples of standardized telecommunications protocols include Digital Video Broadcasting (DVB) standards, Advanced Television Systems Committee (ATSC) standards, Integrated Services Digital Broadcasting (ISDB) standards, Data Over Cable Service Interface Specification (DOCSIS) standards, Global System Mobile Communications (GSM) standards, code division multiple access (CDMA) standards, 3rd Generation Partnership Project (3GPP) standards, European Telecommunications Standards Institute (ETSI) standards, Internet Protocol (IP) standards, Wireless Application Protocol (WAP) standards, and Institute of Electrical and Electronics Engineers (IEEE) standards.

Storage devices may include any type of device or storage medium capable of storing data. A storage medium may include a tangible or non-transitory computer-readable media. A computer readable medium may include optical discs, flash memory, magnetic memory, or any other suitable digital storage media. In some examples, a memory device or portions thereof may be described as non-volatile memory and in other examples portions of memory devices may be described as volatile memory. Examples of volatile memories may include random access memories (RAM), dynamic random access memories (DRAM), and static random access memories (SRAM). Examples of non-volatile memories may include magnetic hard discs, optical discs, floppy discs, flash memories, or forms of electrically programmable memories (EPROM) or electrically erasable and programmable (EEPROM) memories. Storage device(s) may include memory cards (e.g., a Secure Digital (SD) memory card), internal/external hard disk drives, and/or internal/external solid state drives. Data may be stored on a storage device according to a defined file format.

Referring again to FIG. 7, source device 102 includes video source 104, video encoder 106, and interface 108. Video source 104 may include any device configured to capture and/or store video data. For example, video source 104 may include a video camera and a storage device operably coupled thereto. Video encoder 106 may include any device configured to receive video data and generate a compliant bitstream representing the video data. A compliant bitstream may refer to a bitstream that a video decoder can receive and reproduce video data therefrom. Aspects of a compliant bitstream may be defined according to a video coding standard. When generating a compliant bitstream video encoder 106 may compress video data. Compression may be lossy (discernible or indiscernible) or lossless. Interface 108 may include any device configured to receive a compliant video bitstream and transmit and/or store the compliant video bitstream to a communications medium. Interface 108 may include a network interface card, such as an Ethernet card, and may include an optical transceiver, a radio frequency transceiver, or any other type of device that can send and/or receive information. Further, interface 108 may include a computer system interface that may enable a compliant video bitstream to be stored on a storage device. For example, interface 108 may include a chipset supporting Peripheral Component Interconnect (PCI) and Peripheral Component Interconnect Express (PCIe) bus protocols, proprietary bus protocols, Universal Serial Bus (USB) protocols, $I^2C$, or any other logical and physical structure that may be used to interconnect peer devices.

Referring again to FIG. 7, destination device 120 includes interface 122, video decoder 124, and display 126. Interface 122 may include any device configured to receive a compliant video bitstream from a communications medium. Interface 108 may include a network interface card, such as an Ethernet card, and may include an optical transceiver, a radio frequency transceiver, or any other type of device that can receive and/or send information. Further, interface 122 may include a computer system interface enabling a compliant video bitstream to be retrieved from a storage device. For example, interface 122 may include a chipset supporting PCI and PCIe bus protocols, proprietary bus protocols, USB protocols, $I^2C$, or any other logical and physical structure that may be used to interconnect peer devices. Video decoder 124 may include any device configured to receive a compliant bitstream and/or acceptable variations thereof and reproduce video data therefrom. Display 126 may include any device configured to display video data. Display 126 may comprise one of a variety of display devices such as a liquid crystal display (LCD), a plasma display, an organic light emitting diode (OLED) display, or another type of display. Display 126 may include a High Definition display or an Ultra High Definition display. It should be noted that although in the example illustrated in FIG. 7, video decoder 124 is described as outputting data to display 126, video decoder 124 may be configured to output video data to various types of devices and/or sub-components thereof. For example, video decoder 124 may be configured to output video data to any communication medium, as described herein.

Figure 8:
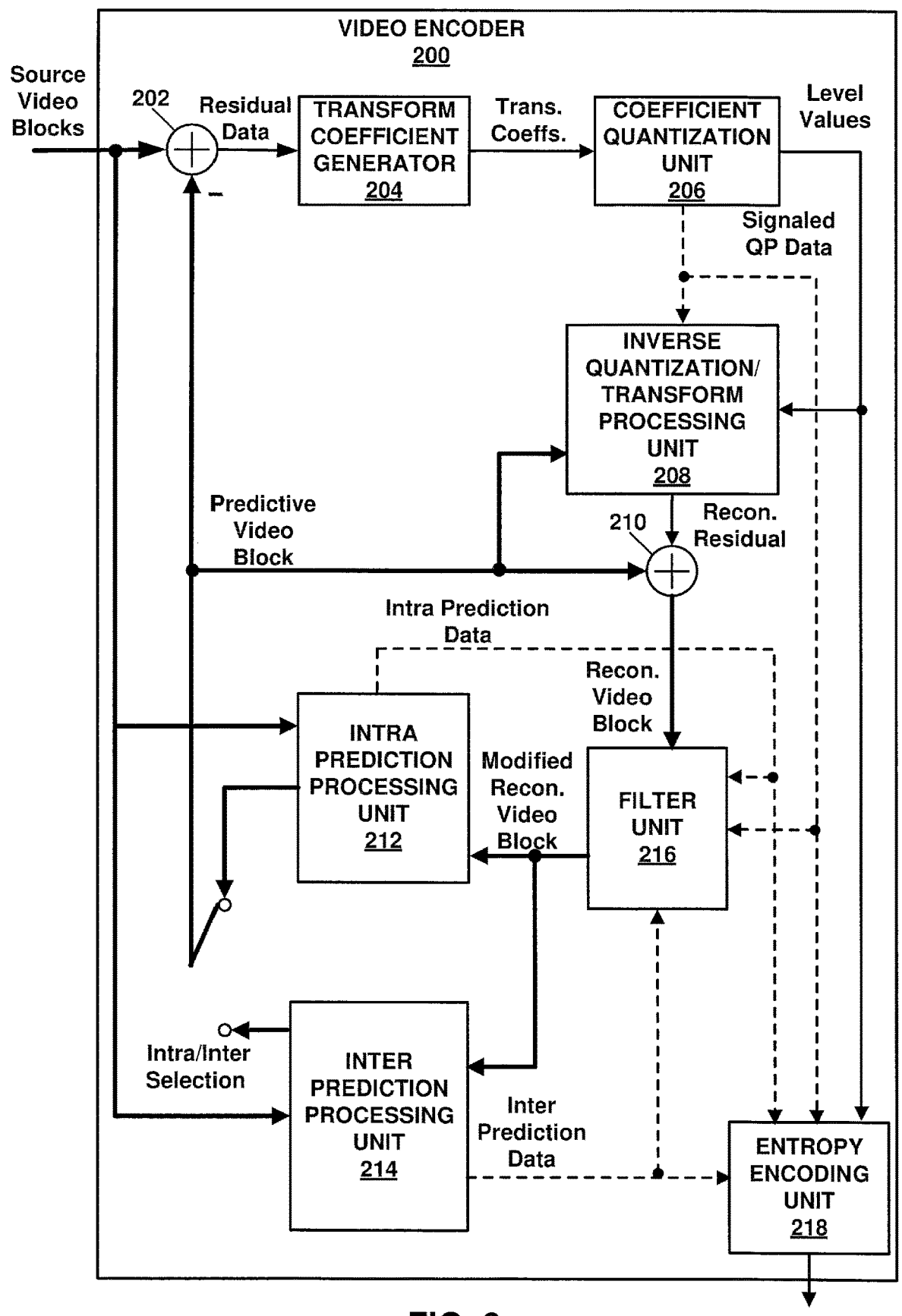
FIG. 8 is a block diagram illustrating an example of a video encoder that may be configured to encode video data according to one or more techniques of this disclosure.

FIG. 8 is a block diagram illustrating an example of video encoder 200 that may implement the techniques for encoding video data described herein. It should be noted that although example video encoder 200 is illustrated as having distinct functional blocks, such an illustration is for descriptive purposes and does not limit video encoder 200 and/or sub-components thereof to a particular hardware or software architecture. Functions of video encoder 200 may be realized using any combination of hardware, firmware, and/or software implementations. In one example, video encoder 200 may be configured to encode video data according to the techniques described herein. Video encoder 200 may perform intra prediction coding and inter prediction coding of picture areas, and, as such, may be referred to as a hybrid video encoder. In the example illustrated in FIG. 8, video encoder 200 receives source video blocks. In some examples, source video blocks may include areas of picture that has been divided according to a coding structure. For example, source video data may include macroblocks, CTUs, CBs, sub-divisions thereof, and/or another equivalent coding unit. In some examples, video encoder 200 may be configured to perform additional sub-divisions of source video blocks. It should be noted that some techniques described herein may be generally applicable to video coding, regardless of how source video data is partitioned prior to and/or during encoding. In the example illustrated in FIG. 8, video encoder 200 includes summer 202, transform coefficient generator 204, coefficient quantization unit 206, inverse quantization/transform processing unit 208, summer 210, intra prediction processing unit 212, inter prediction processing unit 214, filter unit 216, and entropy encoding unit 218.

As illustrated in FIG. 8, video encoder 200 receives source video blocks and outputs a bitstream. Video encoder 200 may generate residual data by subtracting a predictive video block from a source video block. Summer 202 represents a component configured to perform this subtraction operation. In one example, the subtraction of video blocks occurs in the pixel domain. Transform coefficient generator 204 applies a transform, such as a discrete cosine transform (DCT), a discrete sine transform (DST), or a conceptually similar transform, to the residual block or sub-divisions thereof (e.g., four 8×8 transforms may be applied to a 16×16 array of residual values) to produce a set of residual transform coefficients. Transform coefficient generator 204 may be configured to perform any and all combinations of the transforms included in the family of discrete trigonometric transforms. Transform coefficient generator 204 may output transform coefficients to coefficient quantization unit 206. Coefficient quantization unit 206 may be configured to perform quantization of the transform coefficients. As described above, the degree of quantization may be modified by adjusting a quantization parameter. Coefficient quantization unit 206 may be further configured to determine quantization parameters (QP) and output QP data (e.g., data used to determine a quantization group size and/or delta QP values) that may be used by a video decoder to reconstruct a quantization parameter to perform inverse quantization during video decoding. It should be noted that in other examples, one or more additional or alternative parameters may be used to determine a level of quantization (e.g., scaling factors). The techniques described herein may be generally applicable to determining a level of quantization for transform coefficients corresponding to a component of video data based on a level of quantization for transform coefficients corresponding another component of video data.

As illustrated in FIG. 8, quantized transform coefficients are output to inverse quantization/transform processing unit 208. Inverse quantization/transform processing unit 208 may be configured to apply an inverse quantization and an inverse transformation to generate reconstructed residual data. As illustrated in FIG. 8, at summer 210, reconstructed residual data may be added to a predictive video block. In this manner, an encoded video block may be reconstructed and the resulting reconstructed video block may be used to evaluate the encoding quality for a given prediction, transformation, and/or quantization. Video encoder 200 may be configured to perform multiple coding passes (e.g., perform encoding while varying one or more of a prediction, transformation parameters, and quantization parameters). The rate-distortion of a bitstream or other system parameters may be optimized based on evaluation of reconstructed video blocks. Further, reconstructed video blocks may be stored and used as reference for predicting subsequent blocks.

As described above, a video block may be coded using an intra prediction mode. Intra prediction processing unit 212 may be configured to select an intra prediction mode for a current video block. Intra prediction processing unit 212 may be configured to use an ISP coding mode may be used for intra prediction. In one example, the ISP coding mode may be based on the ISP coding mode described above with respect to JVET-M1001. Further, according to the techniques herein, intra prediction processing unit 212 may be configured such that some sub-partitionings may be disallowed for some block sizes, if the minimum transform size does not support the sub-partition dimensions. Further, another consideration to disallow sub-partitionings for some block sizes may be that throughput may be adversely affected if sub-partitions and their corresponding transform sizes are small (e.g., 2×2, 1×16 transforms). For example, if a current block size is 4×16 (luma samples) then a split into 4 sub-partitions of 1×16 may not be allowed. Intra prediction processing unit 212 may be configured to evaluate a frame and/or an area thereof and determine an intra prediction mode to use to encode a current block. As illustrated in FIG. 8, intra prediction processing unit 212 outputs intra prediction data (e.g., syntax elements) to entropy encoding unit 218 and transform coefficient generator 204.

Referring again to FIG. 8, inter prediction processing unit 214 may be configured to perform inter prediction coding for a current video block. Inter prediction processing unit 214 may be configured to receive source video blocks and calculate motion information for PUs of a video block. A motion vector may indicate the displacement of a PU (or similar coding structure) of a video block within a current video frame relative to a predictive block within a reference frame. Inter prediction coding may use one or more reference pictures. For example, inter prediction processing unit 214 may locate a predictive video block within a frame buffer (not shown in FIG. 8). It should be noted that inter prediction processing unit 214 may further be configured to apply one or more interpolation filters to a reconstructed residual block to calculate sub-integer pixel values for use in motion estimation. Further, motion prediction may be uni-predictive (use one motion vector) or bi-predictive (use two motion vectors). Inter prediction processing unit 214 may be configured to select a predictive block by calculating a pixel difference determined by, for example, sum of absolute difference (SAD), sum of square difference (SSD), or other difference metrics. Inter prediction processing unit 214 may output motion prediction data for a calculated motion vector to entropy encoding unit 218.

Referring again to FIG. 8, as illustrated in FIG. 8, inter prediction processing unit 214 may receive reconstructed video block via filter unit 216, which may be part of an in-loop filtering process. Filter unit 216 may be configured to perform deblocking, Sample Adaptive Offset (SAO) filtering, and/or Adaptive Loop Filtering (ALF). As described above, in JVET-M1001, ISP coding mode sub-partition boundaries are not considered for deblocking, which causes deblocking to not be performed on the subpartition boundaries, which can lead to visual artifacts. In one example, according to the techniques herein, filter unit 216 may be configured such that deblocking may be performed on sub-partition boundaries.

As described above, in JVET-M1001, the value of bS is used to determine if/how deblocking, is applied to a particular boundary. In one example, filter unit 216 may be configured to set a bS value to a non-zero value (e.g., 2), for ISP coding mode subpartition boundaries. It should be noted that although, ISP coding mode is only used for the luma component, in some examples, the bS value of a corresponding boundary for a chroma component (or the chroma channel) may be set to a non-zero value. Further, in one example, corresponding boundary for a chroma component may be set to as not occurring or be set to have a bS value set to 0. It should be noted that setting a bS value to a non-zero value (e.g., 2) for ISP coding mode sub-partition boundaries does not necessarily mean that deblocking will be performed on the boundary, as other conditions may be required to be satisfied. For example, in one case, a ISP coding mode sub-partition boundary may be required to coincide with an N×N sample deblocking grid. That is, for example if a deblocking grid is 8×8, ISP coding mode subpartition boundaries that coincide with the 8×8 grid may be deblocked.

In one example, filter unit 216 may be configured to set a bS value to a non-zero value (e.g., 2), for ISP coding mode sub-partition boundaries according to the following derivation process of coding subblock boundary:
Inputs to this process are:
- a location (xCb, yCb) specifying the top-left sample of the current coding block relative to the top-left sample of the current picture,
- a variable nCbW specifying the width of the current coding block,
- a variable nCbH specifying the height of the current coding block,
- a variable cIdx specifying the component index of the picture,
- a two-dimensional (nCbW)×(nCbH) array edgeFlags of component with index cIdx,
- a variable edgeType specifying whether a vertical (EDGE_VER) or a horizontal (EDGE_HOR) edge is filtered.

Output of this process is the modified two-dimensional (nCbW)×(nCbH) array edgeFlags of component with index cIdx.

The number of coding subblock in horizontal direction numSbX and in vertical direction numSbY are derived as follows:
If CuPredMode[xCb][yCb] is equal to MODE_INTRA and (IntraSubPartitionsSplitType is equal to ISP_NO_SPLIT or component index cIdx indicates chroma), numSbX and numSbY are both set equal to 1.

Otherwise, If CuPredMode[xCb][yCb] is equal to MODE_INTRA and IntraSubPartitionsSplitType is equal to ISP_VER_SPLIT, and component index cIdx indicates luma, set numSbX equal to NumIntraSubPartitions.

Otherwise, If CuPredMode[xCb][yCb] is equal to MODE_INTRA and IntraSubPartitionsSplitType is equal to ISP_HOR_SPLIT, and component index cIdx indicates luma, set numSbY equal to NumIntraSubPartitions.

Otherwise, numSbX and numSbY are set equal to NumSbX[xCb][yCb] and NumSbY[xCb][yCb], respectively.

Depending on the value of edgeType the following applies:
If edgeType is equal to EDGE_VER and numSbX is greater than 1, the following applies for i=1 . . . min((nCbW/8)−1, numSbX−1), k=0 . . . nCbH−1:

edgeFlags[$i$*Max(8,nCbW/numSbX)][$k$]=1

Otherwise if edgeType is equal to EDGE_HOR and numSbY is greater than 1, the following applies for j=1 . . . min((nCbH/8)−1, numSbY−1), k=0 . . . nCbW−1:

edgeFlags[$k$][$j$*Max(8,nCbH/numSbY)]=1

And the following boundary strength derivation process:
Inputs to this process are:
- a picture sample array recPicture,
- a location (xCb, yCb) specifying the top-left sample of the current coding block relative to the top-left sample of the current picture,
- a variable nCbW specifying the width of the current coding block,
- a variable nCbH specifying the height of the current coding block,
- a variable edgeType specifying whether a vertical (EDGE_VER) or a horizontal (EDGE_HOR) edge is filtered,
- a variable cIdx specifying the component index of the picture,
- a two-dimensional (nCbW)×(nCbH) array edgeFlags of component with index cIdx.

Output of this process is a two-dimensional (nCbW)×(nCbH) array bS specifying the boundary filtering strength of component with index cIdx.

The variables $xD_i$, $yD_j$, xN and yN are derived as follows:
If edgeType is equal to EDGE_VER, $xD_i$ is set equal to (i>>3), $yD_j$ is set equal to (j>>2), xN is set equal to Max(0, (nCbW/8)−1) and yN is set equal to (nCbH/4)−1.

Otherwise (edgeType is equal to EDGE_HOR), $xD_i$ is set equal to (i>>2), $yD_j$ is set equal to (j>>3), xN is set equal to (nCbW/4)−1 and yN is set equal to Max(0, (nCbH/8)−1).

For $xD_i$ with i=0 . . . xN and $yD_j$ with j=0 . . . yN, the following applies:
If edgeFlags[$xD_i$][$yD_j$] is equal to 0, the variable bS[$xD_i$][$yD_j$] is set equal to 0.

Otherwise, the following applies:
The sample values $p_0$ and $q_0$ are derived as follows:
If edgeType is equal to EDGE_VER, $p_0$ is set equal to recPicture [xCb+$xD_i$−1][yCb+$yD_j$] and $q_0$ is set equal to recPicture [xCb+$xD_i$][yCb+$yD_j$].

Otherwise (edgeType is equal to EDGE_HOR), $p_0$ is set equal to recPicture [xCb+$xD_i$][yCb+$yD_j$−1] and $q_0$ is set equal to recPicture [xCb+$xD_i$][yCb+$yD_j$].

The variable bS[xD$_i$][yD$_j$] is derived per component as follows:
  If the sample p$_0$ or q$_0$ is in the coding block of a coding unit coded with intra prediction mode, bS[xD$_i$][yD$_j$] is set equal to 2.

It should be noted that with respect to the derivation process of coding subblock boundary above, according to the techniques herein, in general, an ISP edge internal to a block (e.g., an edge internal to a coding block and aligned with a transform block edge for a component) may be a candidate for deblocking and other conditions may need to be satisfied before it is deblocked. Further, it should be noted that with respect to the boundary strength derivation process above, according to the technique herein, in an embodiment, an edge which is not marked as a candidate for deblocking may be assigned a predetermined value of boundary strength (e.g., 0) and/or in an embodiment, when either side of a boundary (e.g., transform boundary) is coded using intra mode then the boundary strength may be set to predetermined value (e.g., 2) In one example, in order to simplify the execution of deblocking, filter unit 216 may be configured such that the deblocking grid may be set to have particular dimensions (e.g., 4×4 luma sample grid), where, as provided above, boundaries coinciding with the deblocking gird are considered for deblocking. That is, a deblocking grid provides the finest possible granularity for deblocking. In one example, this may be accomplished by: considering only (perpendicular) block sizes (for a component/channel) on either side of the deblocking boundary and the category of edge being deblocked. For example, luma long filter selection may be done by going through Table 6 from top-to-bottom and identifying the first matching entry for block sizes and edge category.

TABLE 6

| Side P (luma samples) | Side Q (luma samples) | Edge Category | Selected luma long filter: Number of samples that can be filtered (P side + Q side) |
|---|---|---|---|
| tuP >= 32 | tuQ >= 32 | Transform boundary | 7 + 7 |
| tuP >= 32 | tuQ < 32 | Transform boundary | 7 + 3 |
| tuP < 32 | tuP >= 32 | Transform boundary | 3 + 7 |
| tuP < 32 | tuQ < 32 | Transform boundary | 3 + 3 |
| * | * | Prediction boundary | 3 + 3 |

With respect to Table 6 and Tables 7-10, below, in an example, (P side+Q side) for luma correspond to variables maxFilterLengthP and maxFilterLengthQ in filtering process listed below:
Inputs to this process are:
  the variables maxFilterLengthP and maxFilterLengthQ,
  the sample values p$_i$ and q$_j$ with i=0 ... maxFilterLengthP and j=0 ... maxFilterLengthQ,
  the locations of p$_i$ and q$_j$, (xP$_i$, yP$_i$) and (xQ$_j$, yQ$_j$) with i=0 ... maxFilterLengthP−1 and j=0 ... maxFilterLengthQ−1,
  a variable t$_C$.
Outputs of this process are:
  the filtered sample values p$_i'$ and q$_j'$ with i=0 ... maxFilterLengthP−1, j=0 ... maxFilterLengthQ−1.
The variables refMiddle, refP and refQ are derived as follows:
  If maxFilterLengthP is equal to maxFilterLengthQ
  If maxFilterLengthP is equal to 5

$$\text{refMiddle}=(p_4+p_3+2^*(p_2+p_1+p_0+q_0+q_1+q_2)+q_3+q_4+8)>>4$$

Otherwise $$\text{refMiddle}=(p_6+p_5+p_4+p_3+p_2+p_1+2^*(p_0+q_0)+q_1+q_2+q_3+q_4+q_5+q_6+8)>>4$$

Otherwise If ((maxFilterLengthQ is equal to 7 and maxFilterLengthP is equal to 5) or (maxFilterLengthQ is equal to 5 and maxFilterLengthP is equal to 7)

$$\text{refMiddle}=(p_4+p_3+2^*(p_2+p_1+p_0+q_0+q_1+q_2)+q_3+q_4+8)>>4$$

Otherwise If ((maxFilterLengthQ is equal to 5 and maxFilterLengthP is equal to 3) or (maxFilterLengthQ is equal to 3 and maxFilterLengthP is equal to 5)

$$\text{refMiddle}=(p_3+p_2+p_1+p_0+q_0+q_1+q_2+q_3+4)>>3$$

Otherwise If ((maxFilterLengthQ is equal to 7 and maxFilterLengthP is equal to 3)

$$\text{refMiddle}=(2^*(p_2+p_1+p_0+q_0)+p_0+p_1+q_1+q_2+q_3+q_4+q_5+q_6+8)>>4$$

Otherwise $$\text{refMiddle}=(p_6+p_5+p_4+p_3+p_2+p_1+2^*(q_2+q_1+q_0+p_0)+q_0+q_1+8)>>4$$

$$\text{refP}=(p_{maxFilterLengthP}+p_{maxFilterLengthP-1}+1)>>1$$

$$\text{refQ}=(q_{maxFilterLengthQ}+q_{maxFilterLengthQ-1}+1)++1$$

The variables f$_i$ and t$_C$PD$_i$ are defined as follows:
If maxFilterLengthP is equal to 7

$$f_{0...6}=\{59,50,41,32,23,14,5\}$$

$$t_CPD_{0...6}=\{6,5,4,3,2,1,1\}$$

Otherwise if maxFilterLengthP is equal to 5

$$f_{0...4}=\{58,45,32,19,6\}$$

$$t_CPD_{0...4}=\{6,5,4,3,2\}$$

Otherwise $$f_{0...2}=\{53,32,11\}$$

$$t_CPD_{0...2}=\{6,4,2\}$$

The variables gi and t$_C$QD$_j$ are defined as follows:
If maxFilterLengthQ is equal to 7

$$g_{0...6}=\{59,50,41,32,23,14,5\}$$

$$t_CQD_{0...6}=\{6,5,4,3,2,1,1\}$$

Otherwise if maxFilterLengthQ is equal to 5

$$g_{0...4}=\{58,45,32,19,6\}$$

$$t_CQD_{0...4}=\{6,5,4,3,2\}$$

Otherwise $$g_{0...2}=\{53,32,11\}$$

$$t_CQD_{0...2}=\{6,4,2\}$$

$p_i'=\text{Clip3}(p_i-(t_C*t_CPD_i)>>1,p_i+(t_C*t_CPD_i)>>1,$
$\quad (\text{refMiddle}*f_i+\text{refP}*(64-f_i)+32)>>6)$ $q_j'=\text{Clip3}(q_j-(t_C*t_CQD_j)>>1,q_j+(t_C*t_CQD_j)>>1,$
$\quad (\text{refMiddle}*g_j+\text{refP}*(64-g_j)+32)>>6)$ where i=0 . . . maxFilterLengthP−1 and j=0 . . . maxFilterLengthQ−1

When one or more of the following conditions are true, the filtered sample value, $p_i'$ is substituted by the corresponding input sample value $p_i$: with i=0 . . . maxFilterLengthP−1:
  pcm_loop_filter_disabled_flag is equal to 1 and pcm_flag $[xP_0][yP_0]$ is equal to 1.
  cu_transquant_bypass_flag of the coding unit that includes the coding block containing the sample $p_0$ is equal to 1.

When one or more of the following conditions are true, the filtered sample value, $q_i'$ is substituted by the corresponding input sample value $q_j$: with j=0 . . . maxFilterLengthQ−1:
  pcm_loop_filter_disabled_flag is equal to 1 and pcm_flag $[xQ_0][yQ_0]$ is equal to 1.
  cu_transquant_bypass_flag of the coding unit that includes the coding block containing the sample $q_0$ is equal to 1.

Where:
pcm_loop_filter_disabled_flag specifies whether the loop filter process is disabled on reconstructed samples in a coding unit with pcm_flag equal to 1 as follows:
  If pcm_loop_filter_disabled_flag is equal to 1, the deblocking filter and sample adaptive offset filter processes on the reconstructed samples in a coding unit with pcm_flag equal to 1 are disabled.
  Otherwise (pcm_loop_filter_disabled_flag value is equal to 0), the deblocking filter and sample adaptive offset filter processes on the reconstructed samples in a coding unit with pcm_flag equal to 1 are not disabled.
When pcm_loop_filter_disabled_flag is not present, it is inferred to be equal to 0.
Value of cu_transquant_bypass_flag indicates whether the inverse transform and scaling (dequantization) processing steps are bypassed.
In one example, P side or Q side being equal to 3 corresponds to the strong filtering described in the filtering process below:
Inputs to this process are:
  the sample values $p_i$ and $q_i$ with i=0 . . . 3,
  the locations of $p_i$ and $q_i$, $(xP_i, yP_i)$ and $(xQ_i, yQ_i)$ with i=0 . . . 2,
  a variable dE,
  the variables dEp and dEq containing decisions to filter samples p1 and q1, respectively,
  a variable $t_C$.
Outputs of this process are:
  the number of filtered samples nDp and nDq,
  the filtered sample values $p_i'$ and $q_j'$ with i=0 . . . nDp−1, j=0 . . . nDq−1.
Depending on the value of dE, the following applies:
  If the variable dE is equal to 2, nDp and nDq are both set equal to 3 and the following strong filtering applies:

$t_CD_{0\ldots2}=\{3,2,1\}$ $p_0'=\text{Clip3}(p_0-t_CD[0]*t_C,p_0+t_CD[0]*t_C,(p_2+2*p_1+$
$\quad 2*p_0+2*q_0+q_1+4)>>3)$ $p_1'=\text{Clip3}(p_1-t_CD[1]*t_C,p_1+t_CD[1]*t_C,(p_2+p_1+p_0+q_0+$
$\quad 2)>>2)$ $p_2'=\text{Clip3}(p_2-t_CD[2]*t_C,p_2+t_CD[2]*t_C,(2*p_3+3*p_2+$
$\quad p_1+p_0+q_0+4)>>3)$ $q_0'=\text{Clip3}(q_0-t_CD[0]*t_C,q_0+t_CD[0]*t_C,(p_1+2*p_0+$
$\quad 2*q_0+2*q_1+q_2+4)>>3)$ $q_1'=\text{Clip3}(q_1-t_CD[1]*t_C,q_1+t_CD[1]*t_C,(p_0+q_0+q_1+q_2+$
$\quad 2)>>2)$ $q_2'=\text{Clip3}(q_2-t_CD[2]*t_C,q_2+t_CD[2]*t_C,(p_0+q_0+q_1+$
$\quad 3*q_2+2*q_3+4)>>3)$ Otherwise, nDp and nDq are set both equal to 0 and the following weak filtering applies:
The following applies:

$\Delta=(9*(q_0-p_0)-3*(q_1-p_1)+8)>>4$

When $\text{Abs}(\Delta)$ is less than $t_C*10$, the following ordered steps apply:
  The filtered sample values $p_0'$ and $q_0'$ are specified as follows:

$\Delta=\text{Clip3}(-t_C,t_C,\Delta)$ $p_0'=\text{Clip1}_Y(p_0+\Delta)$ $q_0'=\text{Clip1}_Y(q_0-\Delta)$ When dEp is equal to 1, the filtered sample value pf is specified as follows:

$\Delta p=\text{Clip3}(-(t_C>>1),t_C>>1,(((p_2+p_0+1)>>1)-p_1+\Delta)$
$\quad >>1)$ $p_1'=\text{Clip1}_Y(p_1+\Delta p)$ When dEq is equal to 1, the filtered sample value $q_1'$ is specified as follows:

$\Delta q=\text{Clip3}(-(t_C>>1),t_C>>1,(((q_2+q_0+1)>>1)-q_1-\Delta)$
$\quad >>1)$ $q_1'=\text{Clip1}_Y(q_1+\Delta q)$ nDp is set equal to dEp+1 and nDq is set equal to dEq+1.
When nDp is greater than 0 and one or more of the following conditions are true, nDp is set equal to 0:
pcm_loop_filter_disabled_flag is equal to 1 and pcm_flag $[xP_0][yP_0]$ is equal to 1.
cu_transquant_bypass_flag of the coding unit that includes the coding block containing the sample $p_0$ is equal to 1.
When nDq is greater than 0 and one or more of the following conditions are true, nDq is set equal to 0:
pcm_loop_filter_disabled_flag is equal to 1 and pcm_flag $[xQ_0][yQ_0]$ is equal to 1.
cu_transquant_bypass_flag of the coding unit that includes the coding block containing the sample $q_0$ is equal to 1.

It should be noted that use of Table 6 minimizes the number of conditional checks and avoids inconsistent operations along different edges (e.g., inside the CTU).

In one example, luma long filter selection may be done by going through Table 7 from top-to-bottom and identifying the first matching entry for block sizes and edge category.

TABLE 7

| Side P (luma samples) | Side Q (luma samples) | Edge Category | Selected luma long filter: Number of samples that can be filtered (P side + Q side) |
|---|---|---|---|
| tuP >= 32 | tuQ >= 32 | Transform boundary | 7 + 7 |
| tuP >= 32 | tuQ < 32 | Transform boundary | 7 + 5 |
| tuP < 32 | tuP >= 32 | Transform boundary | 5 + 7 |
| tuP < 32 | tuQ < 32 | Transform boundary | 3 + 3 |
| * | * | Prediction boundary | 3 + 3 |

It should be noted that use of Table 7 minimizes the number of conditional checks and avoids inconsistent operations along different edges (e.g. inside the CTU).

In one example, luma long filter selection may be done by going through Table 8 from top-to-bottom and identifying the first matching entry for block sizes and edge category.

TABLE 8

| Side P (luma samples) | Side Q (luma samples) | Edge Category | Selected luma long filter: Number of samples that can be filtered (P side + Q side) |
|---|---|---|---|
| tuP >=32 | tuQ >= 32 | Transform boundary | 5 + 5 |
| tuP >= 32 | tuQ < 32 | Transform boundary | 5 + 3 |
| tuP < 32 | tuP >= 32 | Transform boundary | 3 + 5 |
| tuP < 32 | tuQ < 32 | Transform boundary | 3 + 3 |
| * | * | Prediction boundary | 3 + 3 |

It should be noted that use of Table 8 minimizes the number of conditional checks and avoids inconsistent operations along different edges (e.g., inside the CTU and along the top CTU boundary).

In one example, luma long filter selection may be done by going through Table 9 or Table 10 from top-to-bottom and identifying the first matching entry for block sizes and edge category.

TABLE 9

| Side P (luma samples) | Side Q (luma samples) | Edge Category | Selected luma long filter: Number of samples that can be filtered (P side + Q side) |
|---|---|---|---|
| tuP >= 32 | tuQ >= 32 | Transform boundary | 7 + 7 |
| * | * | Prediction boundary | 3 + 3 |

TABLE 10

| Side P (luma samples) | Side Q (luma samples) | Edge Category | Selected luma long filter: Number of samples that can be filtered (P side + Q side) |
|---|---|---|---|
| tuP >= 32 | tuQ >= 32 | Transform boundary | 5 + 5 |
| * | * | Prediction boundary | 3 + 3 |

In one example, chroma long filter selection may be done by going through Table 11 or Table 12 from top-to-bottom and identifying the first matching entry for block sizes and edge category.

TABLE 11

| Side P (luma samples) | Side Q (luma samples) | Edge Category | Selected luma long filter: Number of samples that can be filtered (P side + Q side) |
|---|---|---|---|
| tuP >= 8 | tuQ >= 8 | Transform boundary | 3 + 3 |
| * | * | * | 1 + 1 |

TABLE 12

| Side P (luma samples) | Side Q (luma samples) | Edge Category | Selected luma long filter: Number of samples that can be filtered (P side + Q side) |
|---|---|---|---|
| tuP >= 8 | tuQ >= 8 | Transform boundary | 3 + 3 |
| tuP >= 8 | tuQ < 8 | Transform boundary | 3 + 1 |
| tuP < 8 | tuP >= 8 | Transform boundary | 1 + 3 |
| * | * | * | 1 + 1 |

With respect to Table 11 and Table 12, in an example, P side or Q side being 3 for chroma corresponds to the filtering operation when filterLength is equal to 3 in the process described below. In an example, P side or Q side being 1 for chroma corresponds to the filtering operation when filterLength is not equal to 3 in the process described below. In other examples, the filtering operation for 1+1 may correspond to the chroma weak filtering operation described above.

This process is only invoked when ChromaArrayType is not equal to 0.

Inputs to this process are:
 the variable filterLength
 the chroma sample values $p_i$ and $q_i$ with i=0 ... filterLength,
 the chroma locations of $p_i$ and $q_i$, $(xP_i, yP_i)$ and $(xQ_i, yQ_i)$,
 a variable $t_C$ Outputs of this process are.
 the filtered sample values $p_i'$ and $q_j'$ with i=0 ... filterLength−1.
  Depending on the value of filterLength, the following applies:
  If the variable filterLength is equal to 3, the following strong filtering applies:

$p_0' = \text{Clip3}(p_0 - t_C, p_0 + t_C, (p_3 + p_2 + p_1 + 2*p_0 + q_0 + q_1 + q_2 + 4) >> 3)$ $p_1' = \text{Clip3}(p_1 - t_C, p_1 + t_C, (2*p_3 + p_2 + 2*p_1 + p_0 + q_0 + q_1 + 4) >> 3)$ $p_2' = \text{Clip3}(p_2 - t_C, p_2 + t_C, (3*p_3 + 2*p_2 + p_1 + p_0 + q_0 + 4) >> 3)$ $q_0' = \text{Clip3}(q_0 - t_C, q_0 + t_C, (p_2 + p_1 + p_0 + 2*q_0 + q_1 + q_2 + q_3 + 4) >> 3)$ $q_1' = \text{Clip3}(q_1 - t_C, q_1 + t_C, (p_1 + p_0 + q_0 + 2*q_1 + q_2 + 2*q_3 + 4) >> 3)$ $q_2' = \text{Clip3}(q_2 - t_C, q_2 + t_C, (p_0 + q_0 + q_1 + 2*q_2 + 3*q_3 + 4) >> 3)$ Otherwise, the following weak filtering applies:

$\Delta = \text{Clip3}(-t_C, t_C, ((((q_0 - p_0) >> 2) + p_1 - q_1 + 4) >> 3))$ $p_0' = \text{Clip1}_C(p_0 + \Delta)$ $q_0' = \text{Clip1}_C(q_0 - \Delta)$ When one or more of the following conditions are true, the filtered sample value, $p_i'$ is substituted by the corresponding input sample value $p_i$: with i=0 ... filterLength−1:
 pcm_loop_filter_disabled_flag is equal to 1 and pcm_flag [$xP_0$*SubWidthC][$yP_0$*SubHeightC] is equal to 1.
 cu_transquant_bypass_flag of the coding unit that includes the coding block containing the sample $p_0$ is equal to 1.

When one or more of the following conditions are true, the filtered sample value, $q_i'$ is substituted by the corresponding input sample value $q_i$: with i=0 ... filterLength−1:
 pcm_loop_filter_disabled_flag is equal to 1 and pcm_flag [$xQ_0$*SubWidthC][$yQ_0$*SubHeightC] is equal to 1.
 cu_transquant_bypass_flag of the coding unit that includes the coding block containing the sample $q_0$ is equal to 1.

With respect to Tables 6-12, in one example, one or more of the following may apply: when reading sample value for decisions, non-deblocked sample values may be read and when reading sample values for filtering, non-deblocked sample values may be read. It should be noted that, in some cases, as a consequence of the simplification in selection logic it may not be possible to perform parallel execution of deblocking in horizontal (or vertical) direction without use of an additional buffer.

In one example, filter unit 216 may be configured such that a deblocking processing order is determined or selected for edges when deblocking. In one example, a processing order may include deblocking horizontal deblocking edges from top-to-bottom (prior to deblocking an edge, edges above it are deblocked) then deblock vertical deblocking edges from left-to-right (prior to deblocking an edge, edges to the left of it are deblocked). In one example, a processing order may include deblocking vertical deblocking edges from left-to-right (prior to deblocking an edge, edges to the left of it are deblocked) then deblock horizontal deblocking edges from top-to-bottom (prior to deblocking an edge, edges above it are deblocked).

In one example, filter unit 216 may be configured such that a deblocking processing order may be defined. For example, CTUs are processed in coding order and within a CTU, CUs are processed in coding order where, for a CU only left and top edges are processed. In an example when processing a block vertical transform edges that may be deblocked are first processed from left-to-right, and then horizontal transform edges that may be deblocked are processed from top-to-bottom. In an example when processing a block horizontal transform edges that may be deblocked are processed from top-to-bottom, and then vertical transform edges that may be deblocked are first processed from left-to-right.

In one example, when reading sample value for decisions, non-deblocked as well as deblocked sample values may be read. In one example, when reading sample values for filtering, non-deblocked as well as deblocked sample values may be read.

In one example, filter unit 216 may be configured such that tile group boundary edges may be deblocked using a second pass. In one example, filter unit 216 may be configured such that tile boundary edges may be deblocked using a second pass. In one example, filter unit 216 may be configured such that slice boundary edges may be deblocked using a second pass. In one example, filter unit 216 may be configured such that motion constrained tile set (MCTS) boundary edges may be deblocked using a second pass. In an example, for tile group/tile/slice/MCTS vertical boundary (subset or all of) samples to the left and (subset or all of) samples to the right may be deblocked/filtered before the samples at the tile group boundary are deblocked/filtered. In an example, for tile group/tile/slice/MCTS horizontal boundary (subset or all of) samples above and (subset or all of) samples below may be deblocked/filtered before the samples at the tile group boundary are deblocked/filtered.

In one example, filter unit 216 may be configured such that an x+x (e.g., 5) deblocking is performed on all deblocking edges on a deblocking grid. In one example, the size of a block on a side would lead to both edges of the block being deblocked (samples at the boundary of both edges are modified) with a single filtering operation.

As described above, in JVET-M1001, CTUs are partitioned according a quadtree plus multi-type tree (QTMT) structure. In JVET-M1001, the luma channel and the chroma channel may be partitioned according to separate trees, which is referred to as using dual trees. In JVET-M1001, when blocks that are 8×8 luma grid aligned and contain sub-blocks, the sub-block boundaries (at distance of 8) are marked as a candidate deblocking edge. In one example, according to the techniques herein, filter unit 216 may be configured such that when separate (dual) trees are used for partitioning and when the chroma channel is being processed, the boundary strength is determined based on values corresponding to the chroma component(s) (e.g., chroma component motion vectors). In one example, according to the techniques herein, filter unit 216 may be configured such that when separate (dual) trees are used for partitioning and when the luma channel is being processed, the boundary strength is determined based on values corresponding to the luma component(s) only (e.g., luma component motion vectors). Further, it should be noted that in case of separate (dual) luma and chroma trees, in some cases, the luma and chroma edges may not be aligned. In one example, according to the techniques herein, filter unit 216 may be configured such that when processing a single partitioning tree, a boundary strength corresponding to all color components may be set and when processing a dual tree, a respective boundary strength corresponding to the component(s) being processed may be set.

In JVET-M1001, internal (e.g. sub-block) edges of a transform block may be deblocked even in the case of non-zero residual. In some cases, it may be desirable to deblock only when residue is zero or small. In one example, according to the techniques herein, filter unit 216 may be configured such that deblocking of internal (sub-block) edges of a transform block occurs only when the sum of absolute values of the residual is smaller than a threshold. In one example, according to the techniques herein, filter unit 216 may be configured such that deblocking of internal (sub-block) edges of a transform block occurs only when the number of non-zero coefficients is smaller than a threshold. As described above, in JVET-M1001, a bS value is derived as one of 0, 1, or 2, and the bS value may be used in filtering decisions. In one example, according to the techniques herein, filter unit 216 may be configured such that filtering decisions are additionally or alternatively determined based on whether a Q block or a P block is a large block (e.g., a transform block, prediction block, coding block, sub-block). In one example, a determination of whether a Q block is a large block (i.e., bSideQisLargeBlk) or a P block is a large block (i.e., bSidePisLargeBlk) may be as follows:

If edgeType is equal to EDGE_VER, the following ordered steps apply:

. . . .

The variables bSidePisLargeBlk and bSideQisLargeBlk are derived as follows:
If edgeType is equal to EDGE_HOR, and (y luma position of sample $p_{0,0}$% CtbSizeY) is equal to 0, set bSidePisLargeBlk to 0
Otherwise, If $p_{0,0}$ belongs to transform block with width in luma samples greater than or equal to 32, bSidePisLargeBlk is set equal to 1 otherwise bSidePisLargeBlk is set equal to 0.
If $q_{0,0}$ belongs to transform block with width in luma samples greater than or equal to 32, bSideQisLargeBlk is set equal to 1 otherwise bSideQisLargeBlk is set equal to 0.

. . . .

Otherwise, (edgeType is equal to EDGE_HOR), the following ordered steps apply:

. . . .

The variables bSidePisLargeBlk and bSideQisLargeBlk are derived as follows:
If $p_{0,0}$ belongs to transform block with height greater than or equal to 32, bSidePisLargeBlk is set equal to 1 otherwise bSidePisLargeBlk is set equal to 0.
If $q_{0,0}$ belongs to transform block with height greater than or equal to 32, bSideQisLargeBlk is set equal to 1 otherwise bSideQisLargeBlk is set equal to 0.

. . . .

As described above with respect to FIGS. 10A-10B, the SBT type and SBT position information in JVET-M1001 allow for eight SBT partitions, as illustrated in FIG. 10B. With respect to each of (a)-(h) in FIG. 10B, the size (i.e., the H or W) of the CU (or other video block) being split into sub-blocks result in different sizes of sub-blocks $SB_0$ and $SB_1$. Table 13 provides a summary of the different sizes sub-blocks $SB_0$ and $SB_1$ according to *the size of the CU that is split. In Table* 13, for a CU having a height in luma samples, H, for horizontal splits (a)-(d), the resulting height in luma samples, $h_L$, is specified for sub-blocks $SB_0$ and $SB_1$. Likewise, in Table 13, for a CU having a width in luma samples, W, for vertical splits (e)-(h), the resulting width in luma samples, $w_L$, is specified for sub-blocks $SB_0$ and $SB_1$. It should be noted that in some cases, if a CU has a height (or width) less than a threshold, partitioning a CU into $SB_0$ and $SB_1$ may not be allowed. For example, referring to Table 13, cases are not shown for a CU having a height (or width) less than a threshold of 8. It should be noted that in other example, other thresholds may be used, e.g., a threshold of 16. In such examples, Table 13 may be updated according. In one example, luma and chroma may be partitioned in a differ manner. For example, if a video block is in an intra-slice with separate trees, luma and chroma may have different constraints. Further, in one example, SBT information may be signaled for luma and chroma separately (e.g., if a video block is in an intra-slice with separate trees). Further, as described above, in JVET-M1001, if one side of CU is has 8 luma samples, corresponding H/4 or W/4 split not allowed. Such instances are illustrated as NA in Table 13.

TABLE 13

|  |  |  | Size of H of CU | | | |
|---|---|---|---|---|---|---|
|  |  |  | 64 | 32 | 16 | 8 |
| Sub-block partition | (a) | $h_L$: $SB_0$, $SB_1$ | 32, 32 | 16, 16 | 8, 8 | 4, 4 |
|  | (b) | $h_L$: $SB_0$, $SB_1$ | 32, 32 | 16, 16 | 8, 8 | 4, 4 |
|  | (c) | $h_L$: $SB_0$, $SB_1$ | 16, 48 | 8, 24 | 4, 12 | NA |
|  | (d) | $h_L$: $SB_0$, $SB_1$ | 48, 16 | 24, 8 | 12, 4 | NA |
|  |  |  | Size of W of CU | | | |
|  |  |  | 64 | 32 | 16 | 8 |
|  | (e) | $w_L$: $SB_0$, $SB_1$ | 32, 32 | 16, 16 | 8, 8 | 4, 4 |
|  | (f) | $w_L$: $SB_0$, $SB_1$ | 32, 32 | 16, 16 | 8, 8 | 4, 4 |
|  | (g) | $w_L$: $SB_0$, $SB_1$ | 16, 48 | 8, 24 | 4, 12 | NA |
|  | (h) | $w_L$: $SB_0$, $SB_1$ | 48, 16 | 24, 8 | 12, 4 | NA |

For purposes of determining if/how to apply a deblocking each entry in Table 13 may be assigned a Case. Table 14 illustrates an example of cases assigned to each entry in Table 13. It should be noted that in the example illustrated in Table 14, common cases are assigned to corresponding horizontal and vertical SBT splits. In other examples, distinct cases may be assigned for horizontal splits and vertical SBT splits.

TABLE 14

|  |  |  | Size of H of CU | | | |
|---|---|---|---|---|---|---|
|  |  |  | 64 | 32 | 16 | 8 |
| Sub-block partition | (a) | $h_L$: $SB_0$, $SB_1$ | Case A | Case E | Case I | Case M |
|  | (b) | $h_L$: $SB_0$, $SB_1$ | Case D | Case H | Case L | Case N |
|  | (c) | $h_L$: $SB_0$, $SB_1$ | Case B | Case F | Case J | NA |
|  | (d) | $h_L$: $SB_0$, $SB_1$ | Case C | Case G | Case K | NA |
|  |  |  | Size of W of CU | | | |
|  |  |  | 64 | 32 | 16 | 8 |
|  | (e) | $w_L$: $SB_0$, $SB_1$ | Case A | Case E | Case I | Case M |
|  | (f) | $w_L$: $SB_0$, $SB_1$ | Case D | Case H | Case L | Case N |
|  | (g) | $w_L$: $SB_0$, $SB_1$ | Case B | Case F | Case J | NA |
|  | (h) | $w_L$: $SB_0$, $SB_1$ | Case C | Case G | Case K | NA |

As described above, with respect to Table 2, the horizontal (H) and vertical (V) core transforms performed on a sub-block may be based on the position of the sub-block, the color channel of the component of the sub-block, and the size for the sub-block. Thus, each case in Table 14 may also be associated with horizontal (H) and vertical (V) core transforms. Thus, a case in Table 14 may corresponds to whether a transform is performed on $SB_0$ or $SB_1$, a size of $SB_0$ or $SB_1$, and the horizontal (H) and vertical (V) core transforms performed on $SB_0$ or $SB_1$. Thus, determining if/how to apply deblocking to each case illustrated in Table 14 may be applicable for a sub-block having a position, a size, and core transforms corresponding to a case illustrated in Table 14, regardless of the SBT mode techniques used to generate the sub-block. That is, for example, "CE6: Sub-block transform for inter blocks (CE6.4.1)," 13th Meeting of ISO/IEC JTC1/SC29/WG11 9-18 Jan. 2019, Marrakech, M A, document JVET-M0140, which is referred to as JVET-M0140, describes where QT partitioning may be used to generate an SBT sub-block. In JVET-M0140, residual data is provided for one of the sub-blocks. Thus, a sub-block generated according JVET-M0140 may corresponding to a case in Table 14 by virtue of having the same size (e.g., h or w) and core transforms.

In one example, according to the technique herein, for purposes of deblocking, rules that apply to a regular edge (e.g., CU edges) may also be applied to SBT sub-block edges. Table 15 illustrates where for each case in Table 14, three SBT sub-block edges are specified (1) Left or Top (L or T); (2) Middle (M); and (3) Right or Bottom (R or B) and for each edge, the maximum number of samples that may be modified on each side of the edge is specified; the allowed long filters for deblocking according JVET-M0471, described above, is specified; and the preferred long filtering according to the techniques herein is specified.

With respect to Table 15, when "undetermined" is provided for the maximum number of samples that may be modified on each side of the edge, this indicates that the number of samples depends on the adjacent block.

With respect to Table 15, when "?" is provided for a filter, this indicates that the adjacent block size may determine which of the three values 7, 5, 3 are possible. For example, for ?+7, if edge to the left (or above) is large block then both 7+7 and 3+7 are allowed. However, if the edge to the left (or above) is not a large block, then only 3+7 is allowed.

With respect to Table 15, when "*None" is provided for a filter, this indicates that no long filter can be used at the edge. For example, a large block condition applies, i.e., orthogonal block size of side being deblocked is greater than or equal to a threshold e.g. 32 (in luma samples), is not satisfied.

Finally, with respect to Table 15, when "?" is along with None* is provided for a filter, (e.g. ?+None* or None*+?) then long filter may still be used at the edge if corresponding adjacent block is a large block, however the long filter type can only be ?+3 or 3+?, respectively.

TABLE 15

| Case | Edge | Maximum number of samples that may be modified on left or top (P) side of edge | Maximum number of samples that may be modified on right or bottom (Q) side of edge | JVET-M0471 long filters allowed for deblocking | Preferred long filtering |
|---|---|---|---|---|---|
| A | L or T | undetermined | 16 | ? +7, ? +5, ? + 3 | ? + 7 |
|  | M | 16 | 16 | 7 +7, 5 + 5, 7 +3, 5 + 3, 3 + 7, 3 + 5 | 7 + 7 |
|  | R or B | 16 | undetermined | 7 + ?, 5 + ?, 3 + ? | 7 + ? |

TABLE 15-continued

| Case | Edge | Maximum number of samples that may be modified on left or top (P) side of edge | Maximum number of samples that may be modified on right or bottom (Q) side of edge | JVET-M0471 long filters allowed for deblocking | Preferred long filtering |
|---|---|---|---|---|---|
| B | L or T | undetermined | 8 | ? + 5, ? + 3 | ? + None* |
|   | M | 8 | 24 | 3 + 7, 3 + 5, 5 + 7, 5 + 5 | None* + None* |
|   | R or B | 24 | undetermined | 7 + ?, 5 + ?, 3 + ? | None* + ? |
| C | L or T | undetermined | 24 | ? + 7, ? + 5, ? + 3 | ? + None* |
|   | M | 24 | 8 | 7 + 3, 5 + 3, 7 + 5, 5 + 5 | None* + None* |
|   | R or B | 8 | undetermined | 5_?, 3 + ? | None* + ? |
| D | L or T | undetermined | 16 | ? + 7, ? + 5. ? + 3 | ? + 7 |
|   | M | 16 | 16 | 7 + 7, 5 + 5, 7+ 3, 5 + 3, 3 + 7, 3 + 5 | 7 + 7 |
|   | R or B | 16 | undetermined | 7 + ?, 5 + ?, 3 + ? | 7 + ? |
| E | L or T | undetermined | 8 | ? + 7, ? + 5. ? + 3 | ? + None* |
|   | M | 8 | 8 | 7 + 5, 5 + 5, 7 + 3, 5 + 3, 3 + 7, 3 + 5 | None* + None* |
|   | R or B | 8 | undetermined | 7 + ?, 5 + ?, 3 + ? | None* + ? |
| F | L or T | undetermined | 4 | ? + 3 | ? + None* |
|   | M | 4 | 12 | 3 + 7, 3 + 5 | None* + None* |
|   | R or B | 12 | undetermined | 7 + ?, 5 + ?, 3 + ? | None* + ? |
| G | L or T | undetermined | 12 | ? +7, ? + 5, ? + 3 | ? + None* |
|   | M | 12 | 4 | 7 + 3,5 + 3 | None* + None* |
|   | R or B | 4 | undetermined | 3 + ? | None* + ? |
| H | L or T | undetermined | 8 | ? + 7, ? + 5, ? + 3 | ? + None* |
|   | M | 8 | 8 | 7 + 5, 5 + 5, 7 + 3, 5 + 3, 3 + 7, 3 + 5 | None* + None* |
|   | R or B | 8 | undetermined | 7 + ?, 5 + ?, 3 + ? | None* + ? |
| I | L or T | undetermined | 4 | ? + 3 | ? + None* |
|   | M | 4 | 4 | None | None* + None* |
|   | R or B | 4 | undetermined | 3 + ? | None* + ? |
| J | L or T | undetermined | 2 | ? + 3 | ? + None* |
|   | M | 2 | 6 | None | None* + None* |
|   | R or B | 6 | undetermined | 5 + ?, 3 + ? | None* + ? |
| K | L or T | undetermined | 6 | ? + 5, ? + 3 | ? + None* |
|   | M | 6 | 2 | None | None* + None* |
|   | R or B | 2 | undetermined | None | None* + None* |
| L | L or T | undetermined | 4 | ? + 3 | ? + None* |
|   | M | 4 | 4 | None | None* + None* |
|   | R or B | 4 | undetermined | 3 + ? | None* + ? |
| M | L or T | undetermined | 2 | None | None* + None* |
|   | M | 2 | 2 | None | None* + None* |
|   | R or B | 2 | undetermined | None | None* + None* |
| N | L or T | undetermined | 2 | None | None* + None* |
|   | M | 2 | 2 | None | None* + None* |
|   | R or B | 2 | undetermined | None | None* + None* |

With respect to Table 15, it should be noted that the only condition where a middle edge of block using SBT is deblocked is when the block's width (or height) is >=64 as the large block condition is not satisfied for the remaining cases. This corresponds to Cases A and D and as illustrated, the preferred filtering in that case is 7+7. It should be noted that here the large block condition is evaluated based on the transform size and not the coding block size (for outside as well as internal edges). Thus, in one example, according to the techniques herein, a marking process may be that an internal (i.e., middle) edge of an SBT is marked as a candidate for luma strong and luma weak filter deblocking. Further, an internal edge of an SBT may be candidate for luma long filter deblocking if the (P-side and/or Q-side) block's dimension perpendicular to the direction of edge being deblocked is >=64. Further, in one example, according to the techniques herein, for an internal edge of SBT block, the motion vector based boundary strength determination may be skipped for blocks not using sub-block motion vectors (since the motion vector and reference pictures on either side of the boundary is the same).

As described above, a chroma format, may define the number of chroma samples included in a video block with respect to the number of luma samples included in a video block and for the 4:2:0 sampling format, the sampling rate for the luma component is twice that of the chroma components for both the horizontal and vertical directions. Table 15 is a corresponds to Table 13 for the case of the 4:2:0 sampling format. In Table 15, for a CU having a height in luma samples, H, for horizontal splits (a)-(d), the resulting height in chroma samples, $h_C$, is specified for sub-blocks $SB_0$ and $SB_1$. Likewise, in Table 15, for a CU having a width in luma samples, W, for vertical splits (e)-(h), the resulting width in chroma samples, $w_C$, is specified for sub-blocks $SB_0$ and $SB_1$.

TABLE 16

|  |  |  | Size of H of CU | | | |
|---|---|---|---|---|---|---|
|  |  |  | 64 | 32 | 16 | 8 |
| Sub-block | (a) | $h_C$: $SB_0$, $SB_1$ | 16, 16 | 8, 8 | 4, 4 | 2, 2 |
|  | (b) | $h_C$: $SB_0$, $SB_1$ | 16, 16 | 8, 8 | 4, 4 | 2, 2 |
|  | (c) | $h_C$: $SB_0$, $SB_1$ | 8, 24 | 4, 12 | 2, 6 | NA |
|  | (d) | $h_C$: $SB_0$, $SB_1$ | 24, 8 | 12, 4 | 6, 2 | NA |

TABLE 16-continued

|  |  |  | Size of W of CU | | | |
|---|---|---|---|---|---|---|
|  |  |  | 64 | 32 | 16 | 8 |
|  | (e) | $w_C$: $SB_0$, $SB_1$ | 16, 16 | 8, 8 | 4, 4 | 2, 2 |
|  | (f) | $w_C$: $SB_0$, $SB_1$ | 16, 16 | 8, 8 | 4, 4 | 2, 2 |
|  | (g) | $w_C$: $SB_0$, $SB_1$ | 8, 24 | 4, 12 | 2, 6 | NA |
|  | (h) | $w_C$: $SB_0$, $SB_1$ | 24, 8 | 12, 4 | 6, 2 | NA |

Table 17 illustrates an example of cases assigned to each entry in Table 16. It should be noted that in the example illustrated in Table 17, common cases are assigned to corresponding horizontal and vertical SBT splits. In other examples, distinct cases may be assigned for horizontal splits and vertical SBT splits.

TABLE 17

|  |  |  | Size of H of CU | | | |
|---|---|---|---|---|---|---|
|  |  |  | 64 | 32 | 16 | 8 |
| Sub-block partition | (a) | $h_C$: $SB_0$, $SB_1$ | Case (e) | Case (i) | Case (m) | Case (q) |
|  | (b) | $h_C$: $SB_0$, $SB_1$ | Case (h) | Case (l) | Case (p) | Case (r) |
|  | (c) | $h_C$: $SB_0$, $SB_1$ | Case (f) | Case (j) | Case (n) | NA |
|  | (d) | $h_C$: $SB_0$, $SB_1$ | Case (g) | Case (k) | Case (o) | NA |

TABLE 17-continued

|  |  |  | Size of W of CU | | | |
|---|---|---|---|---|---|---|
|  |  |  | 64 | 32 | 16 | 8 |
|  | (e) | $w_C$: $SB_0$, $SB_1$ | Case (e) | Case (i) | Case (m) | Case (q) |
|  | (f) | $w_C$: $SB_0$, $SB_1$ | Case (h) | Case (l) | Case (p) | Case (r) |
|  | (g) | $w_C$: $SB_0$, $SB_1$ | Case (f) | Case (j) | Case (n) | NA |
|  | (h) | $w_C$: $SB_0$, $SB_1$ | Case (g) | Case (k) | Case (o) | NA |

Table 18 illustrates where for each case in Table 17, three SBT sub-block edges are specified (1) Left or Top (L or T); (2) Middle (M); and (3) Right or Bottom (R or B) and for each edge, the maximum number of samples that may be modified on each side of the edge is specified; the allowed long filters for deblocking according JVET-M0471, described above, is specified; and the preferred long filtering according to the techniques herein is specified.

With respect to Table 18, when "undetermined" is provided for the maximum number of samples that may be modified on each side of the edge, this indicates that the number of samples depends on the adjacent block.

With respect to Table 18, when "*None" is provided for a filter, this indicates that no long filter can be used at the edge. For example, a large block condition applies, i.e., orthogonal chroma block size of both sides of edge being deblocked is greater than or equal to a threshold e.g. 8 (in chroma samples), is not satisfied Finally, with respect to Table 18, when 3+3* is provided for a filter, then a long filter may be allow but depending on an adjacent block.

TABLE 18

| Case | Edge | Maximum number of samples that may be modified on left or top (P) side of edge | Maximum number of samples that may be modified on right or bottom (Q) side of edge | JVET-M0471 long filters allowed for deblocking | Preferred long filtering |
|---|---|---|---|---|---|
| (e) | L or T | undetermined | 8 | 3 + 3 | 3 + 3* |
|  | M | 8 | 8 | 3 + 3 | 3 + 3 |
|  | R or B | 8 | undetermined | 3 + 3 | 3 + 3* |
| (f) | L or T | undetermined | 4 | 3 + 3 | 3 + 3* |
|  | M | 4 | 12 | 3 + 3 | 3 + 3 |
|  | R or B | 12 | undetermined | 3 + 3 | 3 + 3* |
| (g) | L or T | undetermined | 12 | 3 + 3 | 3 + 3* |
|  | M | 12 | 4 | 3 + 3 | 3 + 3 |
|  | R or B | 4 | undetermined | 3 + 3 | 3 + 3* |
| (h) | L or T | undetermined | 8 | 3 + 3 | 3 + 3* |
|  | M | 8 | 8 | 3 + 3 | 3 + 3 |
|  | R or B | 8 | undetermined | 3 + 3 | 3 + 3* |
| (i) | L or T | undetermined | 4 | 3 + 3 | 3 + 3* |
|  | M | 4 | 4 | 3 + 3 | 3 + 3 |
|  | R or B | 4 | undetermined | 3 + 3 | 3 + 3* |
| (j) | L or T | undetermined | 2 | None | None |
|  | M | 2 | 6 | None | None |
|  | R or B | 6 | undetermined | 3 + 3 | 3 + 3* |
| (k) | L or T | undetermined | 6 | 3 + 3 | 3 + 3* |
|  | M | 6 | 2 | None | None |
|  | R or B | 2 | undetermined | None | None |
| (l) | L or T | undetermined | 4 | 3 + 3 | 3 + 3* |
|  | M | 4 | 4 | 3 + 3 | 3 + 3 |
|  | R or B | 4 | undetermined | 3 + 3 | 3 + 3* |
| (m) | L or T | undetermined | 2 | None | None* + None* |
|  | M | 2 | 2 | None | None* + None* |
|  | R or B | 2 | undetermined | None | None* + None* |
| (n) | L or T | undetermined | 1 | None | None* + None* |
|  | M | 1 | 3 | None | None* + None* |
|  | R or B | 3 | undetermined | None | None* + None* |
| (o) | L or T | undetermined | 3 | None | None* + None* |
|  | M | 3 | 1 | None | None* + None* |
|  | R or B | 1 | undetermined | None | None* + None* |
| (p) | L or T | undetermined | 2 | None | None* + None* |
|  | M | 2 | 2 | None | None* + None* |

TABLE 18-continued

| Case | Edge | Maximum number of samples that may be modified on left or top (P) side of edge | Maximum number of samples that may be modified on right or bottom (Q) side of edge | JVET-M0471 long filters allowed for deblocking | Preferred long filtering |
|---|---|---|---|---|---|
|  | R or B | 2 | undetermined | None | None* + None* |
| (q) | L or T | undetermined | 1 | None | None* + None* |
|  | M | 1 | 1 | None | None* + None* |
|  | R or B | 1 | undetermined | None | None* + None* |
| (r) | L or T | undetermined | 1 | None | None* + None* |
|  | M | 1 | 1 | None | None* + None* |
|  | R or B | 1 | undetermined | None | None* + None* |

With respect to Table 18, it should be noted that the only condition where a middle edge of block using SBT is deblocked is when the block's dimension perpendicular to the direction of edge being deblocked is >=32 (in chroma samples) or the blocks dimension perpendicular to the direction of edge being deblocked is 16 (in chroma samples) and one-half partitioning is used. This corresponds to Cases (e), (f), (g), (h), (i), and (l) and as illustrated, the preferred filtering in that case is 3+3. It should be noted that here the large block condition is evaluated based on the transform size and not the coding block size (for outside as well as internal edges). Thus, in one example, according to the techniques herein, a marking process may be that an internal (i.e., middle) edge of an SBT is marked as a candidate for chroma weak filter deblocking. Further, an internal edge of an SBT may be candidate for chroma long filter deblocking if the block's dimension perpendicular to the direction of edge being deblocked is greater than or equal to a threshold e.g. 32 (in chroma samples), or, the block dimension perpendicular to the direction of edge being deblocked is 16 and one half partitioning is used. Further, in one example, according to the techniques herein, for an internal edge of SBT block, the motion vector based boundary strength determination may be skipped for blocks not using sub-block motion vectors (since the motion vector and reference pictures on either side of the boundary is the same).

Thus, in one example, according to the techniques herein, filter unit 216 may be configured to perform derivation process of a transform block boundary as follows:

Inputs to this process are:
a location (xB0, yB0) specifying the top-left sample of the current block relative to the top-left sample of the current coding block,
a variable nTbW specifying the width of the current block,
a variable nTbH specifying the height of the current block,
a variable treeType specifying whether a single tree (SINGLE_TKEE) or a dual tree is used to partition the CTUs and, when a dual tree is used, whether the luma (DUAL_TREE_LUMA) or chroma components (DUAL_TREE_CHROMA) are currently processed,
a variable filterEdgeFlag,
a two-dimensional (nCbW)x(nCbH) arrays edgeFlags, maxFilterLengthQs, maxFilterLengthPs and maxFilterLengthCbCrs,
a variable edgeType specifying whether a vertical (EDGE_VER) or a horizontal (EDGE_HOR) edge is filtered.
a variable is SBTSubblock specifying if current block is a SBT subblock Output of this process is the modified two-dimensional (nCbW)x(nCbH) arrays edgeFlags, maxFilterLengthQs, maxFilterLengthPs and maxFilterLengthCbCrs.

The maximum transform block size maxTbSize is derived as follows:

maxTbSize=(treeType==DUAL_TREE_CHROMA) ?MaxTbSize$Y$/2:MaxTbSize$Y$

Depending on maxTbSize, the following applies:
If nTbW is greater than maxTbSize or nTbH is greater than maxTbSize, the following ordered steps apply.
1. The variables newTbW and newTbH are derived as follows:

newTbW=(nTbW>maxTbSize)?(nTbW/2):nTbW newTbH=(nTbH>maxTbSize)?(nTbH/2):nTbH

2. The derivation process of transform block boundary as specified in this clause is invoked with the location (xB0, yB0), the variables nTbW set equal to newTbW and nTbH set equal to newTbH, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.
3. If nTbW is greater than maxTbSize, the derivation process of transform block boundary as specified in this clause is invoked with the luma location (xB0, yB0) set equal to (xB0+newTbW, yB0), the variables nTbW set equal to newTbW and nTbH set equal to newTbH, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.
4. If nTbH is greater than maxTbSize, the derivation process of transform block boundary as specified in this clause is invoked with the luma location (xB0, yB0) set equal to (xB0, yB0+newTbH), the variables nTbW set equal to newTbW and nTbH set equal to newTbH, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.
5. If nTbW is greater than maxTbSize and nTbH is greater than maxTbSize, the derivation process of transform block boundary as specified in this clause is invoked with the luma location (xB0, yB0) set equal to (xB0+ newTbW, yB0+newTbH), the variables nTbW set equal to newTbW and nTbH set equal to newTbH, the variable filterEdgeFlag, the array edgeFlags, maxFilterLengthQs, maxFilterLengthPs and maxFilterLengthCbCrs, and the variable edgeType, and the variable is SBTSubblock as inputs, and the output is the modified version of arrays edgeFlags, maxFilterLengthQs, maxFilterLengthPs and maxFilterLengthCbCrs.

Otherwise, if edgeType is equal to EDGE_VER, cu_sbt_flag[xB0][yB0] is equal to 1, cu_sbt_horizontal_flag[xB0][yB0] is equal to 0, and is SBTSubblock is equal to 0 the following ordered steps apply:
1. The variable is SBTSubblock is set to 1
2. The derivation process of transform block boundary as specified in this clause is invoked with the location (xB0, yB0), the variable nTbW set equal to nTbW*SbtNumFourthsTb0/4, the variable nTbH, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.
3. The derivation process of transform block boundary as specified in this clause is invoked with the luma location (xB0+nTBW*SbtNumFourthsTb0/4, yB0), the variable nTbW set equal to (nTbW−nTbW*SbtNumFourthsTb0/4), the variable nTbH, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.

Otherwise, if edgeType is equal to EDGE_HOR, cu_sbt_flag[xB0][yB0] is equal to 1, cu_sbt_horizontal_flag[xB0][yB0] is equal to 1, and is SBTSubblock is equal to 0 the following ordered steps apply
1. The variable is SBTSubblock is set to 1
2. The derivation process of transform block boundary as specified in this clause is invoked with the location (xB0, yB0), the variable nTbW, the variable nTbH set equal to nTbH*SbtNumFourthsTb0/4, the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.
3. The derivation process of transform block boundary as specified in this clause is invoked with the luma location (xB0, yB0+nTBH*SbtNumFourthsTb0/4), the variable nTbW, the variable nTbH set equal to (nTbH−nTbH*SbtNumFourthsTb0/4), the variable filterEdgeFlag, the arrays edgeFlags, maxFilterLengthQs, maxFilterLengthPs and maxFilterLengthCbCrs, the variable edgeType, and the variable is SBTSubblock as inputs, and the output is the modified version of arrays edgeFlags, maxFilterLengthQs, maxFilterLengthPs and maxFilterLengthCbCrs.

Otherwise, the following applies:
If edgeType is equal to EDGE_VER, the value of edgeFlags[xB0][yB0+k] for k=0 ... nTbH−1 is derived as follows:

If xB0 is equal to 0, edgeFlags[xB0][yB0+k] is set equal to filterEdgeFlag.
Otherwise, edgeFlags[xB0][yB0+k] is set equal to 1.
If edgeFlags[xB0][yB0+k] is equal to 1
If treeType is equal to SINGLE_TREE or DUAL_TREE_LUMA
If width in luma samples of transform block at luma position (xB0, yB0+k) is equal to or greater than 32, maxFilterLengthQs[xB0][yB0+k]=7
Otherwise, maxFilterLengthQs[xB0][yB0+k]=3
If width in luma samples of transform block at luma position (xB0−1, yB0+k) is equal to or greater than 32, maxFilterLengthPs[xB0][yB0+k]=7
Otherwise, maxFilterLengthPs[xB0][yB0+k]=3
If width in chroma samples of transform block at chroma position (xB0/SubWidthC, (yB0+k)/SubHeightC) and chroma position (xB0/SubWidthC−1, (yB0+k)/SubHeightC) both are equal to or greater than 8, maxFilterLengthCbCrs[xB0/SubWidthtC][(yB0+k)/SubHeightC]=3
Otherwise, maxFilterLengthCbCrs[xB0/SubWidthtC][(yB0+k)/SubHeightC]=1
Otherwise
If width in chroma samples of transform block at chroma position (xB0, yB0+k) and chroma position (xB0−1, yB0+k) both are equal to or greater than 8, maxFilterLengthCbCrs[xB0][yB0+k]=3
Otherwise, maxFilterLengthCbCrs[xB0][yB0+k]=1
Otherwise (edgeType is equal to EDGE_HOR), the value of edgeFlags[xB0+k][yB0] for k=0 ... nTbW−1 is derived as follows:
If yB0 is equal to 0, edgeFlags[xB0+k][yB0] is set equal to filterEdgeFlag.
Otherwise, edgeFlags[xB0+k][yB0] is set equal to 1.
If edgeFlags[xB0+k][yB0] is equal to 1,
If treeType is equal to SINGLE_TREE or DUAL_TREE_LUMA
If height in luma samples of transform block at luma position (xB0+k, yB0) is equal to or greater than 32, maxFilterLengthQs[xB0+k][yB0]=7
Otherwise, maxFilterLengthQs[xB0+k][yB0]=3
If height in luma samples of transform block at luma position (xB0+k, yB0−1) is equal to or greater than 32, maxFilterLengthPs[xB0+k][yB0]=7
Otherwise, maxFilterLengthPs[xB0+k][yB0]=3
If height in chroma samples of transform block at chroma position ((xB0+k)/SubWidthC, yB0/SubHeightC) and chroma position ((xB0+k)/SubWidthtC, yB0/SubHeightC−1) both are equal to or greater than 8,
Where yC is the top position of the current block in chroma samples relative to the top position of the current picture
If (yC % (1<<(log 2_ctu_size_minus2+2))/SubHeightC is equal to 0) (when the edge type is EDGE_HOR and the edge overlaps with the chroma CTB boundary)
maxFilterLengthCbCrs[(xB0+k)/SubWidthC][yB0/SubHeightC]=1
Otherwise, maxFilterLengthCbCrs[(xB0+k)/SubWidthC][yB0/SubHeightC]=3
Otherwise, maxFilterLengthCbCrs[(xB0+k)/SubWidthtC][yB0/SubHeightC]=1

Otherwise
If height in chroma samples of transform block at chroma position (xB0+k, yB0) and at chroma position (XB0+k, yB0−1) both are equal to or greater than 8,
Where yC is the top position of the current block in chroma samples relative to the top position of the current picture
If (yC % (1<<(log 2_ctu_size_minus2+2))/SubHeightC is equal to 0) (when the edge type is EDGE_HOR and the edge overlaps with the chroma CTB boundary)
maxFilterLengthCbCrs[xB0+k][yB0]=1
Otherwise, maxFilterLengthQCbCrs[xB0+k][yB0]=3
Otherwise, maxFilterLengthCbCrs[xB0+k][yB0]=1

In one example, filter unit 216 may be configured to place limitations on long filter selection. For example, a long filter may be used when the block size orthogonal/perpendicular to the edge being deblocked for either P-side or Q-side is greater than or equal to 32. In one example, when P-side block size orthogonal/perpendicular to the edge is not greater than or equal to 32 and Q-side block size orthogonal/perpendicular to the edge is greater than or equal to 32, a long filter of the type 3+? may be chosen, where ? may be 5 or 7. In one example, when P-side block size orthogonal/perpendicular to the edge is greater than or equal to 32 and Q-side block size orthogonal/perpendicular to the edge is not greater than or equal to 32, a long filter of the type ?+3 may be chosen, where ? may be 5 or 7.

In one example, a limitation may be expressed as follows:
If edgeType is equal to EDGE_VER, the following ordered steps apply:
. . . .
The variables bSidePisLargeBlk and bSideQisLargeBlk are derived as follows:
. . . .
If both bSidePisLargeBlk and bSideQisLargeBlk is equal to 0 go to step 6.
The variables dpq0L, dpq3L, dL, maxFilterLengthP and maxFilterLengthQ are derived as follows:
If bSidePisLargeBlk is equal to 1

$dp0L=(dp0+\text{Abs}(p_{5,0}-2*p_{4,0}+p_{3,0})+1)>>1$ $dp3L=(dp3+\text{Abs}(p_{5,3}-2*p_{4,3}+p_{3,3})+1)>>1$ Otherwise $dp0L=dp0$ $dp3L=dp3$ maxFilterLength$P$=3

If bSideQisLargeBlk is equal to 1

$dq0L=(dq0+\text{Abs}(q_{5,0}-2*q_{4,0}+q_{3,0})+1)>>1$ $dq3L=(dq3+\text{Abs}(q_{5,3}-2*q_{4,3}+q_{3,3})+1)>>1$ Otherwise $dq0L=dq0$ $dq3L=dq3$ maxFilterLength$Q$=3

$dpq0L=dp0L+dq0L$ $dpq3L=dp3L+dq3L$ $dL=dpq0L+dpq3L$

. . . .
Otherwise (edgeType is equal to EDGE_HOR), the following ordered steps apply:
. . . .
The variables bSidePisLargeBlk and bSideQisLargeBlk are derived as follows:
. . . .
If both bSidePisLargeBlk and bSideQisLargeBlk is equal to 0 go to step 6.
The variables dpq0L, dpq3L, dL, maxFilterLengthP and maxFilterLengthQ are derived as follows:
If bSidePisLargeBlk is equal to 1

$dp0L=(dp0+\text{Abs}(p5,0-2*p4,0+p3,0)+1)>>1$ $dp3L=(dp3+\text{Abs}(p5,3-2*p4,3+p3,3)+1)>>1$ Otherwise $dp0L=dp0$ $dp3L=dp3$ maxFilterLength$P$=3

If bSideQisLargeBlk is equal to 1

$dq0L=(dq0+\text{Abs}(q5,0-2*q4,0+q3,0)+1)>>1$ $dq3L=(dq3+\text{Abs}(q5,3-2*q4,3+q3,3)+1)>>1$ Otherwise $dq0L=dq0$ $dq3L=dq3$ maxFilterLength$Q$=3

$dpq0L=dp0L+dq0L$ $dpq3L=dp3L+dq3L$ $dL=dpq0L+dpq3L$

. . . .

As described above, ISP may be used for intra prediction. It should be noted that when using separate trees, an ISP with two parts just represents a binary split of a block using the same prediction mode and automatic transform selection. Similarly, when using separate trees, an ISP with four parts just represents a binary split with the two split parts further undergoing binary splits along the same direction as the initial split and intra mode is shared and the transform type is selected automatically. This is similar to the SBT case and represents a syntax shortcut and as such similarly deblocking may apply. That is, all corresponding edges (including internal subblock edges) may be treated as regular edges. In an example, this may include modifying the derivation process of transform boundary for deblocking to be based on whether ISP is used. In an example this may include modifying the derivation process of coding block boundary for deblocking to be based on whether ISP is used. In an example this may include modifying the derivation process of subblock boundary for deblocking to be based on whether ISP is used.

Thus, in one example, according to the techniques herein, filter unit 216 may be configured to perform derivation process of a transform block boundary as follows:

Inputs to this process are:
a location (xB0, yB0) specifying the top-left sample of the current block relative to the top-left sample of the current coding block,
a variable nTbW specifying the width of the current block,
a variable nTbH specifying the height of the current block,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
a variable filterEdgeFlag,
a two-dimensional (nCbW)×(nCbH) arrays edgeFlags, maxFilterLengthQs, maxFilterLengthPs and maxFilterLengthCbCrs,
a variable edgeType specifying whether a vertical (EDGE_VER) or a horizontal (EDGE_HOR) edge is filtered.
a variable ispSubblockIdx specifying if current block is a ISP subblock Output of this process is the modified two-dimensional (nCbW)×(nCbH) arrays edgeFlags, maxFilterLengthQs, maxFilterLengthPs and maxFilterLengthCbCrs.

The maximum transform block size maxTbSize is derived as follows:

maxTbSize=(treeType==DUAL_TREE_CHROMA)
?MaxTbSizeY/2:MaxTbSizeY

Depending on maxTbSize, the following applies:
If nTbW is greater than maxTbSize or nTbH is greater than maxTbSize, the following ordered steps apply.
1. The variables newTbW and newTbH are derived as follows:

newTbW=(nTbW>maxTbSize)?(nTbW/2):nTbW newTbH=(nTbH>maxTbSize)?(nTbH/2):nTbH

2. The derivation process of transform block boundary as specified in this clause is invoked with the location (xB0, yB0), the variables nTbW set equal to newTbW and nTbH set equal to newTbH, the variable filterEdgeFlag, the arrays edgeFlags, maxFilterLengthQs, maxFilterLengthPs and maxFilterLengthCbCrs the variable edgeType, and the variable ispSubblockIdx as inputs, and the output is the modified version of arrays edgeFlags, maxFilterLengthQs, maxFilterLengthPs and maxFilterLengthCbCrs.
3. If nTbW is greater than maxTbSize, the derivation process of transform block boundary as specified in this clause is invoked with the luma location (xB0, yB0) set equal to (xB0+newTbW, yB0), the variables nTbW set equal to newTbW and nTbH set equal to newTbH, the variable filterEdgeFlag, the arrays edgeFlags, maxFilterLengthQs, maxFilterLengthPs and maxFilterLengthCbCrs, the variable edgeType, and the variable ispSubblockIdx as inputs, and the output is the modified version of arrays edgeFlags, maxFilterLengthQs, maxFilterLengthPs and maxFilterLengthCbCrs.
4. If nTbH is greater than maxTbSize, the derivation process of transform block boundary as specified in this clause is invoked with the luma location (xB0, yB0+newTbH), the variables nTbW set equal to newTbW and nTbH set equal to newTbH, the variable filterEdgeFlag, the arrays edgeFlags, maxFilterLengthQs, maxFilterLengthPs and maxFilterLengthCbCrs, the variable edgeType, and the variable ispSubblockIdx as inputs, and the output is the modified version of arrays edgeFlags, maxFilterLengthQs, maxFilterLengthPs and maxFilterLengthCbCrs.
5. If nTbW is greater than maxTbSize and nTbH is greater than maxTbSize, the derivation process of transform block boundary as specified in this clause is invoked with the luma location (xB0, yB0) set equal to (xB0+newTbW, yB0+newTbH), the variables nTbW set equal to newTbW and nTbH set equal to newTbH, the variable filterEdgeFlag, the array edgeFlags, maxFilterLengthQs, maxFilterLengthPs and maxFilterLengthCbCrs, the variable edgeType, and the variable ispSubblockIdx as inputs, and the output is the modified version of arrays edgeFlags, maxFilterLengthQs, maxFilterLengthPs and maxFilterLengthCbCrs.

Otherwise, if edgeType is equal to EDGE_VER, intra_subpartitions_mode_flag[xB0][yB0] is equal to 1, and IntraSubPartitionsSplitType[xB0][yB0] is equal to ISP_VER_SPLIT, and ispSubblockIdx is equal to 0 the following ordered steps apply
1. The variable ispSubblockIdx is set equal to 1
2. For k=0 . . . (NumIntraSubPartitions−1), the following applies:
The derivation process of transform block boundary as specified in this clause is invoked with the location (xB0+k*nTbW/NumIntraSubPartitions, yB0), the variable nTbW set equal to nTbW/NumIntraSubPartitions, the variable nTbH, the variable filterEdgeFlag, the arrays edgeFlags, maxFilterLengthQs, maxFilterLengthPs and maxFilterLengthCbCrs, the variable edgeType, and the variable ispSubblockIdx as inputs, and the output is the modified version of arrays edgeFlags, maxFilterLengthQs, maxFilterLengthPs and maxFilterLengthCbCrs.

Otherwise, if edgeType is equal to EDGE_HOR, intra_subpartitions_mode_flag[xB0][yB0] is equal to 1, and IntraSubPartitionsSplitType[xB0][yB0] is equal to ISP_HOR_SPLIT, and ispSubblockIdx is equal to 0, the following ordered steps apply:
1. The variable ispSubblockIdx is set equal to 1
2. For k=0 . . . (NumIntraSubPartitions−1), the following applies:
The derivation process of transform block boundary as specified in this clause is invoked with the location (xB0, yB0+k*nTbH/NumIntraSubPartitions), the variable nTbW, the variable nTbH set equal to nTbH/NumIntraSubPartitions, the variable filterEdgeFlag, the arrays edgeFlags, maxFilterLengthQs, maxFilterLengthPs and maxFilterLengthCbCrs, the variable edgeType, and the variable ispSubblockIdx as inputs, and the output is the modified version of arrays edgeFlags, maxFilterLengthQs, maxFilterLengthPs and maxFilterLengthCbCrs.

Otherwise, the following applies:
If edgeType is equal to EDGE_VER, the value of edgeFlags[xB0][yB0+k] for k=0 . . . nTbH−1 is derived as follows:
If xB0 is equal to 0, edgeFlags[xB0][yB0+k] is set equal to filterEdgeFlag.
Otherwise, edgeFlags[xB0][yB0+k] is set equal to 1.
If edgeFlags[xB0][yB0+k] is equal to 1
If treeType is equal to SINGLE_TREE or DUAL_TREE_LUMA If width in luma samples of transform block at luma position (xB0, yB0+k) is equal to or greater than 32, maxFilterLengthQs[xB0][yB0+k]=7

Otherwise, maxFilterLengthQs[xB0][yB0+k]–3

If width in luma samples of transform block at luma position (xB0–1, yB0+k) is equal to or greater than 32, maxFilterLengthPs[xB0][yB0+k]=7

Otherwise, maxFilterLengthPs[xB0][yB0+k]=3

If width in chroma samples of transform block at chroma position (xB0/SubWidthC, (yB0+k)/SubHeightC) and chroma position (xB0/SubWidthC–1, (yB0+k)/SubHeightC) both are equal to or greater than 8, maxFilterLengthCbCrs[xB0/SubWidthtC][(yB0+k)/SubHeightC]=3

Otherwise, maxFilterLengthCbCrs[xB0/SubWidthtC][(yB0+k)/SubHeightC]=1

Otherwise

If width in chroma samples of transform block at chroma position (xB0, yB0+k) and chroma position (xB0–1, yB0+k) both are equal to or greater than 8, maxFilterLengthCbCrs[xB0][yB0+k]=3

Otherwise, maxFilterLengthCbCrs[xB0][yB0+k]=1

Otherwise (edgeType is equal to EDGE_HOR), the value of edgeFlags[xB0+k][yB0] for k=0 . . . nTbW–1 is derived as follows:

If yB0 is equal to 0, edgeFlags[xB0+k][yB0] is set equal to filterEdgeFlag.

Otherwise, edgeFlags[xB0+k][yB0] is set equal to 1.

If edgeFlags[xB0+k][yB0] is equal to 1,

If treeType is equal to SINGLE_TREE or DUAL_TREE_LUMA

If height in luma samples of transform block at luma position (xB0+k, yB0) is equal to or greater than 32, maxFilterLengthQs[xB0+k][yB0]=7

Otherwise, maxFilterLengthQs[xB0+k][yB0]=3

If height in luma samples of transform block at luma position (xB0+k, yB0–1) is equal to or greater than 32, maxFilterLengthPs[xB0+k][yB0]=7

Otherwise, maxFilterLengthPs[xB0+k][yB0]=3

If height in chroma samples of transform block at chroma position ((xB0+k)/SubWidthC, yB0/SubHeightC) and chroma position ((xB0+k)/SubWidthtC, yB0/SubHeightC–1) both are equal to or greater than 8, Where yC is the top position of the current block in chroma samples relative to the top position of the current picture If (yC % (1<<(log 2_ctu_size_minus2+2))/SubHeightC is equal to 0) (when the edge type is EDGE_HOR and the edge overlaps with the chroma CTB boundary)

maxFilterLengthCbCrs[(xB0+k)/SubWidthC][yB0/SubHeightC]=1

Otherwise, maxFilterLengthCbCrs[(xB0+k)/SubWidthC][yB0/SubHeightC]=3

Otherwise, maxFilterLengthCbCrs[(xB0+k)/SubWidthtC][yB0/SubHeightC]=1

Otherwise

If height in chroma samples of transform block at chroma position (xB0+k, yB0) and at chroma position (XB0+k, yB0–1) both are equal to or greater than 8, Where yC is the top position of the current block in chroma samples relative to the top position of the current picture If (yC % (1<<(log 2_ctu_size_minus2+2))/SubHeightC is equal to 0) (when the edge type is EDGE_HOR and the edge overlaps with the chroma CTB boundary)

maxFilterLengthCbCrs[xB0+k][yB0]=1

Otherwise, maxFilterLengthQCbCrs[xB0+k][yB0]=3

Otherwise, maxFilterLengthCbCrs[xB0+k][yB0]=1

In an example, the variables specifying if current block is ISP subblock, and if current block is SBT subblock is shared.

It should be noted that, as described above, in JVET-M1001, a determination whether an intra prediction mode or an inter prediction mode is used occurs at the CU level and ISP sub-block coding is only enabled for intra prediction and SBT sub-block coding is only enabled for inter prediction. Thus, the process of deriving subblock boundaries for deblocking based on whether ISP sub-blocks are used, provided above, may be incorporated into an overall process of derivation process of a transform block boundary, which includes a process of deriving subblock boundaries for deblocking based on whether SBT sub-blocks. In particular, a cu_sbt_flag[xB0][yB0] is equal to 1 check and a corresponding process of deriving subblock boundaries for deblocking based on whether SBT sub-blocks are used may be added to the process of deriving subblock boundaries for deblocking based on whether ISP sub-blocks are used, provided above, to form an overall derivation process of a transform block boundary.

As described above, filter unit 216 may be configured to set a bS value to a non-zero value (e.g., 2), for ISP coding mode subpartition boundaries for each component of video. In one example, filter unit 216 may be configured to perform the following boundary strength derivation process:

Inputs to this process are:

a picture sample array recPicture, a location (xCb, yCb) specifying the top-left sample of the current coding block relative to the top-left sample of the current picture, a variable nCbW specifying the width of the current coding block, a variable nCbH specifying the height of the current coding block, a variable edgeType specifying whether a vertical (EDGE_VER) or a horizontal (EDGE_HOR) edge is filtered, a variable cIdx specifying the component index of the picture, a two-dimensional (nCbW)×(nCbH) array edgeFlags of component with index cIdx.

Output of this process is a two-dimensional (nCbW)× (nCbH) array bS specifying the boundary filtering strength of component with index cIdx.

The variables $xD_i$, $yD_j$, xN and yN are derived as follows:

If edgeType is equal to EDGE_VER, $xD_i$ is set equal to (i>>3), $yD_j$ is set equal to (j>>2), xN is set equal to Max(0, (nCbW/8)–1) and yN is set equal to (nCbH/4)–1.

Otherwise (edgeType is equal to EDGE_HOR), $xD_i$ is set equal to (i>>2), $yD_j$ is set equal to (j>>3), xN is set equal to (nCbW/4)–1 and yN is set equal to Max(0, (nCbH/8)–1).

For $xD_i$ with i=0 . . . xN and $yD_j$ with j=0 . . . yN, the following applies:

If edgeFlags [$xD_i$][$yD_j$] is equal to 0, the variable bS[$xD_i$][$yD_j$] is set equal to 0.

Otherwise, the following applies:

The sample values $p_0$ and $q_0$ are derived as follows:

If edgeType is equal to EDGE_VER, $p_0$ is set equal to recPicture [xCb+$xD_i$–1][yCb+$yD_j$] and $q_0$ is set equal to recPicture [xCb+$xD_i$][yCb+$yD_j$].

Otherwise (edgeType is equal to EDGE_HOR), $p_0$ is set equal to recPicture [xCb+xD$_i$][yCb+yD$_j$−1] and $q_0$ is set equal to recPicture [xCb+xD$_i$][yCb+yD$_j$].

The variable bS[xD$_i$][yD$_j$] is derived per component as follows:

If the sample $p_0$ or $q_0$ is in the coding block of a coding unit coded with intra prediction mode and IntraSubPartitionsSplitType is equal to ISP_NO_SPLIT, bS[xD$_i$][yD$_j$] is set equal to 2.

Otherwise, if the sample $p_0$ or $q_0$ is in the coding block of a coding unit coded with intra prediction mode and IntraSubPartitionsSplitType is not equal to ISP_NO_SPLIT:

If the coding block edge is also a transform block edge, bS[xD$_i$][yD$_j$] is set equal to 2, Otherwise if the transform block edge is not a coding block edge and the transform block edge belongs to a luma component, bS[xD$_i$][yD$_j$] is set equal to 2, Otherwise, bS [xD$_i$][yD$_j$] is set equal to 0

In one example, according to the techniques herein, the marking of an edge as candidate for deblocking or boundary strength determination process may be based on the partitioning tree type for an ISP block. For example, when tree type is DUAL_TREE_CHROMA then only the outside edges (e.g. coding block edges) of a ISP block may be marked as candidate for deblocking. In another example, when tree type is DUAL_TREE_CHROMA then only the outside edges (e.g. coding block edges) of a ISP block may have non-zero boundary strength. For example, in the above boundary strength derivation process, the derivation of variable bS[xD$_i$][yD$_j$] per component may be modified as follows:

The variable bS[xD$_i$][yD$_j$] is derived per component as follows:

If the sample $p_0$ or $q_0$ is in the coding block of a coding unit coded with intra prediction mode and IntraSubPartitionsSplitType is equal to ISP_NO_SPLIT, bS[xD$_i$][yD$_j$] is set equal to 2.

Otherwise, if the sample $p_0$ or $q_0$ is in the coding block of a coding unit coded with intra prediction mode and IntraSubPartitionsSplitType is not equal to ISP_NO_SPLIT:

If the coding block edge is also a transform block edge and treeType is not equal to DUAL_TREE_CHROMA, bS[xD$_i$][yD$_j$] is set equal to 2, Otherwise if the transform block edge is not a coding block edge and the transform block edge belongs to a luma component, bS[xD$_i$][yD$_j$] is set equal to 2, Otherwise, bS[xD$_i$][yD$_j$] is set equal to 0

In one example, filter unit 216 may be configured to set the boundary strength of non-existent chroma ISP edges to 0. In one example, filter unit 216 may be configured to perform the following boundary strength derivation process:

Inputs to this process are:
a picture sample array recPicture,
a location (xCb, yCb) specifying the top-left sample of the current coding block relative to the top-left sample of the current picture,
a variable nCbW specifying the width of the current coding block,
a variable nCbH specifying the height of the current coding block,
a variable edgeType specifying whether a vertical (EDGE_VER) or a horizontal (EDGE_HOR) edge is filtered,
a two-dimensional (nCbW)×(nCbH) array edgeFlags.

Output of this process is a two-dimensional (nCbW)×(nCbH) array bSLuma, and two-dimensional (nCbW/SubWidthC,nCbH/SubHeightC) arrays bSCb and bSCr specifying the boundary filtering strength for each color component.

The variables xD$_i$, yD$_j$, xN and yN are derived as follows:

If edgeType is equal to EDGE_VER, xD$_i$ is set equal to (i>>3), yD$_j$ is set equal to (j>>2), xN is set equal to Max(0, (nCbW/8)−1) and yN is set equal to (nCbH/4)−1.

Otherwise (edgeType is equal to EDGE_HOR), xD$_i$ is set equal to (i>>2), yD$_j$ is set equal to (j>>3), xN is set equal to (nCbW/4)−1 and yN is set equal to Max(0, (nCbH 18)−1).

For xD$_i$ with i=0 . . . xN and yD$_j$ with j=0 . . . yN, the following applies:

If edgeFlags[xD$_i$][yD$_j$] is equal to 0, the variable bS[xD$_i$][yD$_j$] is set equal to 0.

Otherwise, the following applies:

The sample values $p_0$ and $q_0$ are derived as follows:

If edgeType is equal to EDGE_VER, $p_0$ is set equal to recPicture [xCb+xD$_i$−1][yCb+yD$_j$] and $q_0$ is set equal to recPicture [xCb+xD$_i$][yCb+yD$_j$].

Otherwise (edgeType is equal to EDGE_HOR), $p_0$ is set equal to recPicture [xCb+xD$_i$][yCb+yD$_j$−1] and $q_0$ is set equal to recPicture [xCb+xD$_i$][yCb+yD$_j$].

The variable bS[xD$_i$][yD$_j$] is derived per component and the result is stored in bSLuma[xD$_i$][yD$_j$] for a luma component, in bSCb[xD$_i$/SubWidthC][yD$_j$/SubHeightC] for a Cb component and in bSCr[xD$_i$/SubWidthC][yD$_j$/SubHeightC] for a Cr component as follows:

If the sample $p_0$ or $q_0$ is in the coding block of a coding unit coded with intra prediction mode, the following applies:

When component is chroma, treetype is equal to SINGLE_TREE, intra_subpartitions_mode_flag[xCb][yCb] is equal to 1, xD$_i$ is not equal to 0, and yD$_j$ is not equal to 0, bS[xD$_i$][yD$_j$] is set equal to 0:

Otherwise, When treetype is equal to DUAL_TREE_CHROMA, intra_subpartitions_mode_flag[xCb*SubWidthC][yCb*SubHeightC] is equal to 1, xD$_i$ is not equal to 0, and yD$_j$ is not equal to 0, bS[xD$_i$][yD$_j$] is set equal to 0:

Otherwise, bS[xD$_i$][yD$_j$] is set equal to 2.

Otherwise, if the block edge is also a transform block edge and the sample $p_0$ or $q_0$ is in a transform block which contains one or more non-zero transform coefficient levels, bS[xD$_i$][yD$_j$] is set equal to 1.

Otherwise, if one or more of the following conditions for luma component are true, bS[xD$_i$][yD$_j$] is set equal to D For the prediction of the coding subblock containing the sample $p_0$ different reference pictures or a different number of motion vectors are used than for the prediction of the coding subblock containing the sample $q_0$.

NOTE 1—The determination of whether the reference pictures used for the two coding sublocks are the same or different is based only on which pictures are referenced, without regard to whether a prediction is formed using an index into reference picture list 0 or an index into reference picture list 1, and also without regard to whether the index position within a reference picture list is different.

NOTE 2—The number of motion vectors that are used for the prediction of a coding subblock with top-left sample covering (xSb, ySb), is equal to PredFlagL0[xSb][ySb]+PredFlagL1 [xSb][ySb].

One motion vector is used to predict the coding subblock containing the sample $p_0$ and one motion vector is used to predict the coding subblock containing the sample $q_0$, and the absolute difference between the horizontal or vertical component of the motion vectors used is greater than or equal to 4 in units of quarter luma samples.

Two motion vectors and two different reference pictures are used to predict the coding subblock containing the sample $p_0$, two motion vectors for the same two reference pictures are used to predict the coding subblock containing the sample $q_0$ and the absolute difference between the horizontal or vertical component of the two motion vectors used in the prediction of the two coding subblocks for the same reference picture is greater than or equal to 4 in units of quarter luma samples.

Two motion vectors for the same reference picture are used to predict the coding subblock containing the sample $p_0$, two motion vectors for the same reference picture are used to predict the coding subblock containing the sample $q_0$ and both of the following conditions are true:

The absolute difference between the horizontal or vertical component of list 0 motion vectors used in the prediction of the two coding subblocks is greater than or equal to 4 in quarter luma samples, or the absolute difference between the horizontal or vertical component of the list 1 motion vectors used in the prediction of the two coding subblocks is greater than or equal to 4 in units of quarter luma samples.

The absolute difference between the horizontal or vertical component of list 0 motion vector used in the prediction of the coding subblock containing the sample $p_0$ and the list 1 motion vector used in the prediction of the coding subblock containing the sample $q_0$ is greater than or equal to 4 in units of quarter luma samples, or the absolute difference between the horizontal or vertical component of the list 1 motion vector used in the prediction of the coding subblock containing the sample $p_0$ and list 0 motion vector used in the prediction of the coding subblock containing the sample $q_0$ is greater than or equal to 4 in units of quarter luma samples.

Otherwise, the variable bS[xD$_i$][yD$_j$] is set equal to 0.

In one example, filter unit 216 may be configured to not mark non-existent chroma edges as candidates for deblocking. This requires use of separate luma edge array and chroma edge array.

That is, filter unit 216 may be configured to invoke a derivation process of transform block boundary and a derivation process of coding subblock boundary as follows:

All elements of the two-dimensional (nCbW)×(nCbH) array edgeFlags, maxFilterLengthQs, maxFilterlengthPs and two-dimensional (nCbW/SubWidthC)×(nCbH/SubHeightC) array maxFilterLengthPCbCrs are initialized to be equal to zero. The variables is SBTSubblock and ispSubblockIdx are initialized to 0.

The derivation process of transform block boundary specified below is invoked with the location (xB0, yB0) set equal to (0, 0), the block width nTbW set equal to nCbW, the block height nTbH set equal to nCbH, the variable treeType, the variable filterEdgeFlag, the arrays edgeFlagYs, the arrays edgeFlagsCbCrs, maxFilterLengthQs, maxFilterLengthPs and maxFilterLengthCbCrs, the variable edgeType, the variable is SBTSubblock, and the variable ispSubblockIdx as inputs, and the modified arrays edgeFlags, maxFilterLengthQs, maxFilterLengthPs and maxFilterLengthCbCrs as output.

The derivation process of coding subblock boundary specified below is invoked with the location (xCb, yCb), the coding block width nCbW, the coding block height nCbH, the arrays edgeFlagYs, the arrays edgeFlagCbCrs, maxFilterLengthQs, maxFilterLengthPs, and the variable edgeType as inputs, and the modified arrays edgeFlags, maxFilterLengthQs and maxFilterLengthPs as output.

Derivation Process of Transform Block Boundary

Inputs to this process are:

a location (xB0, yB0) specifying the top-left sample of the current block relative to the top-left sample of the current coding block, a variable nTbW specifying the width of the current block, a variable nTbH specifying the height of the current block, a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed, a variable filterEdgeFlag, a two-dimensional (nCbW)×(nCbH) arrays edgeFlagYs, edgeFlagCbCrs, maxFilterLengthQs, maxFilterLengthPs and maxFilterLengthCbCrs, a variable edgeType specifying whether a vertical (EDGE_VER) or a horizontal (EDGE_HOR) edge is filtered.

a variable is SBTSubblock specifying if current block is a SBT subblock a variable ispSubblockIdx specifying index of a ISP subblock Output of this process is the modified two-dimensional (nCbW)×(nCbH) arrays edgeFlagYs, edgeFlagCbCrs, maxFilterLengthQs, maxFilterLengthPs and maxFilterLengthCbCrs.

The maximum transform block size maxTbSize is derived as follows:

maxTbSize=(treeType==DUAL_TREE_CHROMA) ?MaxTbSizeY/2:MaxTbSizeY

Depending on maxTbSize, the following applies:

If nTbW is greater than maxTbSize or nTbH is greater than maxTbSize, the following ordered steps apply.

1. The variables newTbW and newTbH are derived as follows:

newTbW=(nTbW>maxTbSize)?(nTbW/2):nTbW newTbH=(nTbH>maxTbSize)?(nTbH/2):nTbH

2. The derivation process of transform block boundary as specified in this clause is invoked with the location (xB0, yB0), the variables nTbW set equal to newTbW and nTbH set equal to newTbH, the variable filterEdgeFlag, the arrays edgeFlagYs, edgeFlagsCbCrs maxFilterLengthQs, maxFilterLengthPs and maxFilterLengthCbCrs the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

3. If nTbW is greater than maxTbSize, the derivation process of transform block boundary as specified in this clause is invoked with the luma location (xB0, yB0) set equal to (xB0+newTbW, yB0), the variables nTbW set equal to newTbW and nTbH set equal to newTbH, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

4. If nTbH is greater than maxTbSize, the derivation process of transform block boundary as specified in this clause is invoked with the luma location (xB0, yB0) set equal to (xB0, yB0+newTbH), the variables nTbW set equal to newTbW and nTbH set equal to newTbH, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

5. If nTbW is greater than maxTbSize and nTbH is greater than maxTbSize, the derivation process of transform block boundary as specified in this clause is invoked with the luma location (xB0, yB0) set equal to (xB0+newTbW, yB0+newTbH), the variables nTbW set equal to newTbW and nTbH set equal to newTbH, the variable filterEdgeFlag, the array edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

Otherwise, if edgeType is equal to EDGE_VER, cu_sbt_flag[xB0][yB0] is equal to 1, and cu_sbt_horizontal_flag[xB0][yB0] is equal to 0, and is SBTSubblock is equal to 0, the following ordered steps apply:
1. The variable is SBTSubblock is set to 1
2. The derivation process of transform block boundary as specified in this clause is invoked with the location (xB0, yB0), the variable nTbW set equal to nTbW*SbtNumFourthsTb0/4, the variable nTbH, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.
3. The derivation process of transform block boundary as specified in this clause is invoked with the luma location (xB0+nTBW*SbtNumFourthsTb0/4, yB0), the variable nTbW set equal to (nTbW−nTbW*SbtNumFourthsTb0/4), the variable nTbH, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

Otherwise, if edgeType is equal to EDGE_HOR, cu_sbt_flag[xB0][yB0] is equal to 1, and cu_sbt_horizontal_flag[xB0][yB0] is equal to 1, and is SBTSubblock is equal to 0, the following ordered steps apply:
1. The variable is SBTSubblock is set to 1
2. The derivation process of transform block boundary as specified in this clause is invoked with the location (xB0, yB0), the variable nTbW, the variable nTbH set equal to nTbH*SbtNumFourthsTb0/4, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagsCbCrs, maxFilterLengthQs, maxFilterLengthPs and maxFilterLengthCbCrs.
3. The derivation process of transform block boundary as specified in this clause is invoked with the luma location (xB0, yB0+nTBH*SbtNumFourthsTb0/4), the variable nTbW, the variable nTbH set equal to (nTbH−nTbH*SbtNumFourthsTb0/4), the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

Otherwise, if edgeType is equal to EDGE_VER, treeType is not equal to DUAL_TREE_CHROMA, intra_subpartitions_mode_flag[xB0][yB0] is equal to 1, and IntraSubPartitionsSphtType[xB0][yB0] is equal to ISP_VER_SPLIT, and ispSubblockIdx is equal to 0, the following step applies:
For k=0 . . . (NumIntraSubPartitions−1), the following ordered steps apply:
1. The variable ispSubblockIdx is set to (k+1)
2. The derivation process of transform block boundary as specified in this clause is invoked with the location (xB0+k*nTbW/NumIntraSubPartitions, yB0), the variable nTbW set equal to nTbW/NumIntraSubPartitions, the variable nTbH, the variable filterEdgeFlag, the arrays edgeFlagYs, edgeFlagCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagsCbCrs, maxFilterLengthQs, maxFilterLengthPs and maxFilterLengthCbCrs.

Otherwise, if edgeType is equal to EDGE_HOR, treeType is not equal to DUAL_TREE_CHROMA, intra_subpartitions_mode_flag[xB0][yB0] is equal to 1, and IntraSubPartitionsSplitType[xB0][yB0] is equal to ISP_HOR_SPLIT, and ispSubblockIdx is equal to 0, the following step applies:
For k=0 . . . (NumIntraSubPartitions−1), the following applies:
1. The variable ispSubblockIdx is set to (k+1)
2. The derivation process of transform block boundary as specified in this clause is invoked with the location (xB0, yB0+k*nTbH/NumIntraSubPartitions), the variable nTbW, the variable nTbH set equal to nTbH/NumIntraSubPartitions, the variable filterEdgeFlag, the arrays edgeFlagYs, edgeFlagsCbCrs, maxFilterLengthQs, maxFilterLengthPs and maxFilterLengthCbCrs, the variable edgeType, the variable is SBTSubblock, and the variable ispSubblockIdx as inputs, and the output is the modified version of arrays edgeFlagYs, edgeFlagCbCrs, maxFilterLengthQs, maxFilterLengthPs and maxFilterLengthCbCrs.

Otherwise, the following applies:
If treeType is equal to DUAL_TREE_CHROMA, set both variables cW and cH to 1,
Otherwise, assign SubWidthC to variable cW, and SubHeightC to variable cH
If edgeType is equal to EDGE_VER, the value of edgeFlagYs[xB0][yB0+k] and edgeFlagCbCrs[xB0/cW][(yB0+k)/cH] for k=0 . . . nTbH−1 are derived as follows:
If xB0 is equal to 0, edgeFlagYs[xB0][yB0+k] and edgeFlagCbCrs[xB0][yB0+k] is set equal to filterEdgeFlag.
Otherwise,
If treeType is equal to SINGLE_TREE or DUAL_TREE_LUMA edgeFlagYs[xB0][yB0+k] is set equal to 1.
If ispSubblockIdx is greater than 1, edgeFlagCbCrs[xB0/cW][(yB0+k)/cH] is set equal to 0
Otherwise, edgeFlagCbCrs[xB0/cW][(yB0+k)/cH] is set equal to 1
If edgeFlagYs[xB0][yB0+k] is equal to 1
If width in luma samples of transform block at luma position (xB0, yB0+k) is equal to or greater than 32, maxFilterLengthQs[xB0][yB0+k]=7
Otherwise, maxFilterLengthQs [xB0][yB0+k]=3
If width in luma samples of transform block at luma position (xB0−1, yB0+k) is equal to or greater than 32, maxFilterLengthPs[xB0][yB0+k]=7
Otherwise, maxFilterLengthPs[xB0][yB0+k]=3
If edgeFlagCbCrs[xB0/cW][(yB0+k)/cH] is equal to 1
If width in chroma samples of transform block at chroma position (xB0/cW, (yB0+k)/cH) and chroma position (xB0/cW−1, (yB0+k)/cH) both are equal to or greater than 8, maxFilterLengthCbCrs[xB0/cW][(yB0+k)/cH]=3
Otherwise, maxFilterLengthCbCrs[xB0/cW][(yB0+k)/cH]=1
Otherwise (edgeType is equal to EDGE_HOR), the value of edgeFlagYs[xB0+k][yB0] and edgeFlagCbCrs[(xB0+k)/cW][yB0/cH] for k=0 . . . nTbW−1 are derived as follows:
If yB0 is equal to 0, edgeFlags[xB0+k][yB0] and edgeFlagCbCrs[(xB0+k)/cW][yB0/cH] are set equal to filterEdgeFlag.
Otherwise,
If treeType is equal to SINGLE_TREE or DUAL_TREE_LUMA edgeFlagYs[xB0+k][yB0] is set equal to 1.
If ispSubblockIdx is greater than 1, edgeFlagCbCrs[(xB0+k)/cW][yB0/cH] is set equal to 0
Otherwise, edgeFlagCbCrs[(xB0+k)/cW][yB0/cH] is set equal to 1
If edgeFlagYs[xB0+k][yB0] is equal to 1,
If height in luma samples of transform block at luma position (xB0+k, yB0) is equal to or greater than 32, maxFilterLengthQs[xB0+k][yB0]=7
Otherwise, maxFilterLengthQs[xB0+k][yB0]=3
If height in luma samples of transform block at luma position (xB0+k, yB0−1) is equal to or greater than 32, maxFilterLengthPs[xB0+k][yB0]=7
Otherwise, maxFilterLengthPs[xB0+k][yB0]=3
If edgeFlagCbCrs[xB0/cW][(yB0+k)/cH] is equal to 1
If height in chroma samples of transform block at chroma position ((xB0+k)/cW, yB0/cH) and chroma position ((xB0+k)/cW, yB0/cH−1) both are equal to or greater than 8,
Set yC as the top position of the current block in chroma samples relative to the top position of the current picture
If (yC % (1<<(log 2_ctu_size_minus2+2))/cH is equal to 0) (when the edge type is EDGE_HOR and the edge overlaps with the chroma CTB boundary), maxFilterLengthCbCrs[(xB0+k)/cW][yB0/cH]=1
Otherwise, maxFilterLengthCbCrs[(xB0+k)/cW][yB0/cH]=3

Derivation Process of Coding Subblock Boundary
Inputs to this process are:
a location (xCb, yCb) specifying the top-left sample of the current coding block relative to the top-left sample of the current picture,
a variable nCbW specifying the width of the current coding block,
a variable nCbH specifying the height of the current coding block,
a two-dimensional (nCbW)×(nCbH) arrays edgeFlagYs, edgeFlagCbCrs, maxFilterLengthQs and maxFilterLengthPs,
a variable edgeType specifying whether a vertical (EDGE_VER) or a horizontal (EDGE_HOR) edge is filtered.
Output of this process is the modified two-dimensional (nCbW)×(nCbH) arrays edgeFlagYs, edgeFlagCbCrs maxFilterLengthQs and maxFilterLengthPs.
The number of coding subblock in horizontal direction numSbX and in vertical direction numSbY are derived as follows:
If CuPredMode[xCb][yCb]==MODE_INTRA, numSbX and numSbY are both set equal to 1.
Otherwise, numSbX and numSbY are set equal to NumSbX[xCb][yCb] and NumSbY[xCb][yCb], respectively.
Depending on the value of edgeType the following applies:
If edgeType is equal to EDGE_VER and numSbX is greater than 1,
An array of edgeTransformFlags is created by making a copy of the array of edgeFlagYs the following applies for i=1 . . . min((nCbW/8)−1, numSbX−1), k=0 . . . nCbH−1:

edgeFlagYs[i*Max(8,nCbW/numSbX)][k]=1 edgeFlagCbCrs[i*Max(8,nCbW/(numSbX*SubWidthC))][k/SubHeightC]=1 the following applies for i=0 . . . min((nCbW/8)−1, numSbX−1), k=0 . . . nCbH−1:

If edgeFlagYs[i*Max(8,nCbW/numSbX)][k]is equal to 1,
  If luma component
    If i is equal to 0,
      If numSbX at location (xCb·1,yCb) is greater than 1, maxFilterLengthPs[i*Max(8,nCbW/numSbX)][k]
=min(5,maxFilterLengthPs[i*Max(8,nCbW/numSbX)][k])

maxFilterLengthQs[i*Max(8,nCbW/numSbX)][k]
=min(5,maxFilterLengthQs[i*Max(8,nCbW/numSbX)][k])

Otherwise if edgeTransfromFlags[i*Max(8, nCbW/numSbX)][k] is equal to 1 maxFilterLengthPs[i*Max(8,nCbW/numSbX)][k]
=min(5,maxFilterLengthPs[i*Max(8,nCbW/numSbX)][k])

maxFilterLengthQs[i*Max(8,nCbW/numSbX)][k]
=min(5,maxFilterLengthQs[i*Max(8,nCbW/numSbX)][k])

Otherwise if i is equal to 1 or i is equal to nCbW/8−1 or (edgeTransfromFlags[(i−1)*Max(8, nCbW/numSbX)][k] is equal to 1) or (edgeTransfromFlags[(i+1)*Max(8, nCbW/numSbX)][k] is equal to 1)

maxFilterLengthPs[i*Max(8,nCbW/numSbX)][k]=2 maxFilterLengthQs[i*Max(8,nCbW/numSbX)][k]=2

Otherwise maxFilterLengthPs[i*Max(8,nCbW/numSbX)][k]=3 maxFilterLengthQs[i*Max(8,nCbW/numSbX)][k]=3

Otherwise if edgeType is equal to EDGE_HOR and numSbY is greater than 1,
  An array of edgeTransformFlags is created by making a copy of the array of edgeFlagYs
  The following applies for j=1 . . . min((nCbH/8)−1, numSbY−1), k=0 . . . nCbW−1:

edgeFlagYs[k][j*Max(8,nCbH/numSbY)]=1 edgeFlagCbCrs[k/SubWidthC][j*Max(8,nCbH/(numSbY*SubHeightC))]=1

The following applies for j=0 . . . min((nCbH/8)−1, numSbY−1), k=0 . . . nCbW−1:
  If edgeFlagYs[k][j*Max(8, nCbH/numSbY)] is equal to 1
    If luma component
      If j is equal to 0,
        If numSbY at location (xCb, yCb−1) is greater than 1, maxFilterLengthPs[k][j*Max(8,nCbH/numSbY)]=min(5,maxFilterLengthPs[k][j*Max(8,nCbH/numSbY)])

maxFilterLengthQs[k][j*Max(8,nCbH/numSbY)]
=min(5,maxFilterLengthQs[k][j*Max(8,nCbH/numSbY)])

Otherwise if edgeTransformFlags[k][j*Max(8, nCbH/numSbY)] is equal to 1 maxFilterLengthPs[k][j*Max(8,nCbH/numSbY)]=min(5,maxFilterLengthPs[k][j*Max(8,nCbH/numSbY)])

maxFilterLengthQs[k][j*Max(8,nCbH/numSbY)]
=min(5,maxFilterLengthQs[k][j*Max(8,nCbH/numSbY)])

Otherwise if j is equal to 1 or j is equal to nCbH/8−1 or (edgeTransformFlags[k][(j−1)*Max(8, nCbH/numSbY)] is equal to 1) or (edgeTransformFlags[k][(j+1)*Max(8, nCbH/numSbY)] is equal to 1)

maxFilterLengthPs[k][j*Max(8,nCbH/numSbY)]=2 maxFilterLengthQs[k][j*Max(8,nCbH/numSbY)]=2

Otherwise maxFilterLengthPs[k][j*Max(8,nCbH/numSbY)]=3 maxFilterLengthQs[k][j*Max(8,nCbH/numSbY)]=3.

As described above, according to the techniques herein, filter unit 216 may be configured such that filtering decisions are additionally or alternatively determined based on whether a Q block or a P block is a large block (e.g., a transform block, prediction block, coding block, sub-block). In one example, a determination of whether a Q block is a large block (i.e., bSideQisLargeBlk) or a P block is a large block (i.e., bSidePisLargeBlk) may be based on whether the adjacent block uses ISP. That is, in one example, a determination of whether a Q block is a large block (i.e., bSideQisLargeBlk) or a P block is a large block (i.e., bSidePisLargeBlk) may be as follows:

If edge Type is equal to EDGE_VER, the following ordered steps apply:

. . . .

The variables bSidePisLargeBlk and bSideQisLargeBlk are derived as follows:
  If any of the following conditions are true, bSidePisLargeBlk is set equal to 1:
    intra_subpartitions_mode_flag[ ][ ] of coding block to which $p_{0,0}$ belongs is equal to 0 and $p_{0,0}$ belongs to coding block with width in luma samples greater than or equal to 32
    intra_subpartitions_mode_flag[ ][ ] of coding block to which $p_{0,0}$ belongs is equal to 1, intraSubPartitionsSplitType[ ][ ] of coding block to which $p_{0,0}$ belongs is equal to ISP_HOR_SPLIT, and $p_{0,0}$ belongs to coding block with width in luma samples greater than or equal to 32
    intra_subpartitions_mode_flag[ ][ ] of coding block to which $p_{0>0}$ belongs is equal to 1, intraSubPartitionsSplitType[ ][ ] of coding block to which $p_{0,0}$ belongs is equal to ISP_VER_SPLIT, and $p_{0,0}$ belongs to transform with width in luma samples greater than or equal to 32
  Otherwise, bSidePisLargeBlk is set equal to 0.
If $q_{0,0}$ belongs to coding block with width in luma samples greater than or equal to 32, bSideQisLargeBlk is set equal to 1 otherwise bSideQisLargeBlk is set equal to 0.

. . . .

Otherwise (edgeType is equal to EDGE_HOR), the following ordered steps apply:

The variables bSidePisLargeBlk and bSideQisLargeBlk are derived as follows:
If (luma position of sample $p_{0,0}$% CtbSizeY) is equal to 0, set bSidePisLargeBlk to 0
Otherwise,
If any of the following conditions are true, bSidePisLargeBlk is set equal to 1:
  intra_subpartitions_mode_flag[ ][ ] of coding block to which $p_{0,0}$ belongs is equal to 0 and $p_{0,0}$ belongs to coding block with height in luma samples greater than or equal to 32
  intra_subpartitions_mode_flag[ ][ ] of coding block to which $p_{0,0}$ belongs is equal to 1, intraSubPartitionsSplitType[ ][ ] of coding block to which $p_{0,0}$ belongs is equal to ISP_VER_SPLIT, and $p_{0,0}$ belongs to coding block with height in luma samples greater than or equal to 32
  intra_subpartitions_mode_flag[ ][ ] of coding block to which $p_{0,0}$ belongs is equal to 1, intraSubPartitionsSplitType[ ][ ] of coding block to which $p_{0,0}$ belongs is equal to ISP_HOR_SPLIT, and $p_{0,0}$ belongs to transform with height in luma samples greater than or equal to 32
Otherwise, bSidePisLargeBlk is set equal to 0.
If $q_{0,0}$ belongs to coding block with height greater than or equal to 32, bSideQisLargeBlk is set equal to 1 otherwise bSideQisLargeBlk is set equal to 0.

As described above, a block of samples (e.g., coding block/unit) may contain one or more transform blocks/unit. Internal transform boundaries may be considered as are candidate for deblocking. Further, in some cases, a signal may be received by the decoder that indicates that a block of samples does not contain any transform blocks/unit. For example, a flag, e.g., cu_cbf flag, may be set to 0 when a residual is absent for a coding unit. Similarly, flags may indicate that a residual is absent for a coding block of video component. In one example, if a decision process is based on transform block/unit properties, then in the absence of transform block/unit, other substitute properties may be used. For example, long filter selection may be based on size of transform block/unit orthogonal to the boundary being filtered/deblocked. However, in absence of transform block/unit, long filter selection may be based on the size of prediction block/unit. In another example, the long filter selection may be based on the size of coding block/unit. Similar to transform block/unit the substitute property may correspond to the dimension that is orthogonal to the boundary being filtered/deblocked.

As described above, a coding unit/block may be partitioned into prediction blocks/units and/or prediction block/unit is same size as coding block/unit. Further, in some case, a prediction block/unit corresponds to the sub-block partitioning of a coding block/unit e.g., due to use of ISP. In some cases, a prediction block/unit corresponds to the group of samples for which prediction parameters are signaled e.g., coding block/unit with affine control parameters, coding block/unit using ATMVP. In some cases, a prediction block/unit corresponds to the group of samples that have a common set of prediction parameters, e.g., subblocks (of coding block/unit) corresponding to the resolution at which motion vectors are derived for an affine coding block/unit, and/or subblocks (of coding block/unit) corresponding to the resolution at which motion vectors are derived for ATMVP coding block/unit. Similar to that described above, with respect to transform boundaries, internal prediction boundaries may be considered as are candidate for deblocking.

Derivation Process of Transform Block Boundary

Inputs to this this process are:
a location (xB0, yB0) specifying the top-left sample of the current block relative to the top-left sample of the current coding block,
a variable nTbW specifying the width of the current block,
a variable nTbH specifying the height of the current block,
a variable treeType specifying whether a single tree (SINGLE_TREE) or a dual tree is used to partition the CTUs and, when a dual tree is used, whether the luma (DUAL_TREE_LUMA) or chroma components (DUAL_TREE_CHROMA) are currently processed,
a variable filterEdgeFlag,
the two-dimensional (nCbW)×(nCbH) arrays edgeFlags, maxFilterLengthQs, maxFilterLengthPs and a two-dimensional (nCbW/SubWidthC)×(nCbH/SubHeightC) array maxFilterLengthCbCrs,
a variable edgeType specifying whether a vertical (EDGE_VER) or a horizontal (EDGE_HOR) edge is filtered.
Output of this process is the modified two-dimensional (nCbW)×(nCbH) arrays edgeFlags, maxFilterLengthQs, maxFilterLengthPs and the two-dimensional (nCbW/SubWidthC)×(nCbH/SubHeightC) array maxFilterLengthCbCrs.

If edgeType is equal to EDGE_VER, the value of edgeFlags[xB0+1][yB0+k] for k=0 . . . nTbH−1 and for l=0 . . . nTbW−1 is derived as follows:
  If xB0+1 is equal to 0, edgeFlags[xB0+1][yB0+k] is set equal to filterEdgeFlag.
  Otherwise, if the location (xB0+1 yB0+k) is at a transform block edge, edgeFlags[xB0+1][yB0+k] is set equal to 1.
  If edgeFlags[xB0+1][yB0+k] is equal to 1
    If treeType is equal to SINGLE_TREE or DUAL_TREE_LUMA
    If width in luma samples of transform block when cu_cbf is equal to 1 or prediction block when cu_cbf is equal to 0 at luma position (xB0+1, yB0+k) is equal to or greater than 32, maxFilterLengthQs[xB0+1][yB0+k]=7
    Otherwise, maxFilterLengthQs[xB0+1][yB0+k]=3
    If width in luma samples of transform block when cu_cbf is equal to 1 or prediction block when cu_cbf is equal to 0 at luma position (xB0-1+1, yB0+k) is equal to or greater than 32, maxFilterLengthPs[xB0+1][yB0+k]=7
    Otherwise, maxFilterLengthPs[xB0+1][yB0+k]=3
    If width in chroma samples of transform block when cu_cbf is equal to 1 or prediction block when cu_cbf is equal to 0 at chroma position ((xB0+1)/SubWidthC, (yB0+k)/SubHeightC) and chroma position ((xB0+1)/SubWidthC−1, (yB0+k)/SubHeightC) both are equal to or greater than 8, maxFilterLengthCbCrs[(xB0+1)/SubWidthtC][(yB0+k)/SubHeightC]=3
    Otherwise, maxFilterLengthCbCrs[(xB0+1)/SubWidthtC][(yB0+k)/SubHeightC]=1
  Otherwise
    If width in chroma samples of transform block when cu_cbf is equal to 1 or of coding block when cu_cbf is equal to 0 at chroma position (xB0+1, yB0+k) and chroma position (xB0+1-1, yB0+k) both are equal to or greater than 8, maxFilterLengthCbCrs[xB0+1][yB0+k]=3
    Otherwise, maxFilterLengthCbCrs[xB0+1][yB0+k]=1

Otherwise (edgeType is equal to EDGE_HOR), the value of edgeFlags[xB0+k][yB0+1] for k=0 . . . nTbW−1 and for l=0 . . . nTbH−1 is derived as follows:
  If yB0 is equal to 0, edgeFlags[xB0+k][yB0+1] is set equal to filterEdgeFlag.
  Otherwise, if the location (xB0+k, yB0+1) is at a transform block edge, edgeFlags[xB0+k][yB0+1] is set equal to 1.
  If edgeFlags[xB0+k][yB0+1] is equal to 1,
    If treeType is equal to SINGLE_TREE or DUAL_TREE_LUMA
    If height in luma samples of transform block when cu_cbf is equal to 1 or prediction block when cu_cbf is equal to 0 at luma position (xB0+k, yB0+1) is equal to or greater than 32, maxFilterLengthQs[xB0+k][yB0+1]=7
    Otherwise, maxFilterLengthQs[xB0+k][yB0+1]=3
    If height in luma samples of transform block when cu_cbf is equal to 1 or prediction block when cu_cbf is equal to 0 at luma position (xB0+k, yB0+1−1) is equal to or greater than 32, maxFilterLengthPs[xB0+k][yB0+1]=7
    Otherwise, maxFilterLengthPs[xB0+k][yB0+1]=3
    If height in chroma samples of transform block when cu_cbf is equal to 1 or prediction block when cu_cbf is equal to 0 at chroma position ((xB0+k)/SubWidthC, (yB0+1)/SubHeightC) and chroma position ((xB0+k)/SubWidhtC, (yB0+1)/SubHeightC−1) both are equal to or greater than 8,
      Where yC is the top position of the current block in chroma samples relative to the top position of the current picture
    If ((yC+yB0+1) % (1<<(log 2_ctu_size_minus2+2))/SubHeightC is equal to 0) (when the edge type is EDGE_HOR and the edge overlaps with the chroma CTB boundary)

maxFilterLengthCbCrs[(xB0+k)/SubWidthC][(yB0+1)/SubHeightC]=1

Otherwise, maxFilterLengthCbCrs[(xB0+k)/SubWidthC][(yB0+1)/SubHeightC]=3

Otherwise, maxFilterLengthCbCrs[(xB0+k)/SubWidthtC][(yB0+1)/SubHeightC]=1

Otherwise
  If height in chroma samples of transform block when cu_cbf is equal to 1 or prediction block when cu_cbf is equal to 0 at chroma position (xB0+k, yB0+1) and at chroma position (xB0+k, yB0+1-1) both are equal to or greater than 8,
    Where yC is the top position of the current block in chroma samples relative to the top position of the current picture
    If ((yC+yB0+1) % (1<<(log 2_ctu_size_minus2+2))/SubHeightC is equal to 0) (when the edge type is EDGE_HOR and the edge overlaps with the chroma CTB boundary)
    maxFilterLengthCbCrs[xB0+k][yB0+1]=1
    Otherwise, maxFilterLengthQCbCrs[xB0+k][yB0+1]=3
  Otherwise, maxFilterLengthCbCrs[xB0+k][yB0+1]=1
Similarly, in one example, computations used in the decision process for block edges may be based on transform block/unit size in presence of residue but when residue is absent it may be based on prediction block/unit size. That is, in one example, a determination of whether a Q block is a large block (i.e., bSideQisLargeBlk or sideQisLargeBlk) or a P block is a large block (i.e., bSidePisLargeBlk or sidePisLargeBlk) may be based on the following:
If edgeType is equal to EDGE_VER, the following ordered steps apply:
. . . .
  2. The variables sidePisLargeBlk and sideQisLargeBlk are first initialized to 0 and then modified as follows:
    If maxFilterLengthP is larger than 3,
      If $p_{0,0}$ belongs to prediction block when cu_cbf is equal to 0 or transform block when cu_cbf is equal to 1 with width in luma samples greater than or equal to 32, sidePisLargeBlk is set equal to 1 otherwise sidePisLargeBlk is set equal to 0.
    If maxFilterLengthQ is larger than 3,
      If $q_{0,0}$ belongs to prediction block when cu_cbf is equal to 0 or transform block when cu_cbf is equal to 1 with width in luma samples greater than or equal to 32, sideQisLargeBlk is set equal to 1 otherwise sideQisLargeBlk is set equal to 0
Otherwise (edgeType is equal to EDGE_HOR), the following ordered steps apply:
. . . .
  2. The variables sidePisLargeBlk and sideQisLargeBlk are first initialized to 0 and are then modified as follows:
    If (luma position of sample $p_{0,0}$% CtbSizeY) is equal to 0, set sidePisLargeBlk to 0
    Otherwise,
    If maxFilterLengthP is larger than 3,
      If $p_{0,0}$ belongs to prediction block when cu_cbf is equal to 0 or transform block when cu_cbf is equal to 1 with height greater than or equal to 32, sidePisLargeBlk is set equal to 1 otherwise sidePisLargeBlk is set equal to 0.
    If maxFilterLengthQ is larger than 3,
      If $q_{0,0}$ belongs to prediction block when cu_cbf is equal to 0 or transform block when cu_cbf is equal to 1 with height greater than or equal to 32, sideQisLargeBlk is set equal to 1 otherwise sideQisLargeBlk is set equal to 0.
. . . .

Referring again to FIG. 8, entropy encoding unit 218 receives quantized transform coefficients and predictive syntax data (i.e., intra prediction data, motion prediction data, QP data, etc.). Entropy encoding unit 218 may be configured to perform entropy encoding according to one or more of the techniques described herein. Entropy encoding unit 218 may be configured to output a compliant bitstream, i.e., a bitstream that a video decoder can receive and reproduce video data therefrom. In this manner, video encoder 200 represents an example of a device configured to receive an array of sample values including adjacent reconstructed video blocks for a component of video data, determine a boundary strength value for a boundary between the adjacent reconstructed video blocks, wherein the boundary is an intra sub-partition boundary, and modify sample values in the adjacent reconstructed video blocks based on the determined boundary strength value and according to a deblocking filter.

Figure 9:
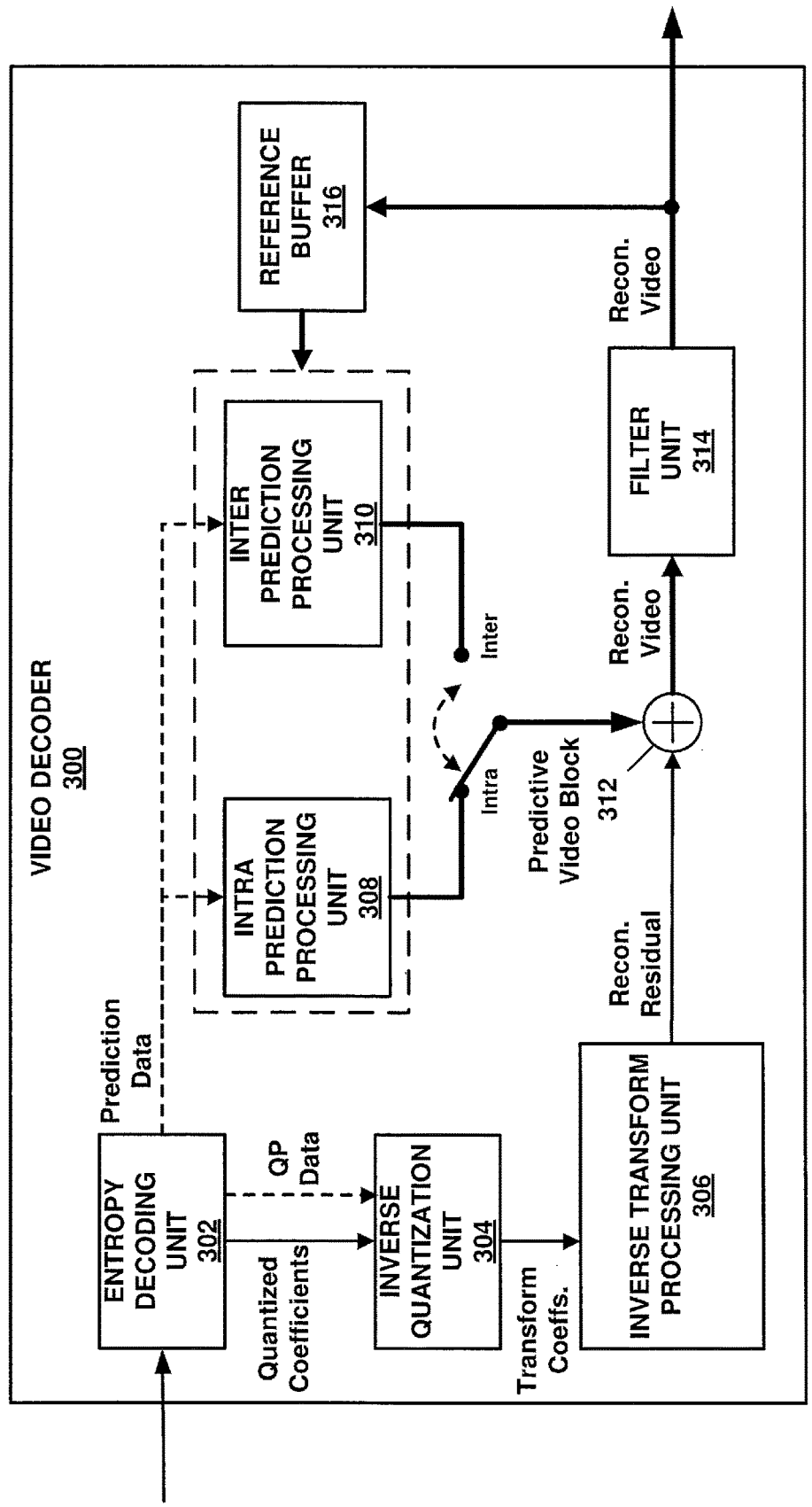
FIG. 9 is a block diagram illustrating an example of a video decoder that may be configured to decode video data according to one or more techniques of this disclosure.

FIG. 9 is a block diagram illustrating an example of a video decoder that may be configured to decode video data according to one or more techniques of this disclosure. In one example, video decoder 300 may be configured to reconstruct video data based on one or more of the techniques described above. That is, video decoder 300 may operate in a reciprocal manner to video encoder 200 described above. Video decoder 300 may be configured to perform intra prediction decoding and inter prediction decoding and, as such, may be referred to as a hybrid decoder. In the example illustrated in FIG. 9 video decoder 300 includes an entropy decoding unit 302, inverse quantization unit 304, inverse transformation processing unit 306, intra prediction processing unit 308, inter prediction processing unit 310, summer 312, filter unit 314, and reference buffer 316. Video decoder 300 may be configured to decode video data in a manner consistent with a video encoding system, which may implement one or more aspects of a video coding standard. It should be noted that although example video decoder 300 is illustrated as having distinct functional blocks, such an illustration is for descriptive purposes and does not limit video decoder 300 and/or sub-components thereof to a particular hardware or software architecture. Functions of video decoder 300 may be realized using any combination of hardware, firmware, and/or software implementations.

As illustrated in FIG. 9, entropy decoding unit 302 receives an entropy encoded bitstream. Entropy decoding unit 302 may be configured to decode quantized syntax elements and quantized coefficients from the bitstream according to a process reciprocal to an entropy encoding process. Entropy decoding unit 302 may be configured to perform entropy decoding according any of the entropy coding techniques described above. Entropy decoding unit 302 may parse an encoded bitstream in a manner consistent with a video coding standard. Video decoder 300 may be configured to parse an encoded bitstream where the encoded bitstream is generated based on the techniques described above. Inverse quantization unit 304 receives quantized transform coefficients (i.e., level values) and quantization parameter data from entropy decoding unit 302. Quantization parameter data may include any and all combinations of delta QP values and/or quantization group size values and the like described above. Video decoder 300 and/or inverse quantization unit 304 may be configured to determine QP values used for inverse quantization based on values signaled by a video encoder and/or through video properties and/or coding parameters. That is, inverse quantization unit 304 may operate in a reciprocal manner to coefficient quantization unit 206 described above. Inverse quantization unit 304 may be configured to apply an inverse quantization. Inverse transform processing unit 306 may be configured to perform an inverse transformation to generate reconstructed residual data. The techniques respectively performed by inverse quantization unit 304 and inverse transform processing unit 306 may be similar to techniques performed by inverse quantization/transform processing unit 208 described above. Inverse transform processing unit 306 may be configured to apply an inverse DCT, an inverse DST, an inverse integer transform, Non-Separable Secondary Transform (NSST), or a conceptually similar inverse transform processes to the transform coefficients in order to produce residual blocks in the pixel domain. Further, as described above, whether a particular transform (or type of particular transform) is performed may be dependent on an intra prediction mode. As illustrated in FIG. 9, reconstructed residual data may be provided to summer 312. Summer 312 may add reconstructed residual data to a predictive video block and generate reconstructed video data.

As described above, a predictive video block may be determined according to a predictive video technique (i.e., intra prediction and inter frame prediction). Intra prediction processing unit 308 may be configured to receive intra prediction syntax elements and retrieve a predictive video block from reference buffer 316. Reference buffer 316 may include a memory device configured to store one or more frames of video data. Intra prediction syntax elements may identify an intra prediction mode, such as the intra prediction modes described above. In one example, intra prediction processing unit 308 may reconstruct a video block using according to one or more of the intra prediction coding techniques described herein. Inter prediction processing unit 310 may receive inter prediction syntax elements and generate motion vectors to identify a prediction block in one or more reference frames stored in reference buffer 316. Inter prediction processing unit 310 may produce motion compensated blocks, possibly performing interpolation based on interpolation filters. Identifiers for interpolation filters to be used for motion estimation with sub-pixel precision may be included in the syntax elements. Inter prediction processing unit 310 may use interpolation filters to calculate interpolated values for sub-integer pixels of a reference block.

Filter unit 314 may be configured to perform filtering on reconstructed video data. For example, filter unit 314 may be configured to perform deblocking and/or SAO filtering, as described above with respect to filter unit 216. Further, it should be noted that in some examples, filter unit 314 may be configured to perform proprietary discretionary filter (e.g., visual enhancements). As illustrated in FIG. 9 a reconstructed video block may be output by video decoder 300. In this manner, video decoder 300 represents an example of a device configured to receive an array of sample values including adjacent reconstructed video blocks for a component of video data, determine a boundary strength value for a boundary between the adjacent reconstructed video blocks, wherein the boundary is an intra sub-partition boundary, and modify sample values in the adjacent reconstructed video blocks based on the determined boundary strength value and according to a deblocking filter.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

Various examples have been described. These and other examples are within the scope of the following claims.

SUMMARY

In one example, a method of filtering reconstructed video data, the method comprising:

receiving an array of sample values including adjacent reconstructed video blocks for a component of video data; determining a boundary strength value for a boundary between the adjacent reconstructed video blocks, wherein the boundary is an intra subpartition boundary; and modifying sample values in the adjacent reconstructed video blocks based on the determined boundary strength value and according to a deblocking filter.

In one example, the method, wherein a component of video data includes a chroma component.

In one example, a device for coding video data, the device comprising one or more processors configured to perform any and all combinations of the steps.

In one example, the device, wherein the device includes a video encoder.

In one example, The device, wherein the device includes a video decoder.

In one example, a system comprising: the device and the device.

In one example, an apparatus for coding video data, the apparatus comprising means for performing any and all combinations of the steps.

In one example, a non-transitory computer-readable storage medium comprising instructions stored thereon that, when executed, cause one or more processors of a device for coding video data to perform any and all combinations of the steps.

In one example, a method of filtering reconstructed video data, the method comprising: receiving an array of reconstructed luma samples including a P-block and a Q-block adjacent to a deblocking boundary; determining whether the P-block or the Q-block has an edge which is perpendicular to the deblocking boundary and whose size is greater than or equal to 32; determining a maximum filter length based on whether the P-block or the Q-block has the edge; and deblocking the array of reconstructed luma samples based on the determined maximum filter length.

In one example, the method, wherein the maximum filter length is determined to set equal to 7.

In one example, the method, wherein the maximum filter length is determined to set equal to 3.

In one example, the method, wherein the P-block or the Q-block is a transform block.

In one example, a device of filtering reconstructed video data, the device comprising one or more processors configured to: receiving an array of reconstructed luma samples including a P-block and a Q-block adjacent to a deblocking boundary; determining whether the P-block or the Q-block has an edge which is perpendicular to the deblocking boundary and whose size is greater than or equal to 32; determining a maximum filter length based on whether the P-block or the Q-block has the edge; and deblocking the array of reconstructed luma samples based on the determined maximum filter length.

CROSS REFERENCE

This Nonprovisional application claims priority under 35 U.S.C. § 119 on provisional Application No. 62/807,703 on Feb. 19, 2019, No. 62/810,913 on Feb. 26, 2019, No. 62/813,985 on Mar. 5, 2019, No. 62/816,844 on Mar. 11, 2019, No. 62/817,348 on Mar. 12, 2019, No. 62/819,575 on Mar. 16, 2019, the entire contents of which are hereby incorporated by reference.

The invention claimed is:

1. A method of filtering reconstructed video data, the method comprising:
receiving an array of reconstructed luma samples including a P-block and a Q-block that are both adjacent to an intra sub-partitions (ISP) edge;
determining whether a first size of an edge of one of the P-block and the Q-block is greater than or equal to 32, wherein the edge of the one of the P-block and the Q-block is perpendicular to the ISP edge;
determining a first maximum filter length based on the determination of whether the first size is greater than or equal to 32; and
deblocking the array of the reconstructed luma samples based on the determined first maximum filter length.

2. The method of claim 1, wherein the first maximum filter length is determined to be equal to 7 for the one of the P-block and the Q-block when the first size is greater than or equal to 32.

3. The method of claim 1, wherein the first maximum filter length is determined to be equal to 3 for the one of the P-block and the Q-block when the first size is less than 32.

4. The method of claim 1, wherein each of the P-block and the Q-block is a transform block.

5. The method of claim 1, further comprising:
determining whether a second size of an edge of the other one of the P-block and the Q-block is greater than or equal to 32, wherein the edge of the other one of the P-block and the Q-block is perpendicular to the ISP edge;
determining a second maximum filter length based on the determination of whether the second size is greater than or equal to 32; and
deblocking the array of the reconstructed luma samples based on the determined first maximum filter length and the determined second maximum filter length.

6. The method of claim 1, further comprising:
receiving an ISP mode flag for the array of the reconstructed luma samples;
receiving an ISP split flag for the array of the reconstructed luma samples when the ISP mode flag specifies that the array of the reconstructed luma samples is partitioned into the P-block and the Q-block; and
determining an edge type of the ISP edge based on the ISP edge split flag.

7. The method of claim 6, wherein:
the first size is a width of the one of the P-block and the Q-block when the edge type is a vertical direction; and
the first size is a height of the one of the P-block and the Q-block when the edge type is a horizontal direction.

8. The method of claim 1, wherein the ISP edge is one of a plurality of candidate deblocking boundaries.

9. A device for filtering reconstructed video data, the device comprising one or more processors configured to:
receive an array of reconstructed luma samples including a P-block and a Q-block that are both adjacent to an intra sub-partitions (ISP) edge;
determine whether a first size of an edge of one of the P-block and the Q-block is greater than or equal to 32, wherein the edge of the one of the P-block and the Q-block is perpendicular to the ISP edge;
determine a first maximum filter length based on the determination of whether the first size is greater than or equal to 32; and
deblock the array of the reconstructed luma samples based on the determined first maximum filter length.

10. The device of claim 9, wherein the first maximum filter length is determined to be equal to 7 for the one of the P-block and the Q-block when the first size is greater than or equal to 32.

11. The device of claim 9, wherein the first maximum filter length is determined to be equal to 3 for the one of the P-block and the Q-block when the first size is less than 32.

12. The device of claim 9, wherein the one or more processors are further configured to:
determine whether a second size of an edge of the other one of the P-block and the Q-block is greater than or equal to 32, wherein the edge of the other one of the P-block and the Q-block is perpendicular to the ISP edge;
determine a second maximum filter length based on the determination of whether the second size is greater than or equal to 32; and
deblock the array of the reconstructed luma samples based on the determined first maximum filter length and the determined second maximum filter length.

13. The device of claim 9, wherein the one or more processors are further configured to:
receive an ISP mode flag for the array of the reconstructed luma samples;
receive an ISP split flag for the array of the reconstructed luma samples when the ISP mode flag specifies that the array of the reconstructed luma samples is partitioned into the P-block and the Q-block; and
determine an edge type of the ISP edge based on the ISP edge split flag.

14. The device of claim 13, wherein:
the first size is a width of the one of the P-block and the Q-block when the edge type is a vertical direction; and
the first size is a height of the one of the P-block and the Q-block when the edge type is a horizontal direction.

* * * * *